(12) United States Patent
Skirpa

(10) Patent No.: US 9,753,900 B2
(45) Date of Patent: Sep. 5, 2017

(54) UNIVERSAL CONTENT REFERENCING, PACKAGING, DISTRIBUTION SYSTEM, AND A TOOL FOR CUSTOMIZING WEB CONTENT

(71) Applicant: SAVNOR TECHNOLOGIES LLC, Rehoboth Beach, DE (US)

(72) Inventor: Alexander R. Skirpa, Rehoboth Beach, DE (US)

(73) Assignee: Savnor Technologies LLC, Rehoboth Beach, DE (US)

( * ) Notice: Subject to any disclaimer, the term of this patent is extended or adjusted under 35 U.S.C. 154(b) by 571 days.

(21) Appl. No.: 13/751,694

(22) Filed: Jan. 28, 2013

(65) Prior Publication Data
US 2013/0268840 A1    Oct. 10, 2013

Related U.S. Application Data

(63) Continuation of application No. 12/605,313, filed on Oct. 23, 2009, now Pat. No. 8,365,082.
(Continued)

(51) Int. Cl.
*G06F 3/00* (2006.01)
*G06F 17/22* (2006.01)
*G06F 3/0481* (2013.01)

(52) U.S. Cl.
CPC ........ *G06F 17/2247* (2013.01); *G06F 3/0481* (2013.01)

(58) Field of Classification Search
CPC .... G06F 17/30905; G06F 3/0481; G06F 3/14; G06F 17/3089; G06F 17/2247; G06F 17/30867
See application file for complete search history.

(56) References Cited

U.S. PATENT DOCUMENTS 6,209,007 B1    3/2001    Kelley et al.
6,219,679 B1    4/2001    Brisebois et al.
(Continued)

FOREIGN PATENT DOCUMENTS

CA    2741633    4/2010
EP    1640878    3/2006
(Continued)

OTHER PUBLICATIONS

Pea et al., Video Collaboratories for Research and Education: An Analysis of Collaboration Desig Patterns; © 2008; vol. 1, No. 4; 13 pages.*
(Continued)

*Primary Examiner* — Linh K Pham
(74) *Attorney, Agent, or Firm* — Andrew Bodendorf

(57) ABSTRACT

A computer tool allows a user to manipulate displayed content of a web page by a user device. The computer tool may be used to implement a collapsing, foldable browser that allows users to customize web content. The computer tool receives an indication of a user defined first portion of the content of a web page displayed by a browser, determines a remaining portion of the content of the web other than the first portion; and renders only the first user defined portion on a display screen of a display associated with the user device. An attribute may be associated with the first portion and displayed in proximity to the first portion to provide functions to manipulate the first portion within the display screen of the display associated with the user device. A menu may be associated with the attribute. The menu may include functions to allow toggling between display of only first portion and the first portion combined with a remaining portion, to minimize the browser, to close the browser to a file, and to expand display of only the first portion to display the browser window in addition to the first portion.

18 Claims, 45 Drawing Sheets

Related U.S. Application Data

(60) Provisional application No. 61/107,960, filed on Oct. 23, 2008, provisional application No. 61/254,371, filed on Oct. 23, 2009.

(56) References Cited

U.S. PATENT DOCUMENTS

| | | | |
|---|---|---|---|
| 6,573,915 | B1 | 6/2003 | Sivan et al. |
| 6,725,425 | B1 | 4/2004 | Rajan et al. |
| 6,976,210 | B1 | 12/2005 | Silva et al. |
| 6,983,331 | B1 | 1/2006 | Mitchell et al. |
| 7,000,184 | B2* | 2/2006 | Matveyenko ....... G06F 17/2247 715/235 |
| 7,103,838 | B1 | 9/2006 | Krishnamurthy et al. |
| 7,216,290 | B2* | 5/2007 | Goldstein ......... G06F 17/30905 715/201 |
| 7,228,496 | B2 | 6/2007 | Hamada |
| 7,360,166 | B1* | 4/2008 | Krzanowski ...... G06F 17/30905 707/E17.121 |
| 7,386,783 | B2 | 6/2008 | Lection et al. |
| 7,562,287 | B1* | 7/2009 | Goldstein ............. G06Q 30/02 715/201 |
| 7,730,082 | B2 | 6/2010 | Sah et al. |
| 7,818,330 | B2 | 10/2010 | Wu et al. |
| 7,917,846 | B2 | 3/2011 | Decker et al. |
| 7,934,152 | B2 | 4/2011 | Krishnamurthy et al. |
| 7,975,020 | B1* | 7/2011 | Green ................ G06Q 30/0241 705/14.4 |
| 8,176,410 | B1 | 5/2012 | Hausig |
| 8,230,360 | B2 | 7/2012 | Ma et al. |
| 8,365,082 | B2 | 1/2013 | Skirpa |
| 8,656,295 | B2 | 2/2014 | Decker |
| 8,762,556 | B2 | 6/2014 | Priyadarshan et al. |
| 2002/0059166 | A1 | 5/2002 | Wang et al. |
| 2004/0080531 | A1* | 4/2004 | Berstis ........................ 345/738 |
| 2005/0246651 | A1 | 11/2005 | Krzanowski |
| 2006/0041589 | A1 | 2/2006 | Helfman et al. |
| 2006/0064647 | A1 | 3/2006 | Tapuska et al. |
| 2006/0203294 | A1* | 9/2006 | Makino ................. G06F 17/211 358/400 |
| 2006/0224973 | A1 | 10/2006 | Albrecht et al. |
| 2006/0224977 | A1 | 10/2006 | Albrecht et al. |
| 2006/0259585 | A1* | 11/2006 | Keohane et al. ............. 709/219 |
| 2006/0277460 | A1 | 12/2006 | Forstall et al. |
| 2007/0006086 | A1 | 1/2007 | Kokko et al. |
| 2007/0073777 | A1* | 3/2007 | Werwath ........... G06F 17/30905 |
| 2007/0157104 | A1 | 7/2007 | Blain et al. |
| 2007/0214431 | A1* | 9/2007 | Amadio ................. G06F 9/4443 715/788 |
| 2007/0266342 | A1 | 11/2007 | Chang et al. |
| 2008/0168388 | A1* | 7/2008 | Decker ................. G06F 3/0481 715/800 |
| 2008/0184138 | A1* | 7/2008 | Krzanowski ...... G06F 17/30873 715/760 |
| 2008/0201452 | A1* | 8/2008 | Athas ................ H04L 29/12594 709/219 |
| 2008/0215997 | A1* | 9/2008 | Wu ........................ G06F 3/0481 715/760 |
| 2008/0307308 | A1 | 12/2008 | Sullivan et al. |
| 2008/0313722 | A1 | 12/2008 | Cho et al. |
| 2009/0144652 | A1* | 6/2009 | Wiley ................... G06F 9/4443 715/800 |
| 2009/0199093 | A1 | 8/2009 | Chakravarty |
| 2009/0210807 | A1 | 8/2009 | Xiao et al. |
| 2009/0235186 | A1 | 9/2009 | Howard et al. |
| 2010/0023881 | A1 | 1/2010 | Jania et al. |
| 2010/0031166 | A1 | 2/2010 | Choudhary et al. |
| 2010/0042933 | A1* | 2/2010 | Ragusa ................. G06F 3/0481 715/760 |
| 2010/0070899 | A1 | 3/2010 | Hunt et al. |
| 2010/0077321 | A1 | 3/2010 | Shen et al. |
| 2010/0110104 | A1 | 5/2010 | Hertzfeld et al. |
| 2010/0115430 | A1 | 5/2010 | Skripa |
| 2011/0154185 | A1 | 6/2011 | Kern et al. |
| 2011/0264996 | A1* | 10/2011 | Norris, III .................... 715/236 |
| 2012/0010995 | A1 | 1/2012 | Skirpa et al. |
| 2013/0275917 | A1* | 10/2013 | Norris, III .................... 715/841 |

FOREIGN PATENT DOCUMENTS

| | | |
|---|---|---|
| KR | 10-2008-0006129 | 1/2008 |
| KR | 10-2009-0041960 | 4/2009 |
| KR | 10-2010-0050602 | 5/2010 |
| KR | 10-2011-7011714 | 6/2011 |
| WO | WO 98/25198 | 6/1998 |
| WO | WO 00/75812 | 12/2000 |
| WO | WO/2010/048596 | 4/2010 |

OTHER PUBLICATIONS

Freire, J et al. "Webview: Accessing Personalized Web Content and Services," ACM, WWW10, May 1-5, 2001, pp. 576-586.

Kowalkiewicz et al. "Towards More Personalized Web: Extraction and Integration of Dynamic Content from the Web," APWeb 2006, LNCS 3841, pp. 668-679.

Lingam et al., "Supporting End-Users in the Creation of Dependable Web Clips," ACM WWW 2007, May 8-12, 2007 pp. 953-962.

Korean Office Action of Korean Application 10-2011-7011714 corresponding to U.S. Appl. No. 12/605,313.

WO 2010/048596 International Search Report of PCT/US2009/061973 dated Jun. 16, 2010.

International Search Report of PCT/US2011/047703 dated Apr. 30, 2012.

Ravi et al.; A survey on dynamic web content generation and delivery techniques; 2009; http://www/cs.wayne.edu/⌐ ⌐ weisong/papers/ravi09-dynamic-content.pdf.

\* cited by examiner

UNIVERSAL CONTENT REFERENCING, PACKAGING, DISTRIBUTION SYSTEM, AND A TOOL FOR CUSTOMIZING WEB CONTENT

CROSS-REFERENCE TO RELATED APPLICATIONS

This application is a continuation of U.S. patent application Ser. No. 12/605,313 titled "A UNIVERSAL CONTENT REFERENCING, PACKAGING, DISTRIBUTION SYSTEM, AND A TOOL FOR CUSTOMIZING WEB CONTENT" filed on Oct. 23, 2009 which claims the benefit under 35 U.S.C. §119(e) of U.S. Provisional Application No. 61/107,960, titled "WEB PAGE CONTENT COLLECTION AND SHARING" filed on Oct. 23, 2008 in the U.S. Patent and Trademark Office and U.S. Provisional Application No. 61/254,371, titled "A UNIVERSAL CONTENT REFERENCING, PACKAGING, DISTRIBUTION SYSTEM, AND A TOOL FOR CUSTOMIZING WEB CONTENT" filed on Oct. 23, 2009 in the U.S. Patent and Trademark Office; each of these cross-referenced applications are herein incorporated by reference in their entirety for all purposes.

TECHNICAL FIELD

The field of the invention generally relates to a computer tool and in particular with a specialized computer tool providing a foldable Internet browser, plug-in, and widget.

BACKGROUND

The Internet provides access to unprecedented amount of information and content. On the World Wide Web, users may access content provided by web pages on websites. A web page provides content or resource of information that is suitable for the World Wide Web. Typically a web page is accessed through a web browser running on a computer which renders the content for presentation to a user. The content is typically provided in an HTML or XHTML format and may provide navigation to other web pages via hypertext links.

Users of the Internet have numerous tools available for parsing and collecting content from web pages. User may bookmark web pages using social bookmarking content collection services, such as Digg, Kaboodle, AddThis, among others, to collect web content, RSS feeds, and Podcasts. These services generally allow users to collect content provided by a web publisher, but only in the form created, provided, or specified by the web publisher.

Generally a user accesses the content through a web browser. When a user views a web page using a convention Internet browser, the user may modify how the browser displays the content to a minimal extent. For example, the user can increase the size of the text displayed, maximize or minimize the browser, and adjust the size of the window displaying the content, scroll through content displayed, and may move the position of the browser display around the screen. When the window or display of the browser presents less than all of the content on a page, various browser functions (e.g., scroll bars) permit the user to manipulate the content displayed within the window or display. However, there are very few options for a user to customize web content provided by a content provider system, such as a website. In addition, it is very difficult for one user to share or direct another user to specific content of a website.

SUMMARY

In one general aspect, a computer tool for manipulating displayed content of a web page by a user device, the software tool comprising instructions configured to cause a processing device of a user device to: receive an indication of a user defined first portion of the content of a web page displayed by a browser; determine a remaining portion of the content of the web other than the first portion; and render only the first user defined portion on a display screen of a display associated with the user device.

The tool may be configured as a plug-in for an Internet browser implemented by the user device. The tool may be further configured to provide instruction to cause the processing device to implement an Internet browser.

The rendered first portion of the displayed content of the web page is maintained as link between the user device and a host device providing the web page.

The computer tool may include instructions to cause a processor to maintain or periodically access a link between the user device and a host device providing the web page to continuously render an updated the first portion of the displayed content based on the link.

The computer tool may include instructions to cause a processor associate an attribute with the first portion.

The attribute may be a Favicon or a logo associated with the web page.

The computer tool may include instructions to cause a processor associate an attribute with the first portion, display the attribute in proximity to the first portion, and provide functions to manipulate the first portion within the display screen of the display associated with the user device.

The computer may include instructions to cause a processor to provide a menu in association with the attribute, the menu including functions to cause the processor to one or more of toggle between display of only first portion and the first portion combined with the remaining portion, to minimize the browser, to close the browser to a file, and to expand display of only the first portion to display the browser window in addition to the first portion.

The attribute may be a handle associated with the first portion and the computer to include instruction to cause the processor to receive user input associated with the attribute as a handle to manipulate a position where the first portion is rendered on the display screen of the display associated with the user device.

A method for manipulating the displayed content of a web page by a computer tool of a user device includes receiving an indication of a user defined first portion of the content of a web page displayed by a browser; determining a remaining portion of the content of the web other than the first portion; and rendering only the first user defined portion on a display screen of a display associated with the user device.

The computer tool may be configured as a plug-in for an Internet browser implemented by the user device.

The tool may be further configured to provide instruction to cause the processing device to implement an Internet browser.

The method also may include maintaining or periodically accessing a link between the user device and a host device providing the web page to continuously render an updated the first portion of the displayed content based on the link.

The method also may include displaying of a portion of a content of a second web page simultaneously with the display of the first portion of the content of the first web page.

The method also may include associating an attribute with the first portion.

The attribute may be a Favicon or a logo associated with the web page.

The method also may include associating an attribute with the first portion, displaying the attribute in proximity to the first portion, and providing functions to manipulate the first portion within the display screen of the display associated with the user device.

The method also may include providing a menu in association with the attribute, wherein the menu including functions to cause the processor to one or more of toggle between display of only first portion and the first portion combined with the remaining portion, to minimize the browser, to close the browser to a file, and to expand display of only the first portion to display the browser window in addition to the first portion.

The attribute may be a handle associated with the first portion and the computer to include instruction to cause the processor to receive user input associated with the attribute as a handle to manipulate a position where the first portion is rendered on the display screen of the display associated with the user device.

In yet another general aspect, a computer program is stored in a storage device for manipulating displayed content of a web page by a user device, the computer program comprises instructions configured to cause a processing device of a user device to: receive a boundary defined by a user surrounding a portion of dynamic web content of a web page displayed within a window of a browser presenting the web page; determine an area of the web page within the user defined boundary; and present the web page in a display screen of a display associated with the user device by rendering only the dynamic web content of the web page located within the determined area of the web page.

The computer program may be configured as a plug-in for an Internet browser implemented by the user device.

The computer program may further comprise instructions configured to cause the processing device to implement an Internet browser.

The computer program also may further comprise instructions configured to cause the processing device to maintain a link between the user device and a host device providing the web page corresponding to the rendered dynamic web content.

The computer program also may further comprise instructions to cause the processing device to periodically or continuously render an updated or live content of the web page corresponding to the determined area of the web page in the display screen based on the link.

The computer program also may further comprise instructions to cause the processing device to associate a visible attribute with the rendered dynamic web content of the web page wherein the visible attribute is configured to manipulate the rendered dynamic web content within the display screen according to a user input.

The visible attribute may be a chiclet presenting a Favicon or a logo associated with the web page.

The computer program also may further comprise instructions to cause the processing device to associate a visible attribute with the rendered dynamic web content of the web page, display the attribute in proximity to the rendered dynamic web content of the web page, and provide functions to a user configured manipulate the rendered dynamic web content of the web page within the display screen of the display associated with the user device.

The computer program also may further comprise instructions to cause the processing device to provide a menu in association with the visible attribute, wherein the menu includes one or more inputs configured to toggle between presenting only the rendered dynamic web content and a browser window presenting the rendered dynamic web content of the web page and additional content of the web page contiguous to the rendered content within in the browser window.

The visible attribute may be a handle associated with the rendered dynamic web content and the computer program further comprises instructions configured to cause the processing device to receive a user input associated with the visible attribute; and manipulate the rendered dynamic web content within the display screen of the display associated with the user device.

The instructions configured to cause a processor to determine an area of the web page within the user defined boundary may further comprise instructions configured to cause the processor to determine coordinates associated with the location of the user defined boundary within the web page.

The computer program also may further comprise instructions to cause the processing device in response to user input to toggle between presenting the visible attribute and the rendered dynamic web content and presenting only the visible attribute without rendering the dynamic web content.

In yet another general aspect, a method for manipulating the display of content of a web page by a computer tool of a user device comprises: receiving a boundary defined by a user surrounding a portion of dynamic web content of a web page displayed within a window of a browser presenting the web page; determining an area of the web page within the user defined boundary; and presenting the web page in a display screen of a display associated with the user device by rendering only the dynamic web content of the web page located within the determined area of the web page.

The computer tool may be configured as a plug-in for an Internet browser implemented by the user device or as an Internet browser.

The method may further comprise periodically or continuously rendering an updated or live content of the web page corresponding to the determined area of the web page in the display screen.

The method also may further comprise receiving another boundary defined by the user surrounding another portion of dynamic web content of another web page displayed within a window of a browser presenting the another web page; determining another area of the another web page within the another user defined boundary; and presenting the another web page within the display screen of the display associated with the user device by rendering only the dynamic web content of the another web page corresponding to the another determined area of the another web page simultaneously with the presenting of the web page rendering only the dynamic web content of the web page located within the determined area of the web page.

The method also may further comprise associating a visible attribute with the rendered dynamic web content of the web page configured to manipulate the rendered dynamic web content within the display screen according to a user input. The visible attribute may be a chiclet presenting a Favicon or a logo associated with the web page.

The method also may further comprise associating a visible attribute with the rendered dynamic web content of the web page, displaying the visible attribute in proximity to the rendered dynamic web content of the web page, and providing functions to a user configured to manipulate the rendered dynamic content of the web page within the display screen of the display associated with the user device.

The method also may further comprise providing a menu in association with the visible attribute, wherein the menu provides one or more inputs configured to toggle between presenting only the rendered dynamic content and a browser window presenting the rendered dynamic content of the web page and additional content of the web page contiguous to the rendered content within in the browser window.

The visible attribute may be a handle associated with the rendered dynamic interactive content and the method further comprises receiving a user input associated with the visible attribute; and manipulating the rendered dynamic interactive content within the display screen of the display associated with the user device.

Determining an area of the web page within the user defined boundary may further comprise determining coordinates associated with the location of the user defined boundary within the web page.

The method also may further comprise toggling between presenting the visible attribute in proximity to the rendered dynamic web content and presenting only the visible attribute without rendering the dynamic web content.

In yet another general aspect, a method for manipulating the display of content of a web page by a computer tool of a user device comprises: presenting the webpage in a browser window; receiving an indication of a boundary defined by a user within the browser window surrounding a portion of dynamic web content of a web page displayed; determining an area of the web page within the user defined boundary; and folding the browser window to a window sized to render substantially only the dynamic web content of the web page corresponding to the determined area of the web page.

The method may further comprises unfolding the browser window from the window sized to render substantially only the dynamic web content of the web page corresponding to the determined area of the web page to a larger browser window presenting the rendered dynamic content of the web page and additional content of the web page contiguous to the rendered content within in the larger browser window.

The method also may further comprise displaying a visible attribute in proximity to the folded browser window configured to manipulate the folded browser window.

The method also may further comprise further folding the folded browser window to present only the visible attribute.

The method also may further comprise toggling, in response to user input, between unfolding the further folded browser window to present the visible attribute and the folded browser window and further folding the folded browser window to present only the visible attribute.

In yet another general aspect, a computer program is stored in a storage device for manipulating display of content of a web page by a user device, the computer program comprises instructions configured to cause a processing device of a user device to: present the webpage in a browser window; receive an indication of a boundary defined by a user within the browser window surrounding a portion of dynamic web content of the web page; determine an area of the web page within the user defined boundary; and fold the browser window to a window sized to render substantially only the dynamic web content of the web page corresponding to the determined area of the web page.

The details of various embodiments are set forth in the accompanying drawings and the description below. Other features and advantages will be apparent from the following description, the drawings, and the claims.

DETAILED DESCRIPTION

The following description provides a computer tool for a web content interface, a Universal Content Referencing, Packaging, Distribution System, and a Widget Generator provided on a desktop environment of a computer system. The computer tool may be implemented as or incorporated into a special browser, as a plug-in to an existing browser, a web button, or as a widget to provide access to and manipulation of user selected content provided by a web page. The tool also may be used to build one or more customized user interfaces on a computer system that present, manipulate, publish, and share user selected and/or customized web content.

Figure 1:
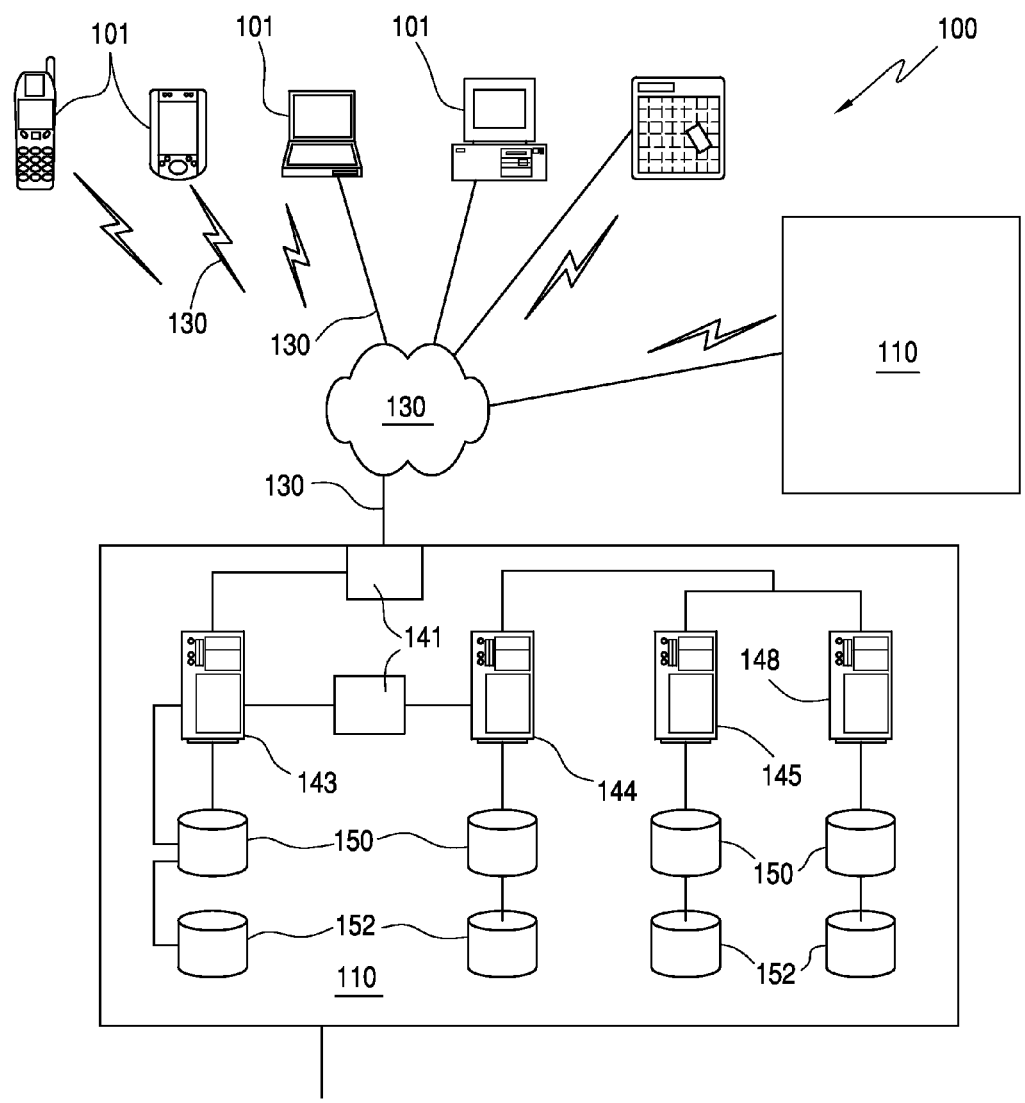
FIG. 1 is an exemplary computer system for implementing a computer tool.

The computer tool is implemented by a computer or computer system. FIG. 1 shows one block diagram of an exemplary communications system 100. The communications system 100 includes one or more user devices 101, a service provider system 110, other Internet Service Providers and websites 120, system partners 125, and various communication paths 130. As the communications system 100 is device and source agnostic, the communications system 100 is designed to work with any web-accessible user device, as explained in further detail below.

The computer or computer system may be any type of electronic device that presents or renders content, such as a web page, received from the Internet or World Wide Web. For example, the computer system may be a consumer electronics device, a mobile phone, a smart phone, a personal data assistant, a digital tablet/pad computer, a hand held/mobile computer, a personal computer, a notebook computer, a work station, a vehicle computer, a game system, a set-top-box, or any other device that can implement a user interface and/or browser to communicate with and present content from the Internet or World Wide Web.

Figure 2:
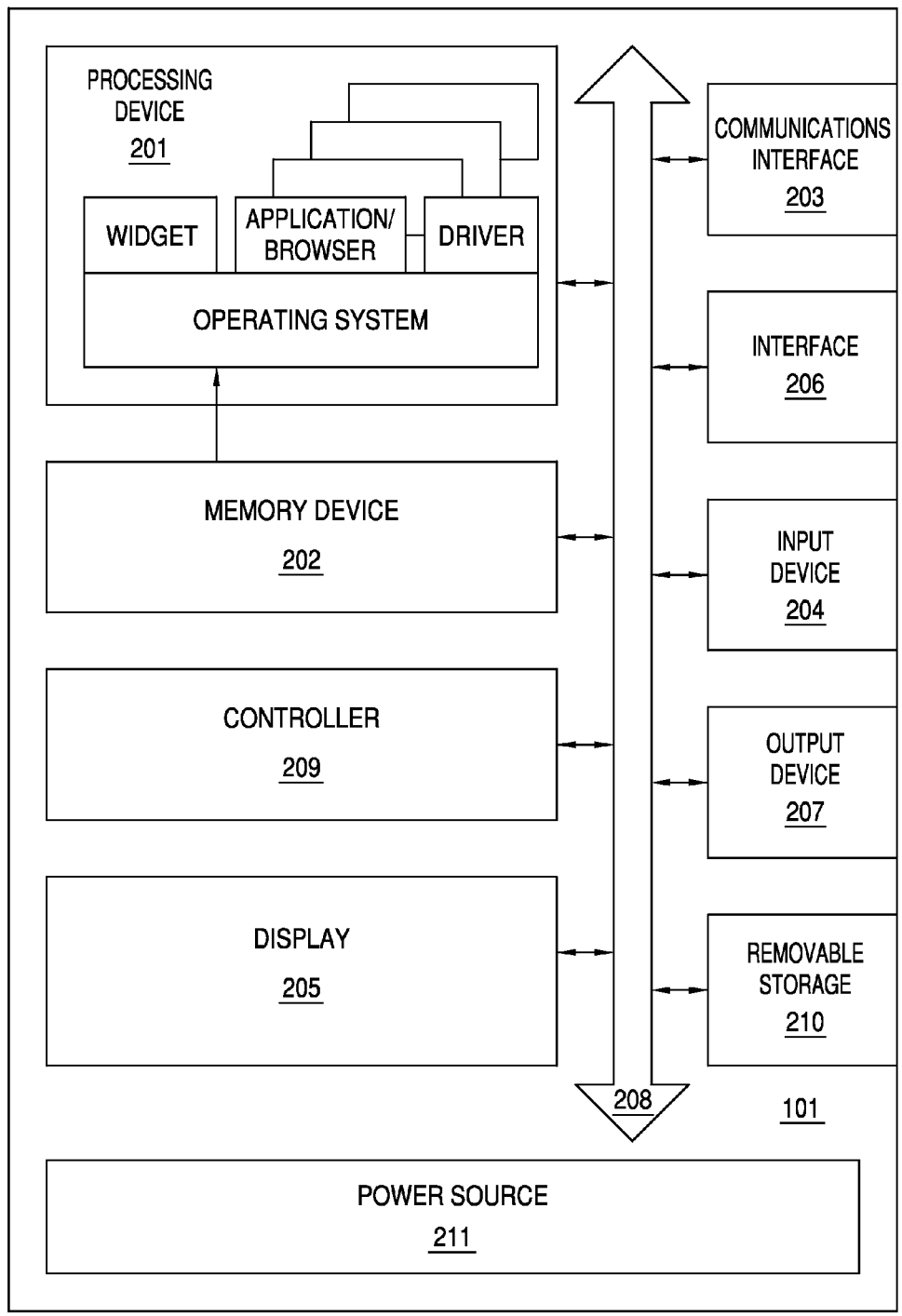
FIG. 2 is an exemplary computer device for implementing the computer tool.

One example of a computer system is shown in FIG. 2; however, it will be appreciated that this device is only exemplary and that any number of, types of, or configurations of different components and software may be incorporated into or omitted from the computer system. For example, the computer system may include a number of components including one or more of the following: one or more processing devices 201, one or more storage devices 202, and one or more communications interfaces 203. A user device 101 also may include additional elements, such as input devices 204 (e.g., one or more displays or screens 204 or keyboard, key pad, mouse, pointer, touch screen 205, microphone 206, etc.), one or more output devices (e.g., speakers 207), one or more communications buses 208, controllers 209, removable storage devices 210, and at least one power source 211. Additional elements not shown may include a digital camera, an optical reader (e.g., a bar code scanner or infrared scanner), and antennas. A user device 101 also may include one or more associated peripheral devices (not shown), such as, for example, a display, a memory, a printer, an input device, an output device, and speakers.

The processing device 201 may be implemented using any general-purpose or special purpose computer, such as, for example, a processor, a controller and ALU, a digital signal processor, a microcomputer, a field programmable array, a programmable logic unit, a microprocessor or any other device capable of responding to and executing instructions in a defined manner. The processing device may run an operating system (OS) and one or more software applications that run on the OS including applications that communicate with content provider systems 110 and present content received from the content provider systems 110 to the user. The processing device also may access, store, manipulate, process, and create data in response to the applications.

The software applications may include a computer program, a piece of code, an instruction, or some combination thereof, for independently or collectively instructing the processing device to operate as desired. Examples of software applications include: an operating system, drivers to control and/or operate various components of the user device (e.g., display, communications interface, input/output devices, etc.) a browser, a mini browser, scripts, a widget, or other programs that interact with the content provider systems to provide content and a user interface for presenting the content, among other features. Other browser based tools and plug-in applications also may be used, such as Java, Acrobat Reader, QuickTime, or Windows Media Player, and a Flash Player (e.g., Adobe or Macromedia Flash). The applications may be resident in the processing device or loaded from a storage device. Once the applications, such as a browser, are loaded in or executed by the processing device, the processing device becomes a specific machine or apparatus configured to provide a user interface to render and provide content of the content provider system. That is to say a processing device programmed in a certain way is physically different from the machine without that program and its memory elements are differently arranged.

The software, applications, content, and data may be embodied permanently or temporarily in any type of machine, component, physical or virtual equipment, storage medium or device, or a propagated signal wave capable of providing instructions or data to or being interpreted by the processing device. In particular, the applications or data may be stored by one or more storage media, memories, or storage devices 202, 210 including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, an SRAM, DRAM, PROM, EPROM, OPTROM, EEPROM, NOVRAM, or RAMBUS), such that if the memory is read or accessed by the processing device, the specified steps, processes, and/or instructions are performed and/or data is accessed, processed, and/or stored. The memory may include an I/O interface, such that data and applications may be loaded and stored in the memory allowing the applications, programming, and data to be updated, deleted, changed, augmented, or otherwise manipulated. The memory may be removable, such as, for example, a card, a stick, or a disk that is inserted in or removed from the user device.

The communications interface 203 may exchange data and content with the content provider system 110 using various communications paths 130. The interface allows the processing device to send and receive information using the communications paths 130. The communications interface may be implemented as part of the processing device or separately to allow the processing device to communicate using the communications paths 130. The communications interface may include two or more types of interfaces, including interfaces for different types of hardware and/or software to interact with different types of communications media and protocols and to translate information/data into a format that may be used by the processing device. Similarly, the interface may translate information/data received from the processing device to a format that may be transmitted to the service provider system 110 via a communications path 130.

The communications paths 130 may be configured to send and receive signals (e.g., electrical, electromagnetic, or optical) that convey or carry data streams representing various types of analog and/or digital data including content for presentation to a user. For example, the communications paths 130 may be implemented using various communications media and one or more networks comprising one or more network devices (e.g., network interface cards, fiber media converter, servers, routers, switches, hubs, bridges, repeaters, blades, processors, and storage devices). The one or more networks may include a local area network (LAN), a wide area network (WAN), Ethernet, a global area network (GAN), a plain old telephone service (POTS) network, a digital subscriber line (DSL) network, an integrated services digital network (ISDN), a synchronous optical network (SONNET)/SDH, Passive and Active Optical Networks (PON or AON), a packet switched network, V.92 telephone network modems, IRDA, USB, Firewire, EIA RS-232, EIA-422, EIA-423, RS-449, RS-485, ITU, T1 and other T-carrier links, and E1 and other E-carrier links, varieties of 802.11, GSM Um radio interface, Bluetooth, IEEE 802.11x Wi-Fi, TransferJet, Etherloop, ARINC 818 Avionics Digital Video Bus, G.hn/G.9960, or a combination of two or more of these networks.

In addition, the communications paths 130 may include one or more wireless links (e.g., microwave, radio, and satellite) that transmit and receive electromagnetic signals, such as, for example, radio frequency, infrared, and microwave signals, to convey information/data signal using any one of a number of communications protocols, for example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G, and IEEE 802.11 standards such as Wi-Fi or WLAN. In one example, a communications path 130 may include the Internet or World Wide Web.

Data and content may be exchanged between the content provider system 110 and the user device 101 through the communication interface and communication paths using any one of a number of communications protocols. In particular, data may be exchanged using a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol defines addressing methods and structures for datagram encapsulation. Examples of an Internet protocol include Internet Protocol Version 4 (IPv4) and Internet Protocol Version 6 (IPv6).

The computer tool may be used to access, render, and present content, such a web pages and their associated content that are provided by content provider systems 110. The content provider system 110 facilitates access to, organization of, and presentation of content to users in addition to providing many services. The content provider system 110 may store and manage content, such as web pages and websites in a location that is centralized from the perspective of the user. The central location may be one physical location, such as a room, building, or campus providing the hardware components of the system. However, in reality the central location may be virtual where services and content are accessed from and data is stored over a number of distributed systems and/or locations. In other words, although the content provider systems are shown in FIG. 1 as being a single entity, other configurations wherein the applications, services, content, and data are distributed both in terms of devices and geographical location are within the meaning of the system service provider.

The content provider system may includes one or more communications devices, processors, memories/storage devices, communications interfaces, network devices, and communications paths to store, process, manipulate, organize, consolidate, maintain, and present communications, content, and data for a user. Descriptions of communications devices, processors, memories/storage devices, software, communications interfaces, network devices, and communications paths are all described above, and so are not repeated again here.

In one example, the content provider system 110 may include a one or more security devices 141 (e.g., firewalls), web servers 142, an application server 144, an SQL server, MySQL server, or another database system, 145 and a mirror servers 148, and associated memory 150 and backup memory devices 152. It is understood, however, that the example given in FIG. 1 is for illustrative purposes only, and that different configurations, combinations of devices, and numbers of devices may be provided for any particular content provider system 110. For example, a cloud architecture also may be used to implement a content provider system 110, as described below. In addition, although only one of each server (e.g., 143, 144, 145, and 148) and associate memories 150 and 152 are shown, it will be appreciated that in actual implementation there may be banks of a number of these machines as necessary to handle the number of users, data, and traffic that a particular implementation of a service provider system 110 handles.

Although, one configuration is shown in FIG. 1, others may be used. For example, other types of hardware may be used, such as various types of computer (e.g., a PC or a Macintosh) featuring any of various processors (e.g., an Intel Core, Pentium, Celeron, Server or Workstation processors) running any of several operating systems (e.g., Windows, Mac OS X, Unix, or Linux). In addition, languages such as HTML, XML, ASP, Ajax, CSS, and various other protocols may be used to link the browser and its programming using JavaScript.

In another example, the content provider system may be hosted utilizing an accelerated cloud infrastructure. A cloud processing network includes a virtualizer network of accelerators for virtual servers. The virtualizer utilizes a Storage Domain Servers (SDS), network switchers, and a Storage Area Network (SAN) to provide a variety of server capacity and functionality that is emulated and provided as a load-balanced resource. The network is connected to various servers and their corresponding data storage and databases of one or more content providers allowing easy access to many different servers having multiple operating systems (e.g., Unix, Linux, Windows, Mac OS, Backup). As a result, a variety of server operating systems and capacity may be provided to the end user of the user devices 101. The cloud processing network may be part of the content provider system 110 or hosted by a third party.

The accelerators provide virtualized servers (8+ cores, 32+GB RAM) with vast amounts of NAS storage. The accelerators are deployed within the cloud of a fast networking and routing fabric (e.g., Force 10), and efficient hardware load balancers (e.g., F5 Networks). Various applications, such as Apache, Nginx, MySQL, PHP, Ruby on Rails, and JAVA are preinstalled.

The Accelerators use full root access to provide control of setup and security configurations. The configuration provides accelerators that deliver massive scalability, both vertical and horizontal. For example, on the vertical scale the accelerators come in sizes ranging from ¼ GB of Ram up to 32 GB of RAM. On the horizontal scale, application-layer accelerators may be added that use hardware load balancing to support potentially hundreds of nodes.

The computer tool may be implemented by a computer or computer system as a special browser, a plug-in to a browser, or as a widget. In particular, the computer tool is used to access, render, and present a web page. In addition, the computer tool may provide additional functionality, such as selecting a portion of a web page, manipulation of selected content, and sharing of content, in particular web content, such a content provided by a web page.

A web page provides content or resource of information that is suitable for the World Wide Web. Typically a web page is accessed through a web browser running on a computer which renders the content for presentation to a user. The content is typically provided in an HTML or XHTML format and may provide navigation to other web pages via hypertext links.

A web page may be retrieved from a local computer or from a remote web server. The web server may restrict access or publish the web page on the World Wide Web. A web page is requested and served from a web server using Hypertext Transfer Protocol (HTTP), for example, by a content provider system.

Web pages may consist of files of static text stored within a web server's file system (e.g., a static web page), or a web server may construct the (X)HTML for each web page when the web page is requested by a browser (e.g., a dynamic web page). Web browsers may provide additional tools and plugins, such as scripting to make web pages more responsive to user input once the web page is rendered by the client browser.

Web pages typically include information that tells the browser how to render the content for presentation to the user. For example, the information may include colors of text and backgrounds and very often also contain links to images and other media that are to be rendered in the final presentation to a user. Typically, the information may include layout, typographic, and color-scheme information that is provided by Cascading Style Sheet (CSS) instructions. The instruction may be embedded in the HTML of the web page or may be provided by a separate file that is referenced by the HTML of the web page. The latter case is especially relevant where one lengthy stylesheet is relevant to a whole website: due to the way HTTP works, the browser will only download it once from the web server and use the cached copy for the whole site.

Images are stored on the web server as separate files; however, HTTP make provisions to provide related files, such as images and style sheets requested by the browser as it processes the web page. For example, an HTTP 1.1 web server maintains a connection with the client browser until all resources related to the web page have been requested and provided. Web browsers usually render images along with the text and other material on the displayed webpage.

Client-side computer code such as JavaScript or code implementing Ajax techniques may be embedded in the HTML of a webpage or, like CSS stylesheets, they may be provided as separate linked downloads specified in the HTML. Scripts run on the client computer, if the user allows them to, and can provide additional functionality for the user after the page has downloaded.

A web browser may provide a Graphical User Interface, like Internet Explorer, Mozilla Firefox and Opera, or the web browser may be text-based, like Lynx.

A web page includes content as an information set, may include numerous types of information that is presented to a user. For example, the web page may include information that is able to be seen, heard, or otherwise interact with the end user. Information may include: textual information with diverse render variations and non-textual information. Non-textual information may include: static images on raster graphics, typically GIF, JPEG or PNG; or vector formats as SVG or Flash; animated images typically Animated GIF and SVG, but also may be Flash, Shockwave, or Java applet; audio, typically MIDI or WAV formats or Java applets; video, WMV (Windows), RM (Real Media), FLU (Flash Video), MPG, MOV (Quicktime). The web page may include interactive information that is more complex that is glued to interface as provided by dynamic web pages.

Web page may provide for "on page" interaction, such as interactive text (e.g., DHTML); interactive illustrations (e.g., "click to play" image to games, typically using script orchestration, Flash, Java applets, SVG, or Shockwave); buttons (e.g., forms providing alternative interface, typically for use with script orchestration and DHTML) "between pages" interaction (e.g., hyperlinks: standard "change page" reactivity); forms providing more interaction with the server and server-side databases.

The web page also may include internal or hidden information, such as comments; metadata with semantic meta-information, charset information, Document Type Definition (DTD), diagramation and style information (e.g., information about rendered items, such as image size attributes, and visual specifications, such as Cascading Style Sheets (CSS).

The webpage also may include dynamically adapted information elements that depend on the rendering browser or end-user location (e.g., through the use of IP address tracking and/or "cookie" information).

Some information (grouped) elements, such as a navigation bar may be uniform for all website pages, like a standard. This kind of "website standard information" is supplied by technologies like web template systems.

A website is a number of web pages are stored in a common directory of a web server. A website typically includes a group of web pages that are linked together, or have some other coherent method of navigation. The website includes an index page. Depending on the web server settings, the index page may have many different names, but the most common is index.html. When a browser visits the homepage for a website, or any URL pointing to a directory rather than a specific file, the web server serves the index page to the requesting browser. If no index page is defined in the configuration, or no such file exists on the server, either an error or directory listing is served to the browser.

Many modern web pages often require more screen space for all the content that is associated therewith than is available for a particular display resolution. Most conventional browsers provide an interface to control or manipulate the information that is presented. For example, some conventional browsers place scrollbars (e.g., a bar at the side and/or bottom of the screen) that allows the user to position the window to allow the user to see access all the content associated with the web page. However, conventional browsers are limited in the presentation of content. For example, a conventional browser generally provides a rectangular window which displays a portion of the web page to a user. A user interface may be used to manipulate or move the window relative to the content of the rendered web page. While a user may generally maximize or adjust the size of the window that presents the content, the window may still not display all of the content associated with the web page.

In addition, modern web pages provide such a large amount of content, that the user may only be interested in a particular portion of the web page that has the desired content. While conventional browsers allow users to bookmark a page to easily return to a desired page in the future, every time the user accesses the web page, the user must still navigate the window back to the desired content. In addition, when trying to share content with another user, the user may cut and paste a URL in an email to the web page must provide a special provision to email particular pre-specified content after receiving a user input.

The novel computer tool describe herein permits a user to select portions of content from a web page and display the selected content on the desktop or computer screen/display. The computer tool also may be used organize, manipulate and share the selected content. The compute tool also can be used to display content from multiple web pages simultaneously on the computer screen. The computer tool allows the content to be identified using different layers allowing a user to easily move between layers, rearrange the sequencing of layers, switch between display of only the selected content of the web page, the selected content within an expanded browser, or display of the selected content and the remainder of the content of the web page that may be displayed by the browser (e.g., similar to a viewing of a web page by a conventional browser). Because the content presented by the computer tool is the "live" content from the web page, the user may set a refresh rate for updating the selected content that is rendered on the user's screen. The computer tool may be implemented as an Internet browser, as a browser operating within a browser, as a browser associated with another browser, as a browser plug-in or tool, as a web button, or as a tool embedded in a webpage, and as a widget.

In order to interact with a content provider system 110 and access content a user needs to establish a connection or link between the content service provider 110 and a user device or computer. The user accesses the content using the computer tool which of the user device or computer 101 running an application allowing the user device 101 to communicate with the content provider system 110. In one example, the computer tool may implement a browser running on the computer. The browser may include any application that communicates with a web server primarily using hypertext transfer protocols HTTP (e.g., HTTP/1.1) along with various plug-ins and tools to fetch, present, manipulate, and interact with content and/or provide access to services provided by the content provider system 110. HTTP allows the browser to submit information to servers in addition to fetching content from them. Content may be located by the browser using a uniform resource locator (URL) as an address. Many browsers also support a variety of other URL types and their corresponding protocols, such as Gopher (a hierarchical hyperlinking protocol), file transfer protocol (FTP), real-time streaming protocol (RTSP), and an SSL encrypted version of HTTP (HTTPS). Content may be provided in a hyper-text markup language (HTML) that is identified using a MIME content type. The browser may support a variety of formats in addition to HTML, such as the JPEG, PNG, and GIF image formats, and can be extended to support additional formats through the use of plugins and/or scripts. The combination of HTTP content type and URL protocol specification allows images, animations, video, sound, and streaming media to be embedded in the content. Various plug-ins and tools, such as Java, Acrobat Reader, Quick-Time, or Windows Media Player, and a Flash Player (e.g., Adobe or Macromedia Flash).

In another embodiment, the computer tool may be a plug-in to the browser or a browser that runs in, with, or in addition to the primary browser. In yet another embodiment, the computer tool may be implemented using a resident program or application (e.g., on a desktop of the user device) called a Widget to access content, interact with a browser application, and manipulate content. The widget may be a implemented using well designed widget application, such as a Windows Vista gadget, a Windows XP running task (taskbar icon), or a Macintosh widget, among others. The widget also may open the user interface to provide content from the content provider system. For example, if the user selects a portion of the widget, the widget may launch a browser or otherwise provide a connection between the content provider system and the user device to provide the user selected content.

The computer tool provides a primary point of interaction between the user and the content provided by the content provider system 110. The web server 143 provides content and services to the user through the browser operating on the user device 101. The user device 101 establishes a connection with a web server 143 of the service provider system 110 using a communications path 130. After the connection is established, the primary interface of the computer tool is presented as screen rendered by a browser on a display of the user device 101. The screen may present a webpage provided by the web server 143 that is supplemented by additional programs, applications, and plugins operating on the user device.

The user interface of the computer tool provides electronic content generated by the applications, servers, and databases of a content provider system 110. The once the use device 101 establishes a link with the content provider system 110, the user device 101 and system 110 exchange data. Data may be transmitted from the system 110 to the browser in a markup language used by a client application, browser resident, or computer tool running on the user device 101 and its operating system to render the page in the user interface screen. Data also is transmitted from the user device 101 to the system 110 to provide indications of user interaction with the user interface (e.g., accessing a hyperlink to another web page or providing a credit card number for payment). The data sent to the user device may be in any markup language that may be interpreted by the client application, browser, or computer tool running on the user device the webpage provided by the user interface using the hypertext markup language (HTML), the JavaScript programming language, Cascading Style Sheets (CSS) and/or the eXtensible Markup Language (XML).

In one example, data may be transferred between the service and the user device using an HTML and/or XML format to render the page. The user interface may include one or more areas, portions, boxes, windows, scroll/slider bars, tools, menus, buttons, and tabs. The functionality of the user interface may be accessed or activated through use of one or more user inputs of the user device 101. For example, items and content on the screen may be selected and manipulated using one or more screen position indicators or visual effects (e.g., a pointer, a cursor, a highlighting, a transparency, a color, an animation, or an effect) controlled by one or more user input devices (e.g., a key, a keyboard/pad, a touch screen/pad, a mouse, a joystick, a track ball, and a stylus) as is common in graphical user interfaces (e.g., a pointer controlled by a mouse to click and double-click to activate, select, and drag items within a window, browser, or desktop environment).

In most cases, items may be selected, clicked, or tapped to designate, activate, or provide some functionality. The following description makes reference to mouse clicking, such as right mouse clicking or left mouse clicking. For consistency this terminology is used throughout the following examples; however, one skilled in the art will appreciate that this is only one example of implementing a user selection and input within a browser or a computer tool. Other methods may be used with different interfaces, such as tapping with a finger or stylus on a touch screen. In addition, different combinations of inputs may be arranged as desired (e.g., single selection or double selection) to instruct the computer to active different functionalities or act in a desired manner.

The following examples are described for a computer tool implemented with a browser application.

Figure 3:
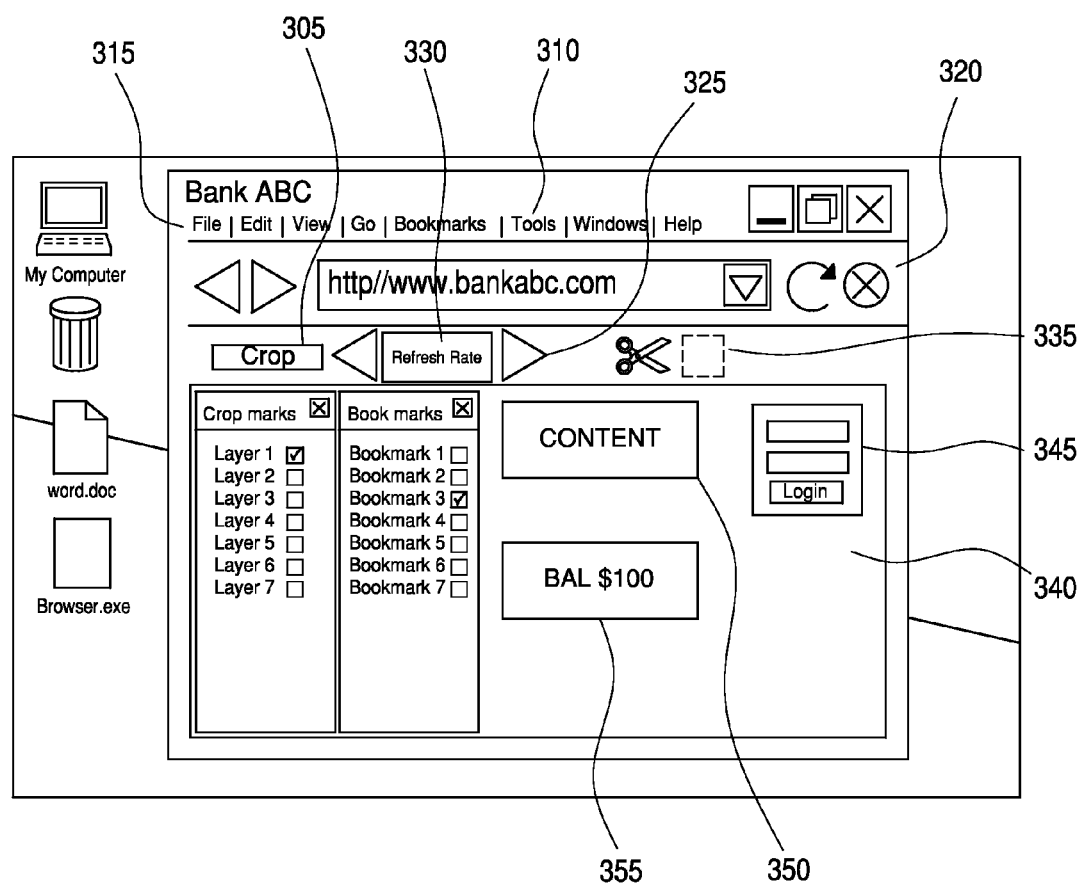
FIG. 3 is an example of a screenshot of the computer tool implemented as a web browser.

Referring to FIG. 3, when the computer tool 305 is implemented as a web browser 10, it may be a combination of known, conventional functionalities and the novel functions associated with the computer tool. In one example, the web browser may include a tool bar 315 with common tool bar functions having drop down menus, such as File, Edit, View, Go, Bookmarks, Tools, Window, Help, among other. The web browser 10 also may include a navigation tool bar 320 having conventional buttons for refreshing the screen, entering a URL address, moving forward and backward through WebPages, searching, printing, and the like. The web browser 310 also may include buttons to perform operations associated with the computer tool. For example, the browser 310 may include one or more buttons 325 or devices 325 that permit the user to create and delete layers, hide and show layers, move between layers, re-arrange, re-order, re-stack or re-name the layers of content in addition to individual items of content. Also dragging and dropping between different layers or dragging and dropping layers form one browser window or into a different browser window, or into the different browser windows layer device is also supported.

One or more manual or automatic page refreshing controls 330 for setting the refresh rate for a particular item of content, or for a specific layer, all layers or individual items of coped content is provided. The browser may include one or more buttons 335 for selecting and displaying content from WebPages. These various buttons and functions may appear as toolbars and the like, associated with content on a typical webpage 340. For example, the webpage 340 may include a login portion 345, generic content 350 to the web publisher, and user-specific content 355 from the web publisher. If the webpage 340 is that of a user's bank, the login portion 345 is used by the user to login to the user's account, the generic content 350 may be standard information about the bank, and the user-specific content 355 may be the user's account balances, transactions, and the like.

A user of the computer tool implemented as a browser of the user device or computer may desire to create a personalized or custom display on the computer screen or desktop that simultaneously displays live content selected by the user from multiple web pages. For example, the user may wish to display information from multiple web pages that provide personal banking information, personal stock account information, a headline web page, a webcam, and a weather information web page. However, the computer tool allows a user to specify or select a particular user defined area of a web page for rendering or presentation. In one example, the remainder of the webpage is not presented. In addition, the computer tool allows the user to toggle between presenting 1) only the user defined area and 2) the user defined area plus the remainder. The computer tool may be used to simultaneously display multiple user defined areas of web pages either within a single browser or separately (e.g., on the desktop). As a result, the user is able to build customized interfaces that present only the content of a web page that is desired by the user.

Figure 4:
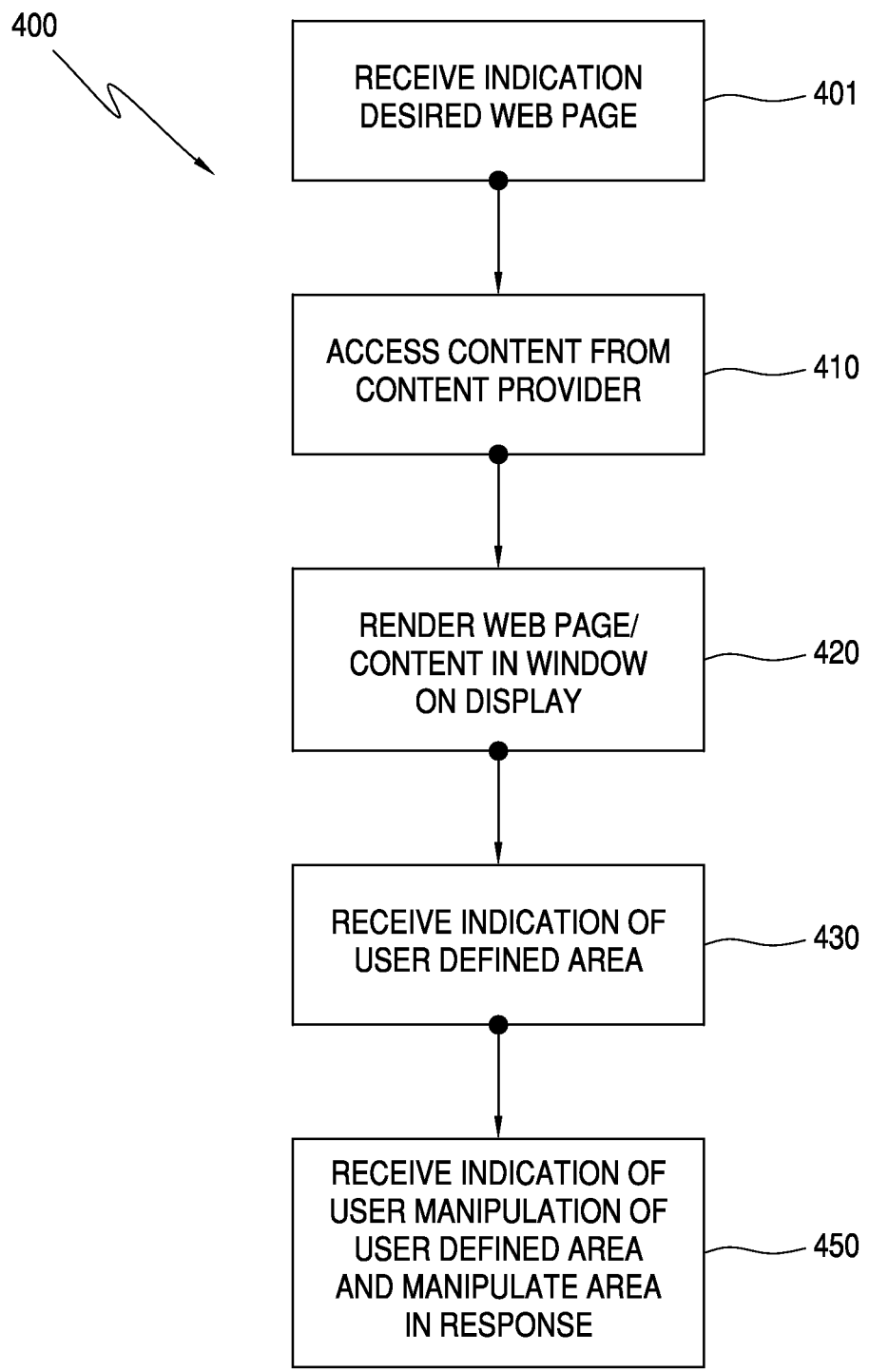
FIG. 4 is an exemplary flow chart depicting the steps for using the computer tool to select content for display.
Figure 5:
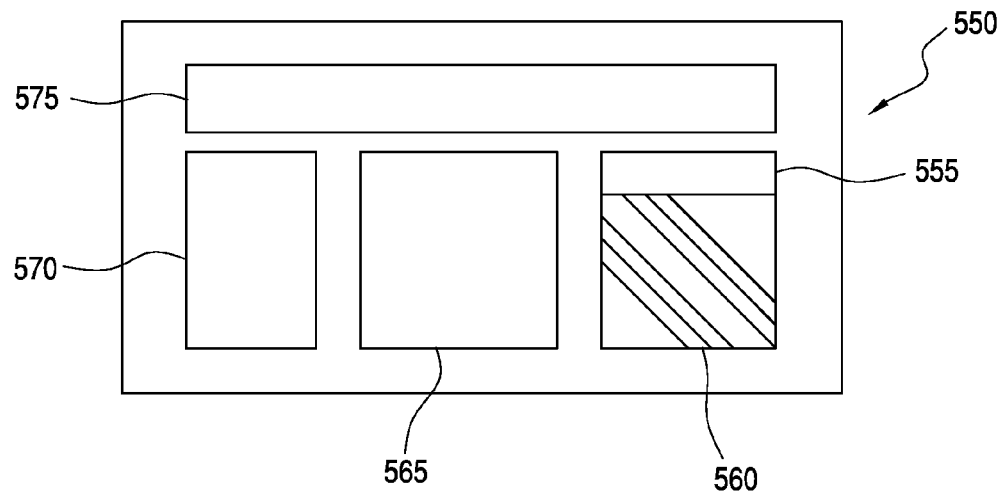
FIGS. 5 and 6 illustrate an example showing the selection of a portion of a web page.
Figure 6:
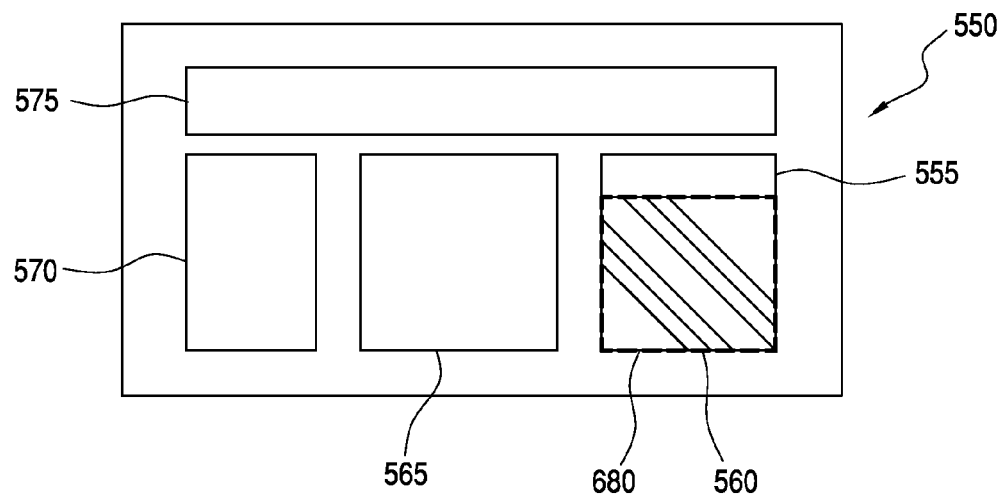
Figure 7:
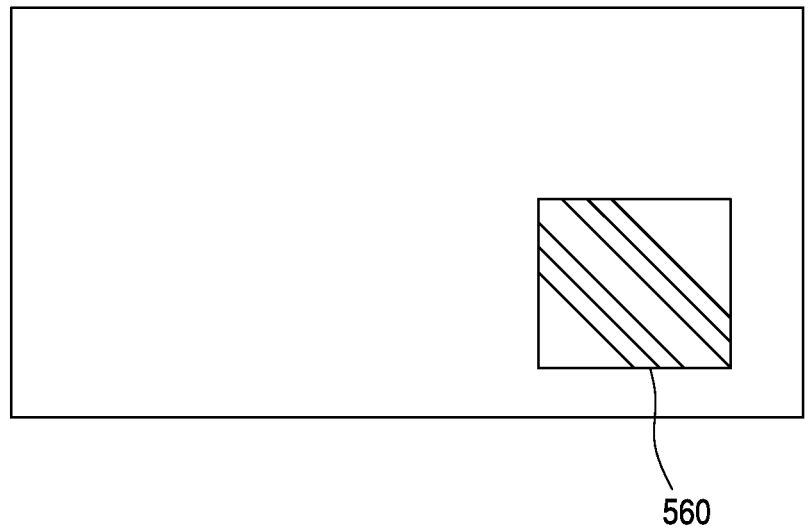
FIGS. 7 and 8 illustrate an example of the manipulation of content presented by the computer tool shown in FIG. 5.

Referring to FIG. 4, one exemplary process 400 of implementing the computer tool is provided. First the browser receives an indication of a desired web page from the user 401. The browser navigates to the indicated web content to access the content from the content service provider 410. In one example, the user would open the Internet Browser and navigate to a webpage of interest. The desired web page may be indicated by user using standard inputs, such as receiving typed, entered, or otherwise indicated URL address a URL field of the browser, or a selection of a bookmark, a Favicon, a hyperlink, or any other manner of specifying a desired web page or web content. Once web page of interest is accessed, the browser renders the webpage on a display window of the browser 420. The browser then receives an indication of a user defined area within the web page selected by a user input 430. The user selects or defines the area within the web page using a variety of tools. For example, the browser may provide a user interface, such as a marquee select tool to define a rectangular area within the window of the browser presenting the page corresponding web page indicated by the marquee select tool. Such a marquee select tool is currently provided in many graphic software packages. Typically, the user moves a position indicator, such as a cursor or pointer to a point on the display using a user input device (e.g., a mouse), indicate a point in the display (e.g., right clicks and holds the mouse button), and selects the area (e.g., drags the pointer diagonally to create rectangle visually indicated, for example, by a dotted line). Of course other tools may be used. For example, the selection tool may be configured to allow the user to define areas using other shapes, such as square, circles, ellipses, triangles, and polygons, among others. In addition, a free style selection tool, such as a lasso or magic wand tool, may be provided to define areas of a webpage having more complex geometries, miscellaneous shapes, and or shapes with consistent colors characteristics.

Once the area is defined, the browser receives an indication that the user desires to manipulate the defined area of the webpage 450. The user may provide the indication using a user input device to select one or more inputs provided by the browser. In one example, the user manipulation folds or collapses the browser leaving only the selected area for presentation on the display of or associated with the user device. For example, the user may select a button on a tool bar or menu, much like the copy button found on Microsoft Word, Adobe Reader, Mozilla Firefox and other software programs that allow content to be captured. For example, the crop button can be expressed as a scissor function that causes the web browser to collapse, reduce in size, or fold upon itself to present only that user defined area on the screen of the desktop. In another example, the user may select a Favicon from the URL address field to cause the web browser to collapse, reduce in size, or fold upon itself to present only that user defined area on the screen of the desktop. In another example, the user may select an input, such as a minimize button from the title bar may be selected by the user to cause the web browser to collapse, reduce in size, or fold upon itself to present only that user defined area on the screen of the desktop. In another example, a button selected may cause the remainder of the webpage displayed in the browser window to disappear (or remain undisplayed). As a result, the user is able to view a personalized computer display and/or personalized web page display showing only the desired content as indicated by the user defined area.

Once the browser has received in an indication the user wishes to manipulate the defined content, the browser associates one or more attributes with the defined content 460. In one example, the browser displays a "chiclet" somewhere on the boarder of the defined area. The chiclet provides a handle that the user may interact with or select to manipulate the content and/or active functionality of the browser or computer tool. In one example, the chiclet may be a Favicon, a logo, or a user defined logo, a URL, or some combination of two or more of these. In one example, the user may repeatedly select the chiclet with a user input device to switch back and forth between 1) the expanded browser showing the defined content or the defined content plus the remainder of the web page rendered in the display window of the browser and 2) the collapsed or folded browser displaying only the defined content of the web page. In addition, the chiclet may be selected by a user input device to move the collapsed/folded browser displaying only the user defined content around the display screen of the user device 101, much like selecting the title bar of a window in the Window OS allows a user to move a display on the desktop. In another example, the user may select the chiclet to cause a menu or tool bar to appear to access additional functionality of the browser while the browser is collapsed or folded. For example, the user may maximize the browser, minimize the browser to a task bar, reduce the browser to just the chiclet (i.e., close the display of the user defined content to show only the chiclet on the display), close the browser to a file on the desktop, share the content (e.g., with a publish, an email, or an instant message function) or access some other user defined functionality that has been added to the menu or tool bar.

FIGS. 5-9 provide an example of one implementation of the specialized browser to manipulate and customize content from multiple webpage's on a display screen of a user device. First, referring still to FIG. 5, the user navigates to a webpage 550 with multiple areas of content 555, 560, 565, 570, 575. For example, consider a webpage 550 displaying a traffic camera display screen that provides real time display of traffic information along particular roads. Display area 560 may be the display of the traffic camera and display area 555 may be area of the screen for selecting an intersection of the road for displaying. A user may desire to select one intersection for display on their screen, for example, to determine the traffic conditions on the drive home before leaving work. The user actives the marquee or selection button of the browser to define an area 160 of the rendered portion of the web page presented by the browser. The selection or defining of the web content is indicated by the dashed lines 680 around area 560 of FIG. 5. With the area 560 defined the user next manipulates the area 560 for display. By selecting a fold tool button, the computer tool folds or collapse the browser leaving only the user defined portion of the page displayed. The display of the webpage following use of the fold button is illustrated in FIG. 57, which illustrates only the user defined portion 160 of the webpage is displayed.

Figure 8:
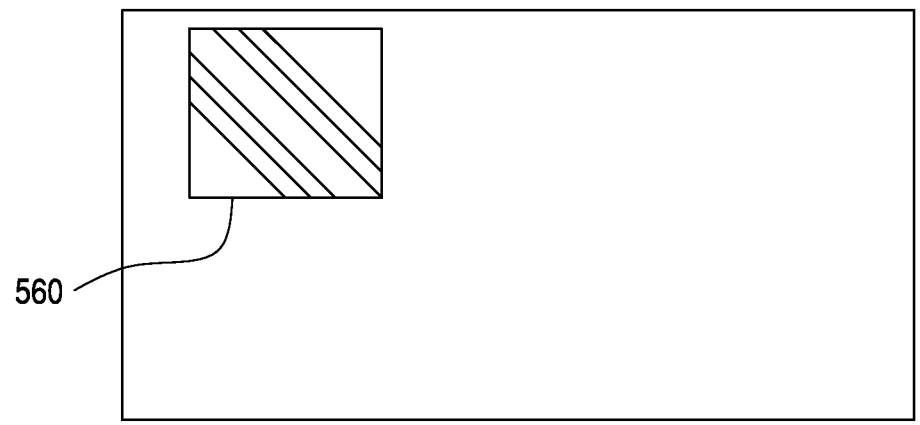
Figure 9:
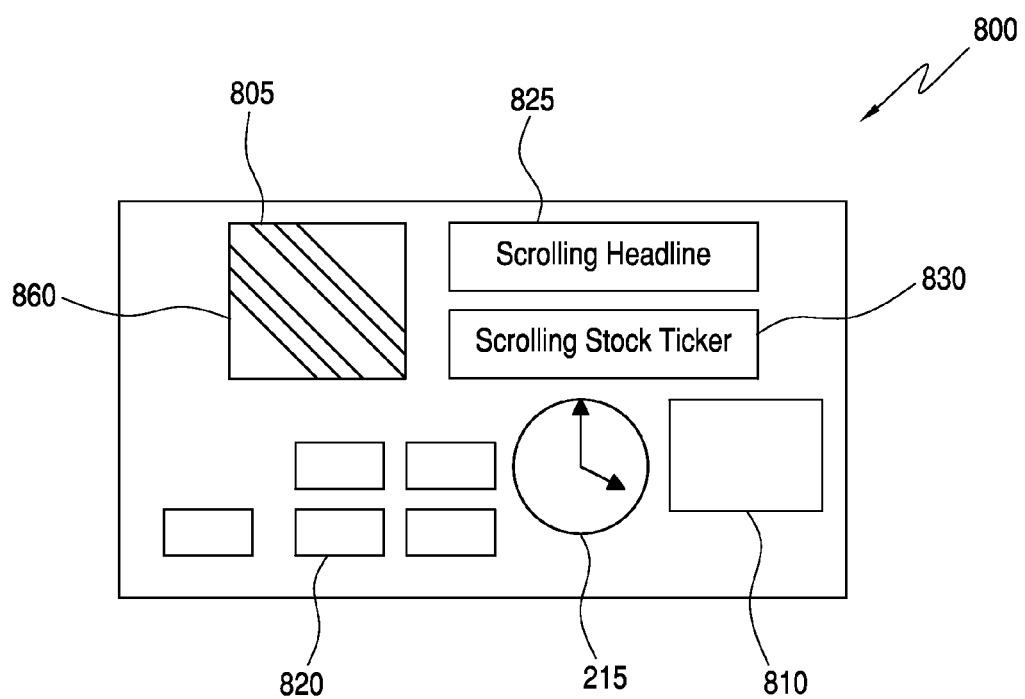
FIG. 9 illustrates an example of a screen shot of a desktop running on a computer having multiple portions of web pages displayed.
Figure 10:
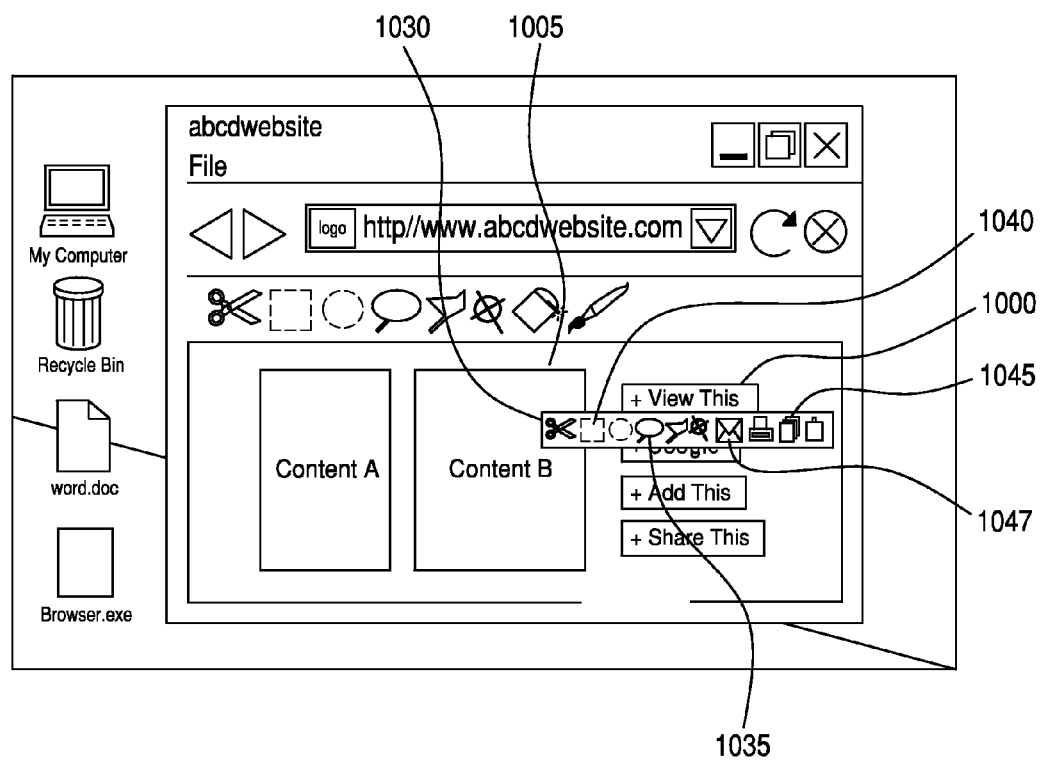
FIGS. 10 and 11 illustrate the use of the computer tool of FIG. 8 to select a portion of the display of the content of a web page.
Figure 11:
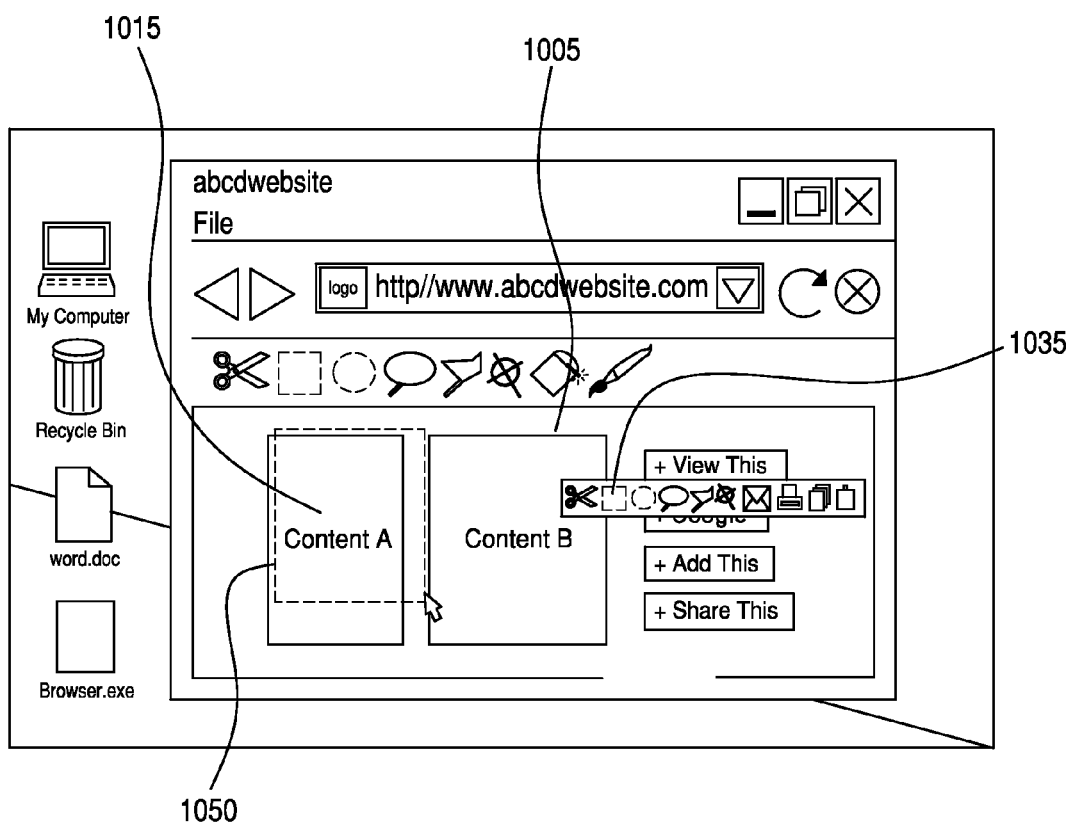
Figure 12:
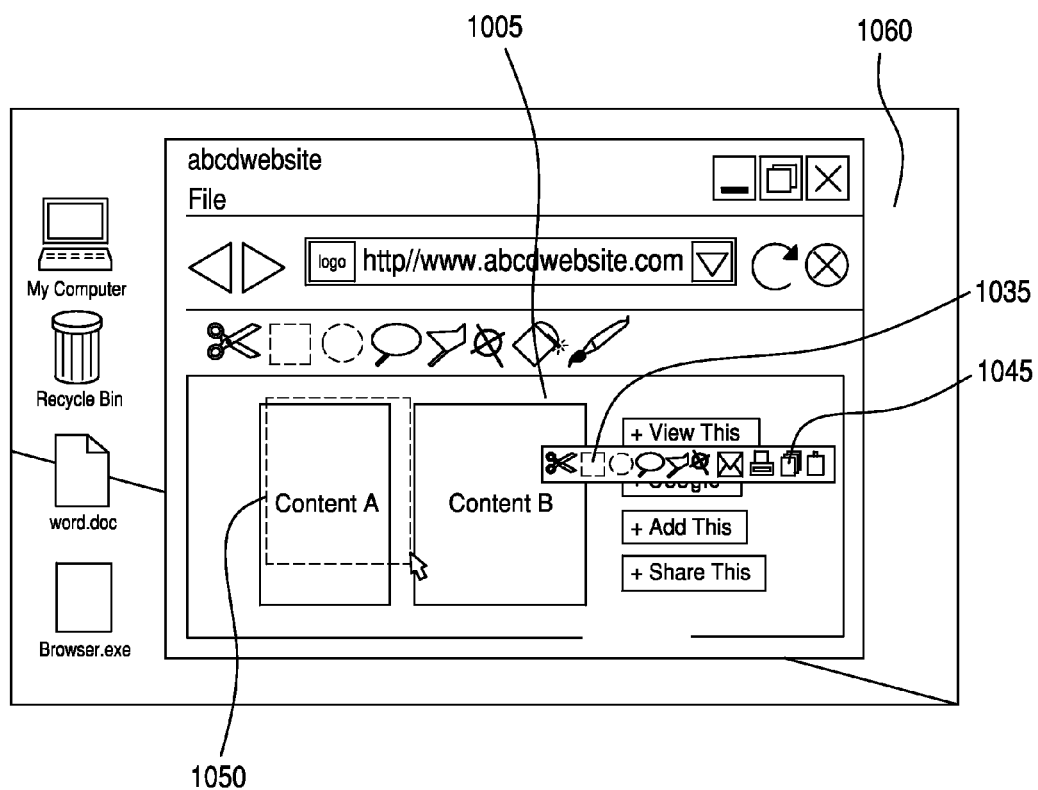
FIG. 12 illustrates an example of the presentation of the display of the selected content of the web page on a user's desk top.

Referring to FIG. 8, the user decides to manipulate the collapsed/folded browser displaying only the user defined area 560 from the lower right hand corner of the display screen to a different area of the display screen, such as the upper right hand corner of the display screen. The defined portion may be manipulated by selecting the displayed portion 160 using a user input device and move the displayed portion to the desire location on the display screen. In one example, this may be implemented using a drag a drop-and-drag function of the OS, desktop, or browser.

The examples of FIG. 9-12 illustrate the computer tools ability share the customized web content, whether the web content is shared by display on the user's desktop, shared or published via a content collection service, or shared by electronic communication, such as emailing or instant messaging the content to another user. When using the specialized browser, the browser may collect certain data each time a user defined portion is viewed, opened, or shared. For example, when the user saves the portion of the display to their desk top or personal start page, the data that is captured can be a unique URL that shows the display of the user defined portion of the display of the web page. The URL string may include an indicator of, the actual geometric area, or coordinates of the user defined portion of display of the web page by the browser such that the browser renders the same displayed portion of the web page each time a specific folded browser for the specific displayed portion is opened and viewed. The geometric area or coordinates of the displayed portion of the web page also may be included or stored in a "cookie" associated with the user defined portion. The cookie may be provided to a content provider system (e.g., a system that provide the computer tool as a plug in to the browser or that provide the specialized foldable browser) or the publisher of the web page, or to another user. The cookie may be a cookie and/or a session cookie. The cookie may or may not expire. The URL string or cookie also may include a user name, identification, information about the domain of the associated web page, among other information.

Each time the user activates the specialized browser to view and/or interact with the user defined portion 1150 of the display of the web page, the data may be provided to the browser provider, a third party data collection service, and/or the publisher of the web page, and/or another user. The browser provider and/or the publisher may be informed that the web page is being viewed and which portion of the page is being displayed. An e-mail address, username and/or password, may be required to use the described functionality. When e-mailing or sharing the user defined portion 1150 with another user, when the other user receives the user defined portion of the display of the web page, data associated with the other user also may be transfer to the browser provider and/or the publisher of the web page. Similarly, if the user defined portion of the display of the web page is shared with a content collection service, there also may be an optional transfer of data, or user information, to the browser provider, the content collection service, and/or the publisher of the web page.

The transfer of data indicating the user defined portion that is being presented to the user and/or shared with other user provides valuable information for web publishers and other companies. For example, the information is useful for marketing, advertisement, research, and other purposes, such as the arrangement and/or selection of what content should be provided on a web page and where the content should be provided on the web page. The information also is useful tracking user web browsing and behavior.

As described above, because one or both of the browser provider, a third party data collection service, and/or the web page publisher have the ability to determine what portion of the display or content of the web page is being rendered for the user on the user's display, advertisements or other selected information can be displayed to correspond with the user defined portion of the web page. For example, for any particular user, an advertisement may be placed or caused to appear in the user defined portion of the display of the rendered web page. The advertisement may temporarily replace the entire user defined portion that is being displayed, appear in some portion of the area, or a link to the advertisement may be provided in the area, such as a hyperlink that opens a new browser providing the advertisement or causing the link to expand within the area to show the advertisement or some portion thereof.

As described above, because the browser provider, a third party data collection service, and/or and the web publisher have the ability to know what part of the display of their web page is being displayed on the web page, advertisements or other selected information can be displayed on the displayed portion of the web page. For any particular user, the advertisements can be caused to appear only on the selected portion of the display of the web page, such as by scrolling around the displayed portion, temporarily replacing the entire displayed portion, or some level in between.

Figure 13:
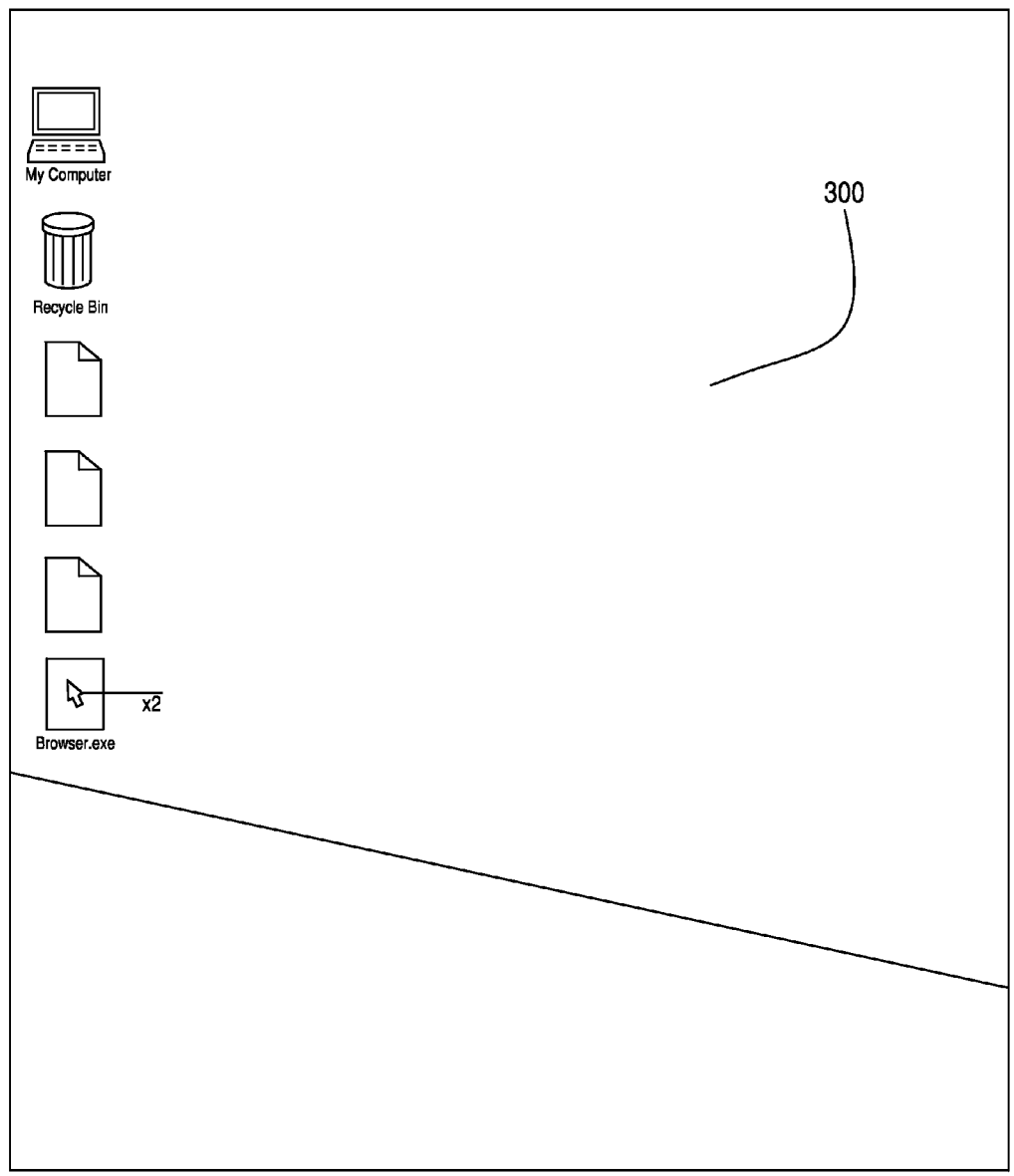
FIG. 13 illustrates an example of a screenshot of a desktop running on a computer.
Figure 14:
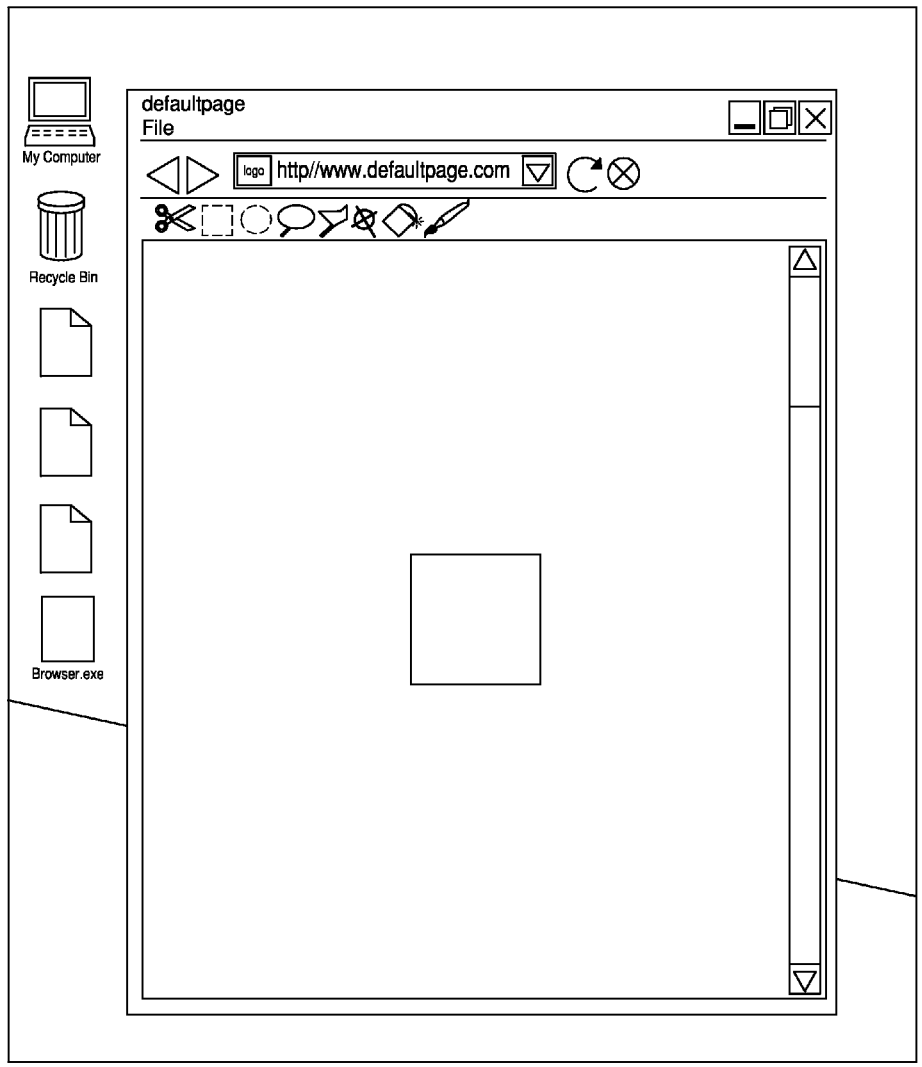
FIG. 14 illustrates an example of the screen display of the desktop of FIG. 13 in which the computer tool is implemented as part of an Internet browser that is opened on the desk top.

Referring now to FIGS. 13-18, another example of the computer tool and foldable/collapsible browser are provided while illustrating features of the tool. FIG. 13 illustrates a screen display of a user where the screen is set to display a desktop top environment. It is understood the browser is not limited to a desktop environment and that this examples are for illustration only. Other display environments, for example, such as those found on networked computers or personal devices, such as smart or mobile phone also may be used, in fact any display that is capable of rendering a browser interface and content may be used with the embodiments described herein. Various folders, files, and shortcuts, including a shortcut to a browser, are displayed on the desktop. In addition, although the following examples make reference to a user input using a mouse and cursor, these exemplary embodiment are for illustration only and any user input device and sequence of user inputs, such as tapping, clicking, typing, scrolling, selecting, highlighting, among others may be used to input user commands to a user device or computer system, as is well known in the art. FIG. 13 shows a mouse cursor has been placed over the shortcut icon for the browser. FIG. 14 illustrates that the user has selected the browser with the mouse and has opened the browser. The browser may be a specially designed folding or collapsing browser as described herein that includes or implements the computer tool or may be any commercially available browser that provides for additional functionality of the computer tool as a plug-in, add on, or the like. As shown, the browser provides a set of tools that allow the user to manipulate web content via the foldable browser or computer tool. The tools include a function to select a user definable area of the browser display rendering content for presentation to the user, such as various marquee and/or lassoing tools to select content.

Figure 15:
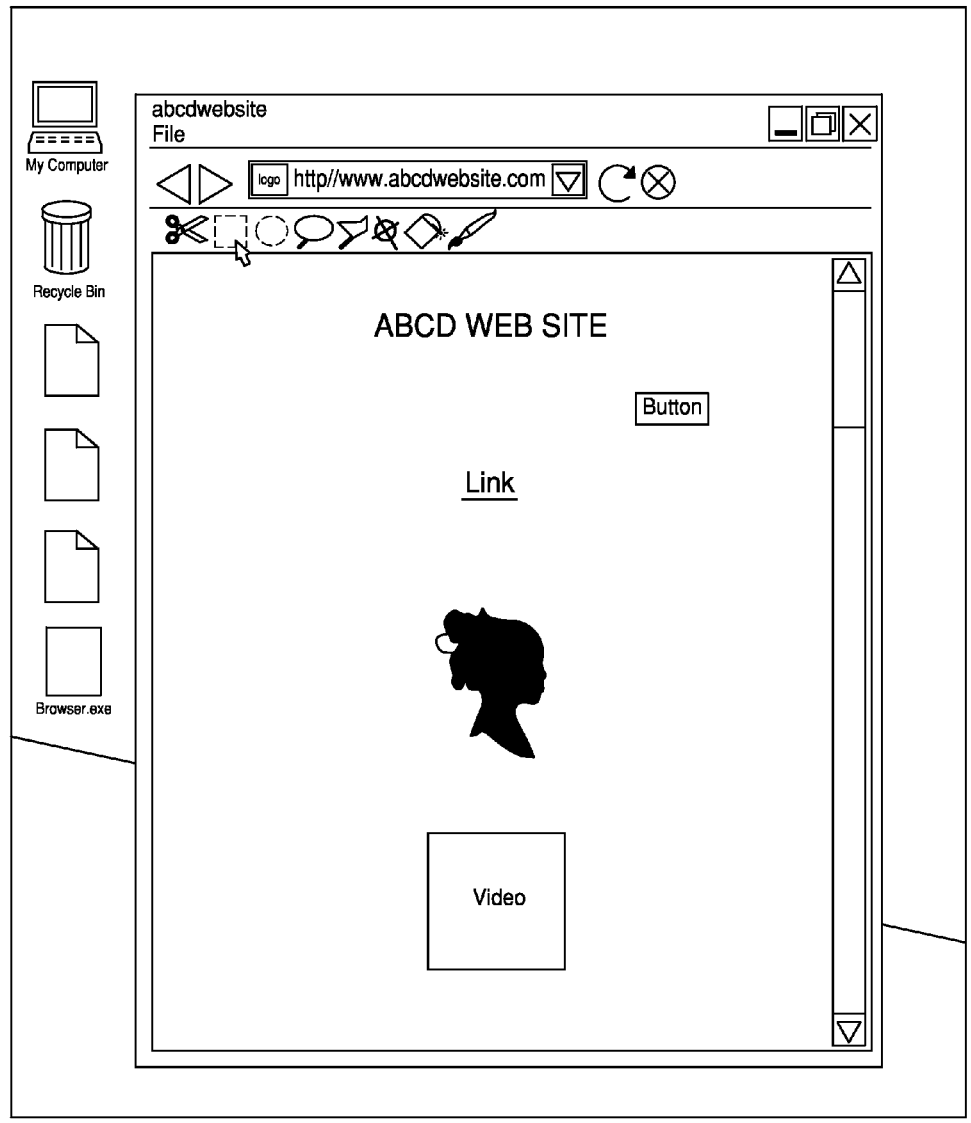
FIGS. 15 and 16 illustrate an example of the user selection of a portion of a webpage opened by the Internet browser.
Figure 16:
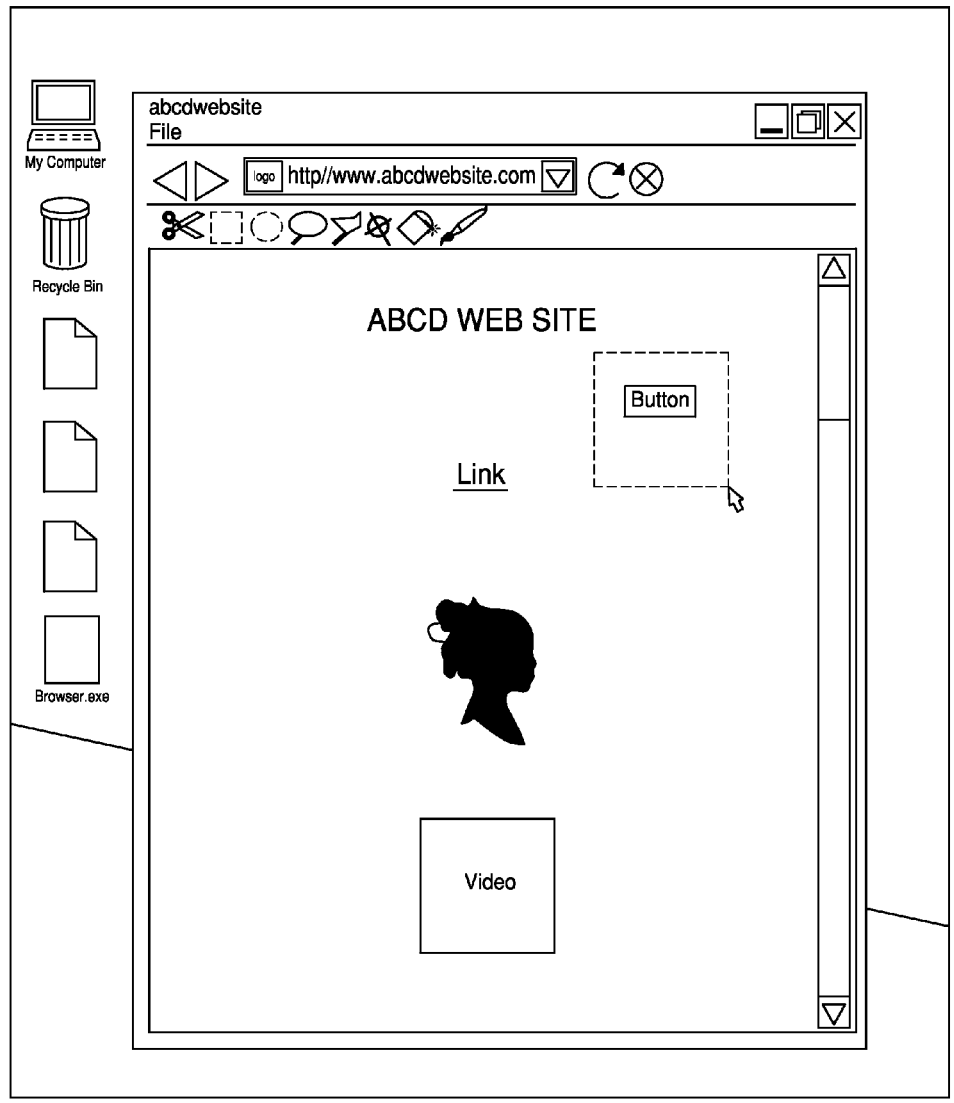

FIG. 15 illustrates a screen displayed by the browser when the user navigates to a hypothetical webpage, www.abcd-website.com, and activates one of the marquee tools as indicated by the cursor arrow being placed over the rectangular marquee selection tool. FIG. 16 illustrates the selection of a user defined area of browser display screen using the rectangular marquee selection tool. The selection may be performed using functionality and techniques that well known in the art. The selection process defines an area within the displayed portion of the web page rendered by the browser and dividing the rendered content into two portions: 1) the user defined area selected being the first portion of the displayed content of the web page, and 2) the remaining area of the web page content.

Figure 17:
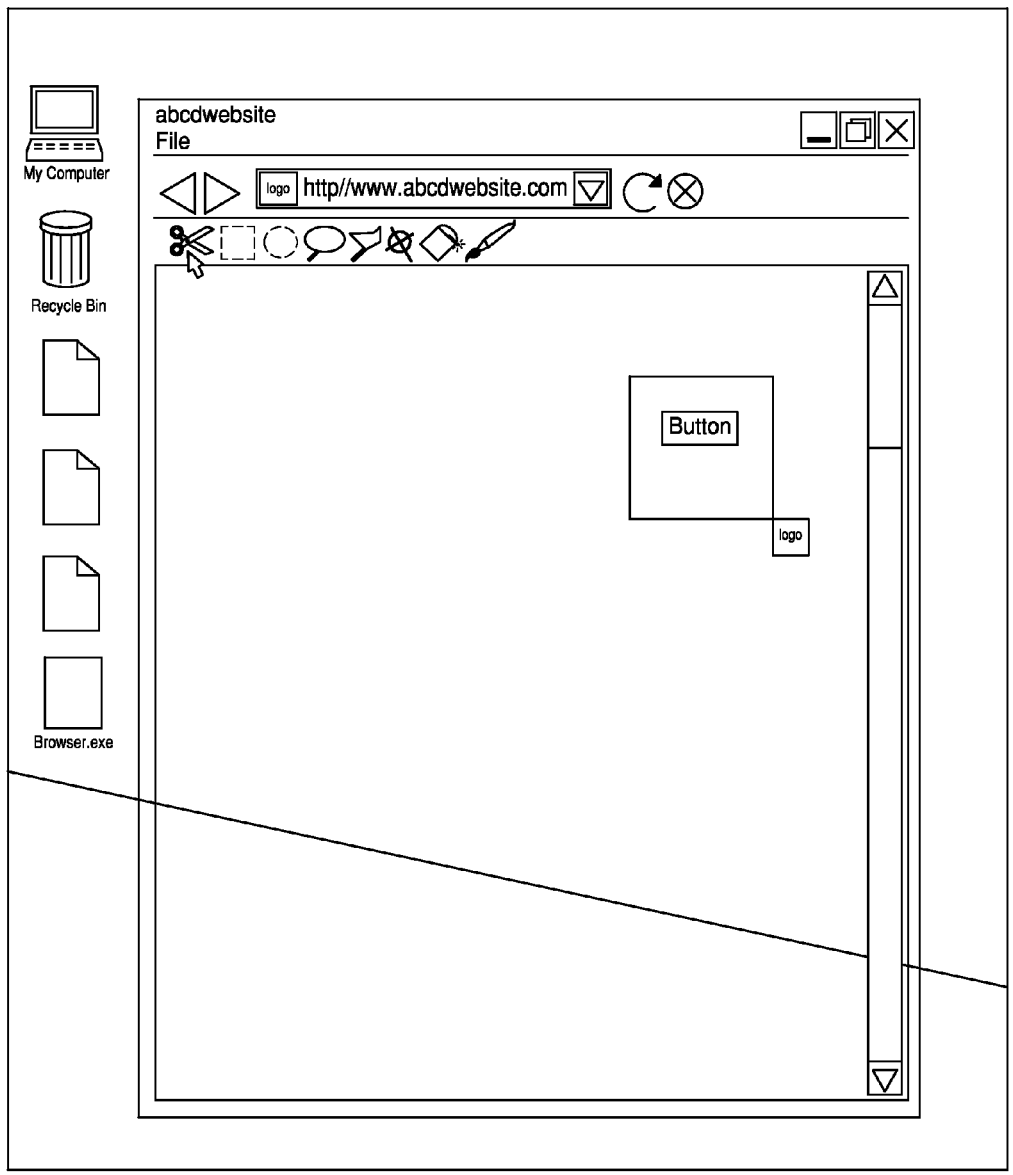
FIG. 17 illustrates an example of the computer tool presenting the user selected portion of the web page of FIG. 15 within the browser and the association of Favicon with the displayed user selected portion of the webpage.
Figure 18:
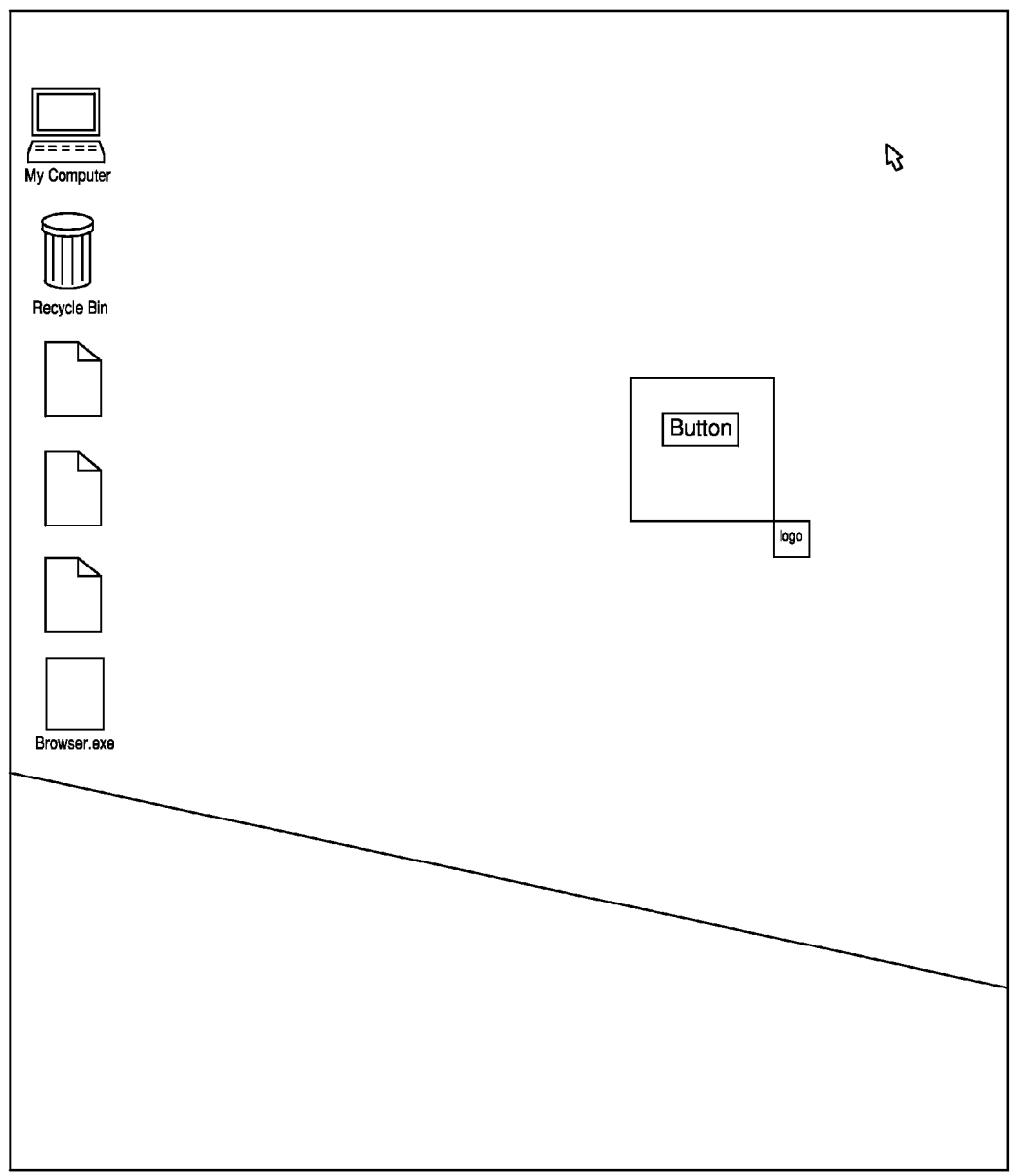
FIG. 18 illustrates an example of presenting only the user selected portion of FIG. 15 and Favicon on the desktop.

As illustrated in FIG. 17, the user activates a "crop" button on the browser tool bar to crop the remaining area outside the border (i.e., the dotted line created by the marquee tool), leaving only the user defined portion or first portion displayed within the display window of the browser.

In one example, the crop function merely limits the display of content to the user defined area of the web page using one of a number of techniques known in the art. For example, the display of the content may be configured such that an algorithm determines which pixels or part of the rendered content displayed in the window has been selected and which part of the displayed content is outside of the selected displayed content. Activating the crop function causes the software to select for display only those pixels that are within the selected first portion of displayed content. In one example, this may be thought of as a user defined window FIGS. 18 and 19 also illustrate another feature of the invention, an attribute button that appears adjacent to the first portion of the displayed content of the web page. The attribute button serves one or more functions. At one level, the attribute button may be used to cause the second portion of the displayed content of the web page to be displayed along with the already-displayed first portion. At another level, the attribute button may be used as an identifier of the content that is being displayed. For example, the attribute button may display a logo associated with the webpage being displayed. If the webpage is that of a web published having a capital W as its logo, the attribute button may have a capitalized W displayed within it. Thus, a user could quickly recognize the source of the displayed content. The logo being displayed could also be part of the domain name. It is expected that the logo could be specified by the web publisher as is currently the situation for the logo displayed to the right of the URL for some web pages, e.g., www.washingtonpost.com, www.mail.google.com, etc.

Figure 19:
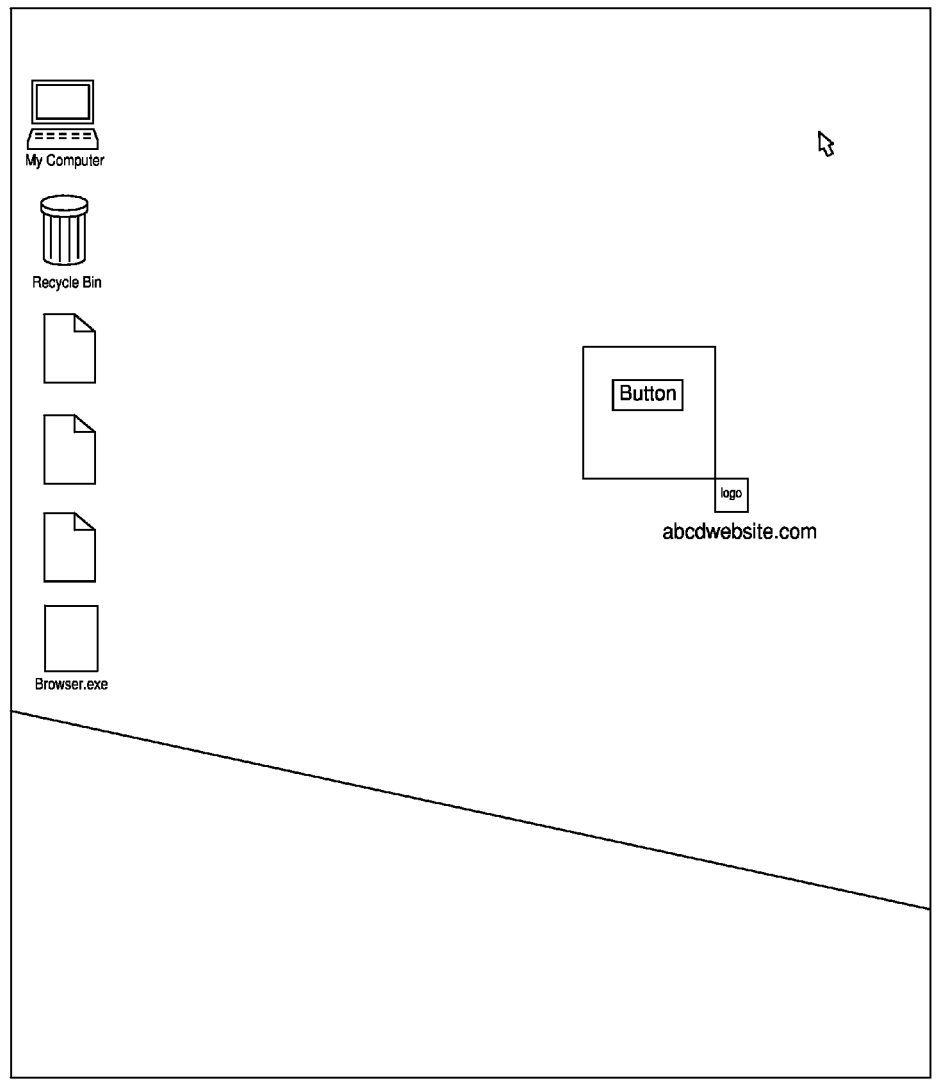
FIGS. 19, 20, 21, 22, and 23 illustrate the exemplary use of the logo or Favicon to manipulate the display of the user selected portion of the webpage within a desktop environment.
Figure 20:
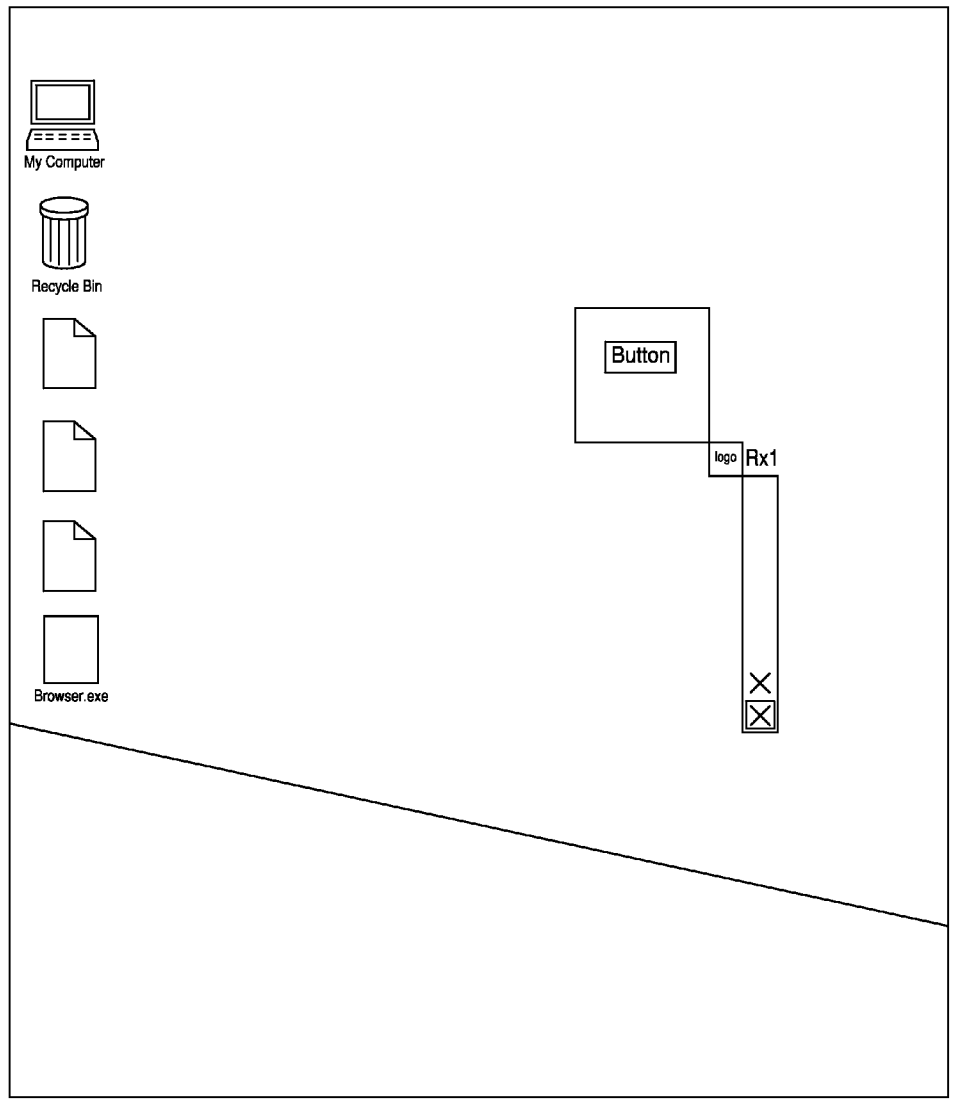
Figure 21:
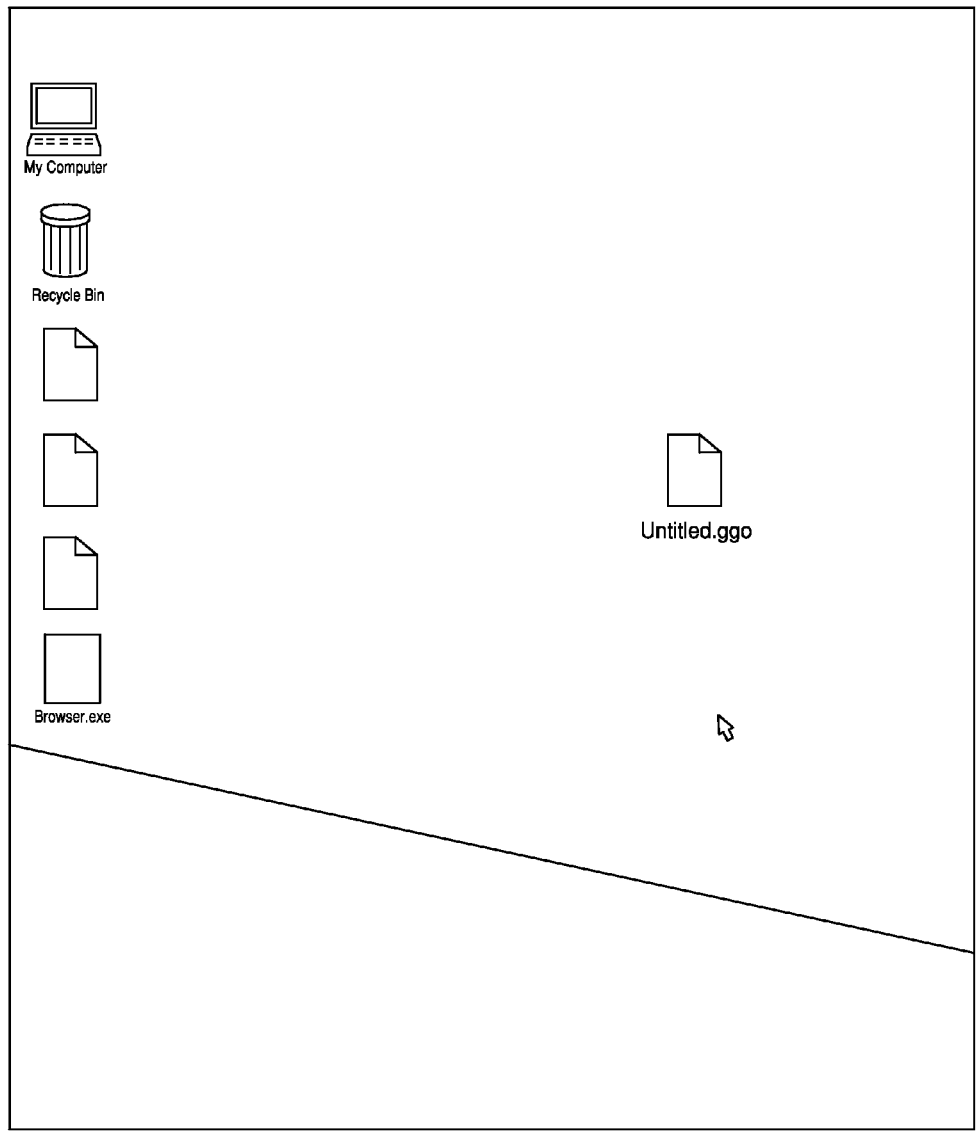
Figure 22:
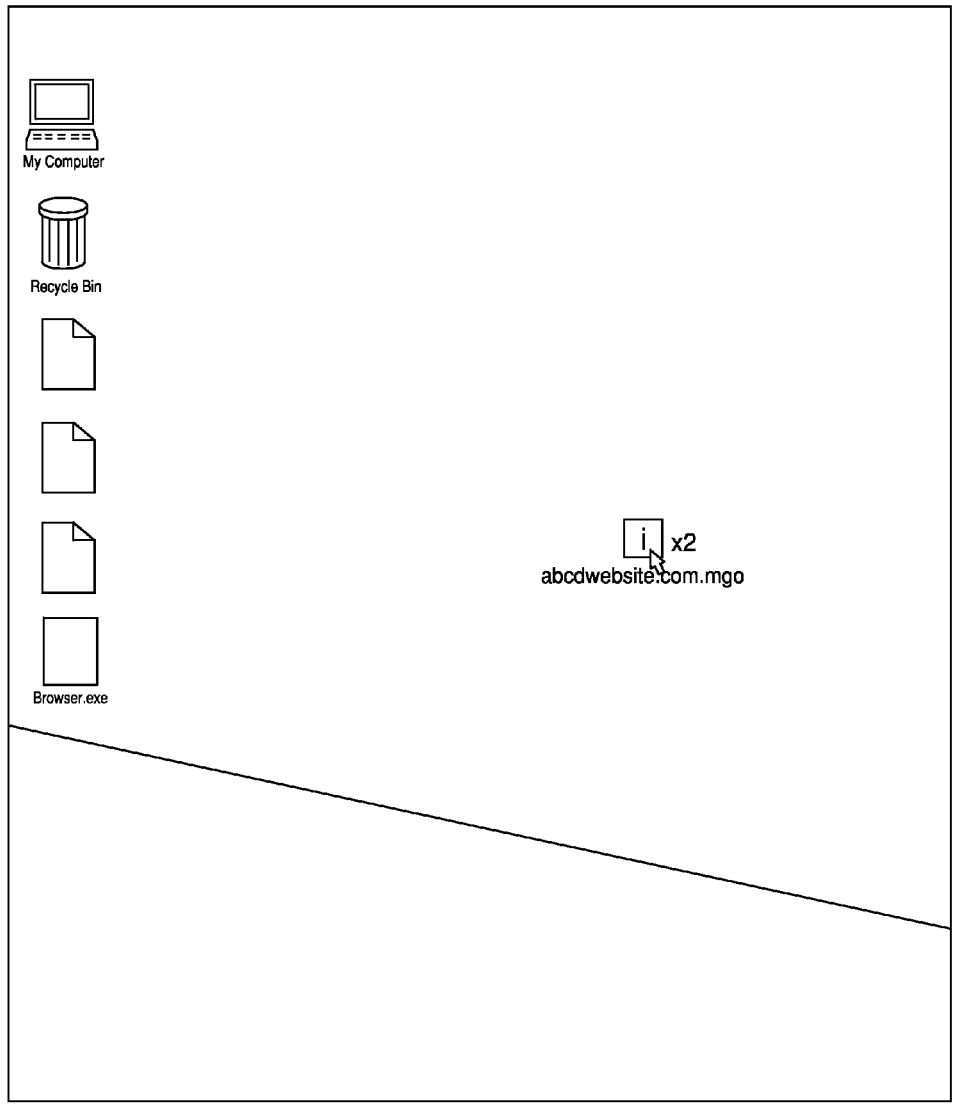
Figure 23:
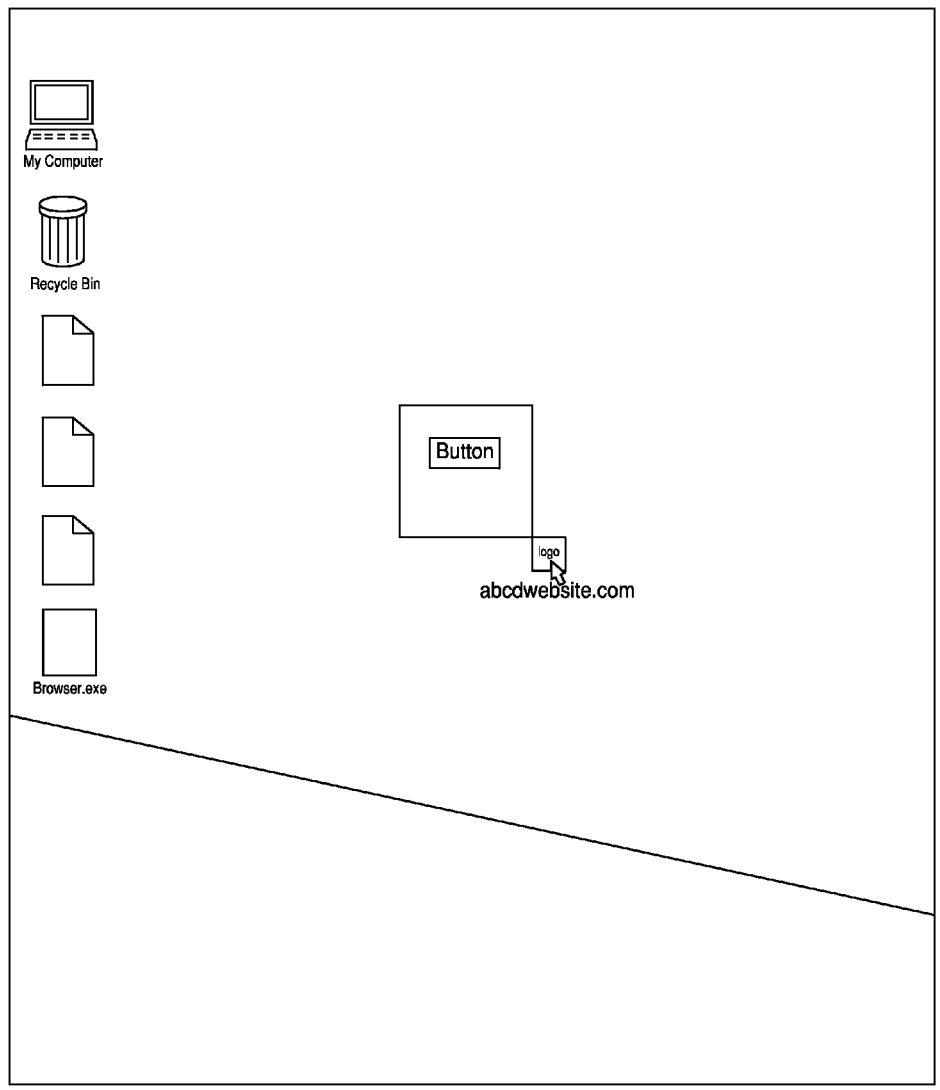

FIG. 19 illustrates an embodiment of the invention in which the URL for the web page is displayed along with the logo of the web content publisher. In this manner, a user of the Internet who wants to capture and share displayed web content will be able to provide an attribution to the original publisher or provider of the web content. FIGS. 20-22 further illustrate that the logo can be a control tool to manipulate the display of the web content. For example, a user can use the mouse to click on the logo and have the ability to minimize web content displayed to be merely a desk top shortcut to the web content. In FIG. 20, the user clicks on the logo and a drop down menu appears. In FIG. 20 the only option available is to close the display. Other options that could be placed on the drop down menu are the ability to print the display, email the URL or other pointer to the display to share the display with others, minimize the display and the like. In FIG. 21, by closing the display, all that remains on the desktop is a file or short cut (not shown) to the web content. In FIG. 22, by minimizing the display, all that remains on the desktop is a button that can be clicked on to cause the display to be displayed again, the result being illustrated in FIG. 23.

Figure 24:
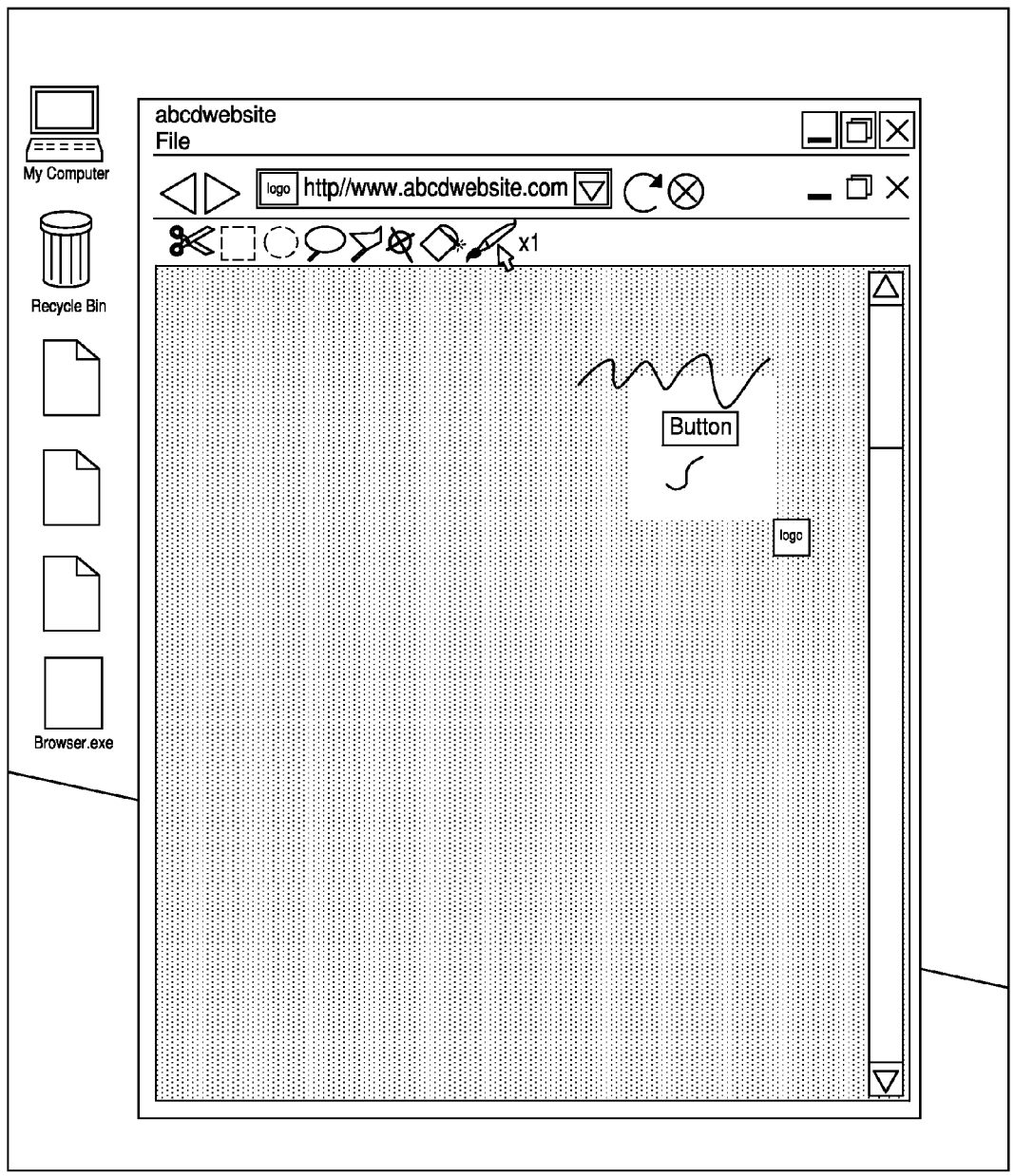
FIGS. 24, 25, 26, 27, 28, 29, 30 illustrate the exemplary use of an edit function of the computer tool to manipulate presentation of web content, to associated user created content to the web content, and present the content on the desktop or shared the content with others.
Figure 25:
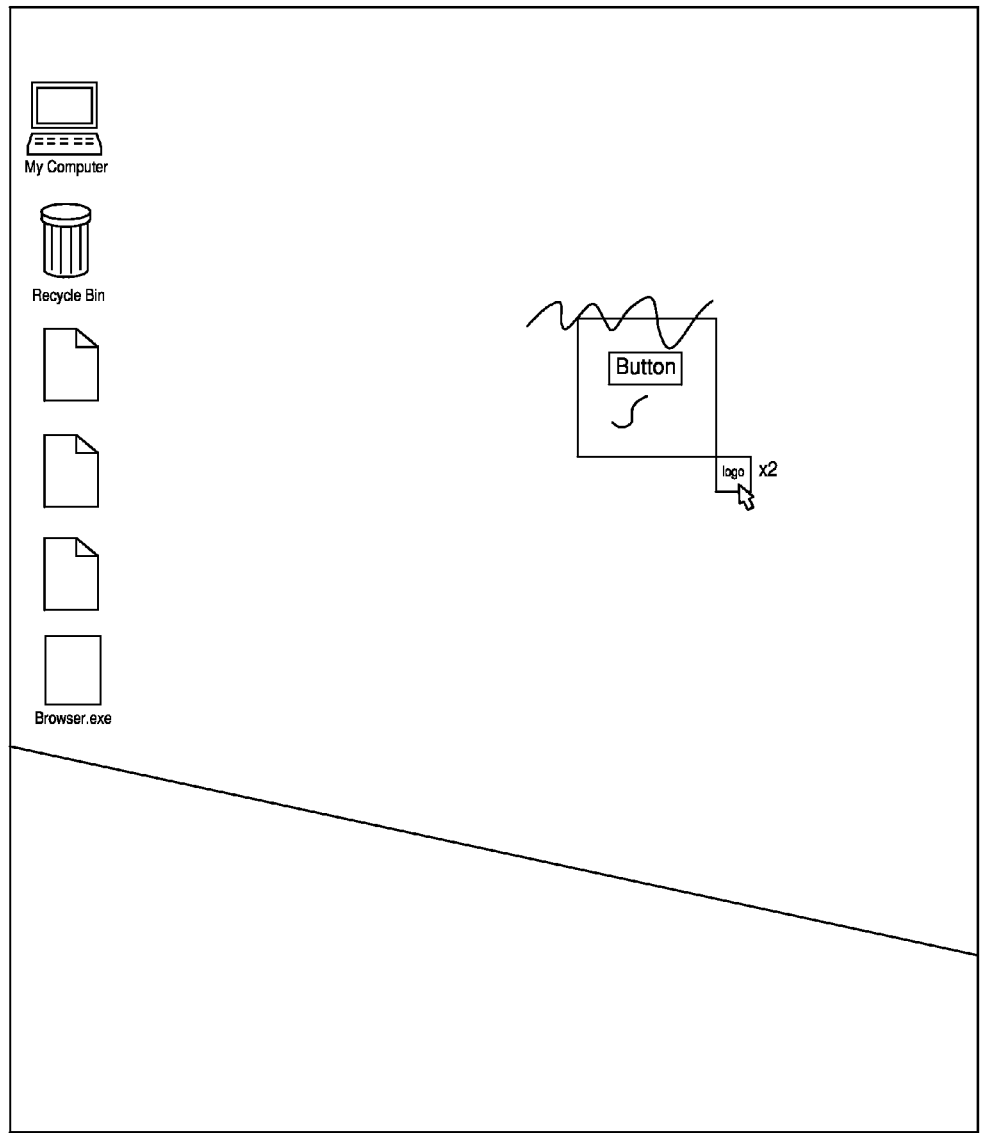
Figure 26:
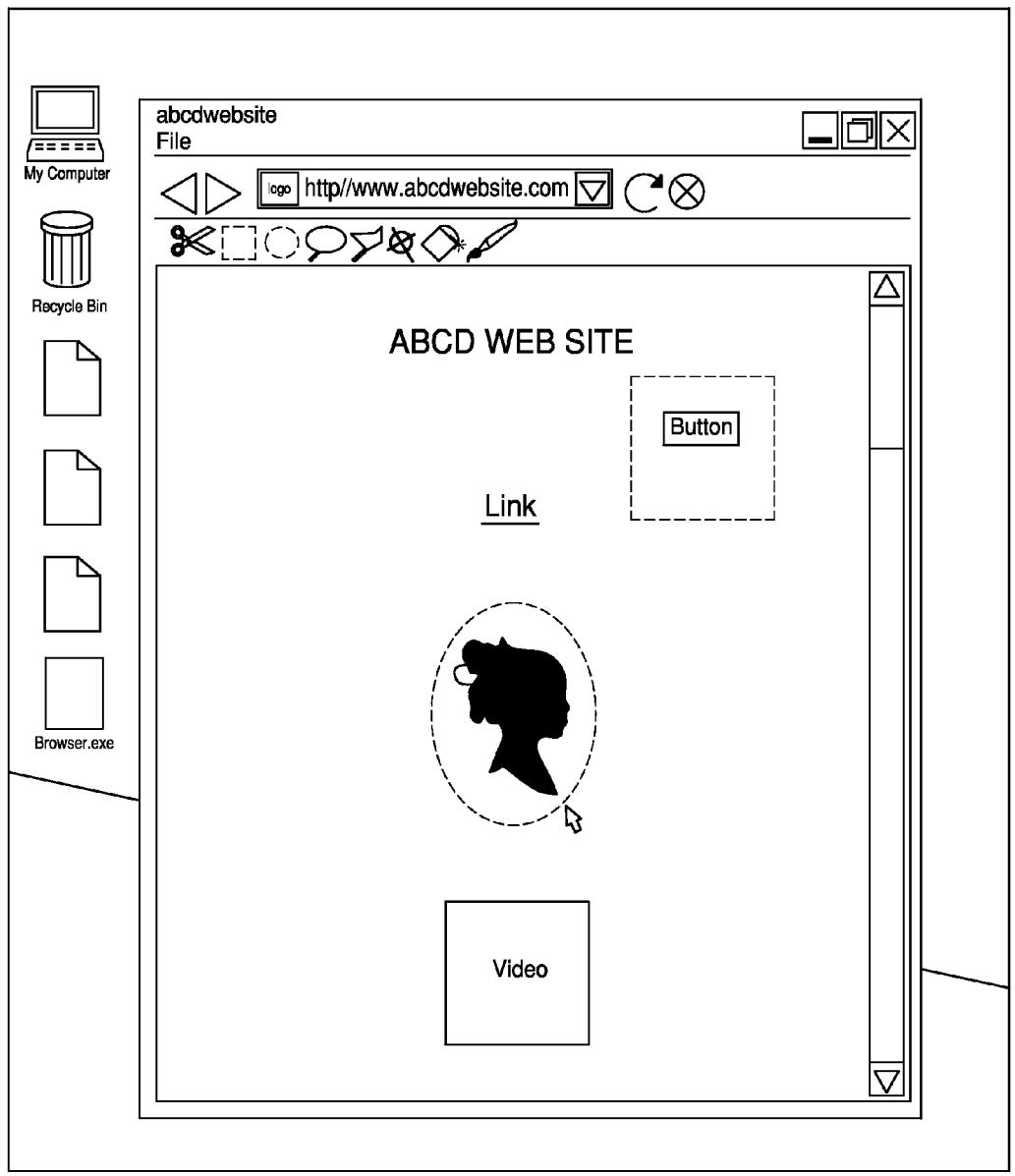
Figure 27:
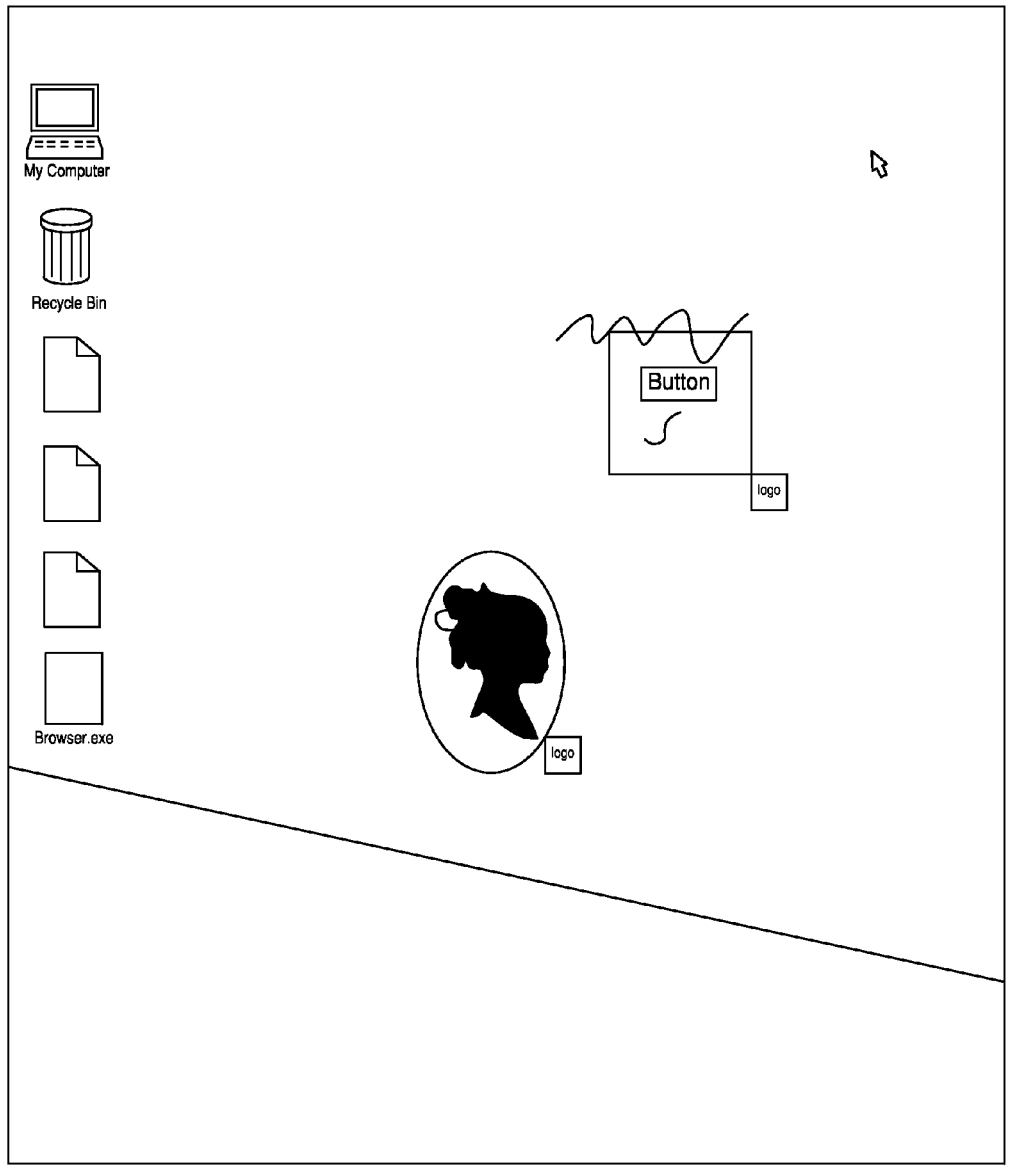
Figure 28:
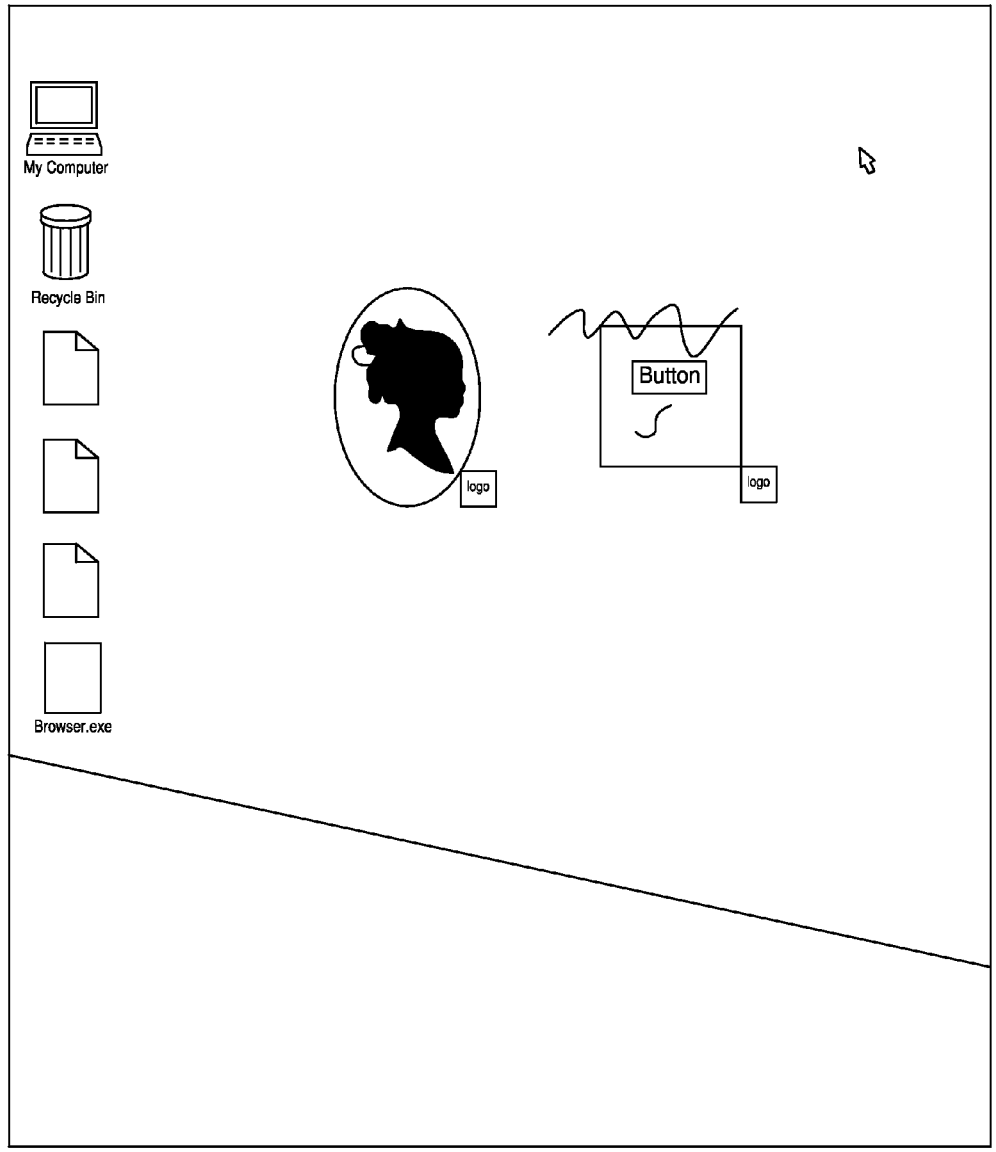

FIGS. 24-28 illustrate that the software tool can include an editing functionality which allows a user to select and collect displayed web content, add their own content to the web content, and then cause that combined content to be displayed on their desktop or shared with others. The content illustrated in FIG. 29 can be accessed and an edit button of the software tool activated. With the edit button activated, the user can draw, annotate, or otherwise add content to an area marqueed or selected of the displayed content (FIG. 24). By clicking on the logo button associated with the selected web content, the user can cause the web content outside the selected area to be hidden from view. Thus, the selected web content will be displayed with an overlay of the user-added content (FIG. 25). The user then can further select web content from the displayed web page (FIG. 26) and cause that additional content to be displayed with the other already-selected content from that web page (FIG. 27). Those two, selected items of web page content can be moved independently of each other (FIG. 28). This is because, in one embodiment of the invention, each item displayed from that web page is displayed from a separate browser window rather than both being from the same browser window. In other embodiments, the items can be from within the same browser window, such as by having the items be movable objects within the browser window such as by using functionalities such as DHTML, AJAX, and the like.

Figure 29:
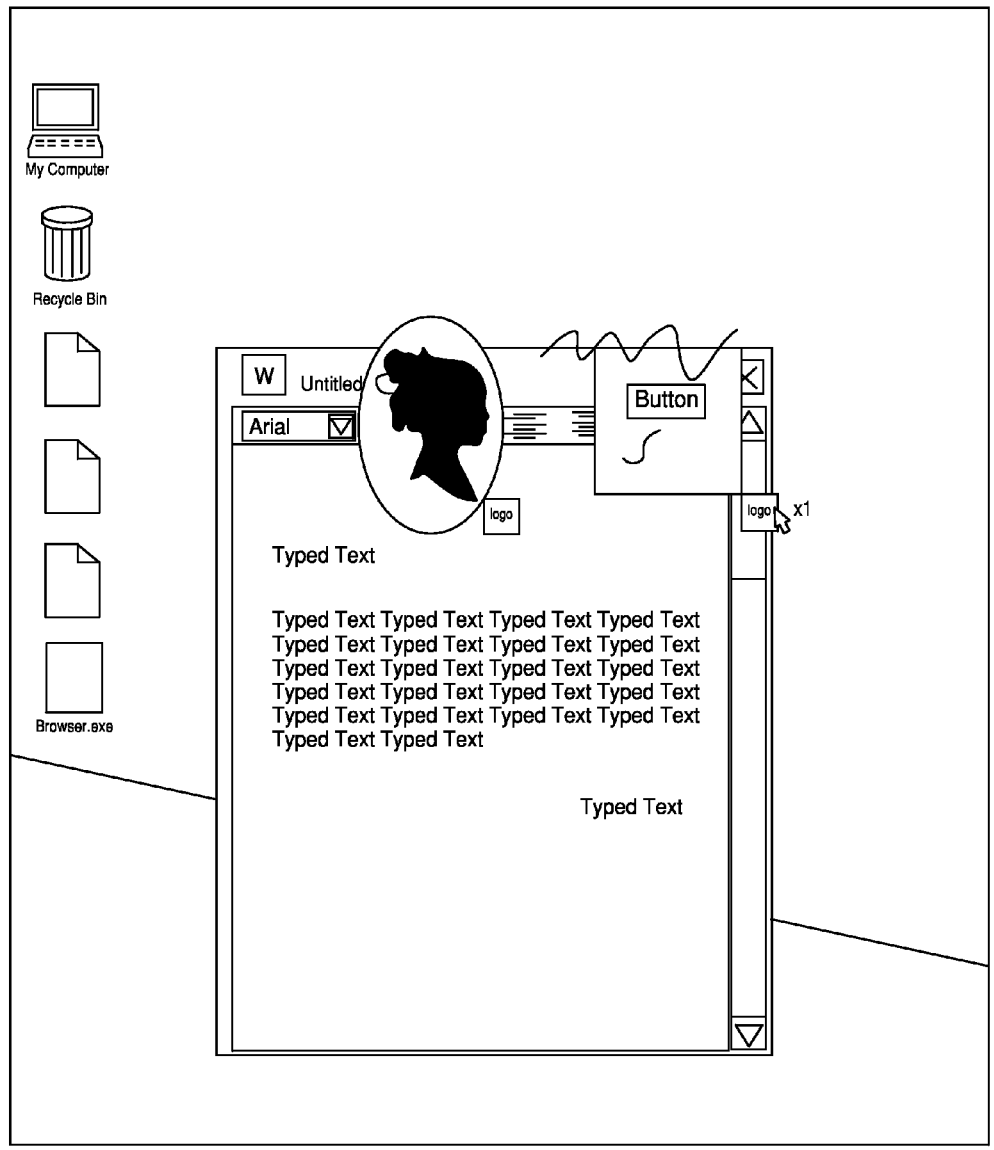
Figure 30:
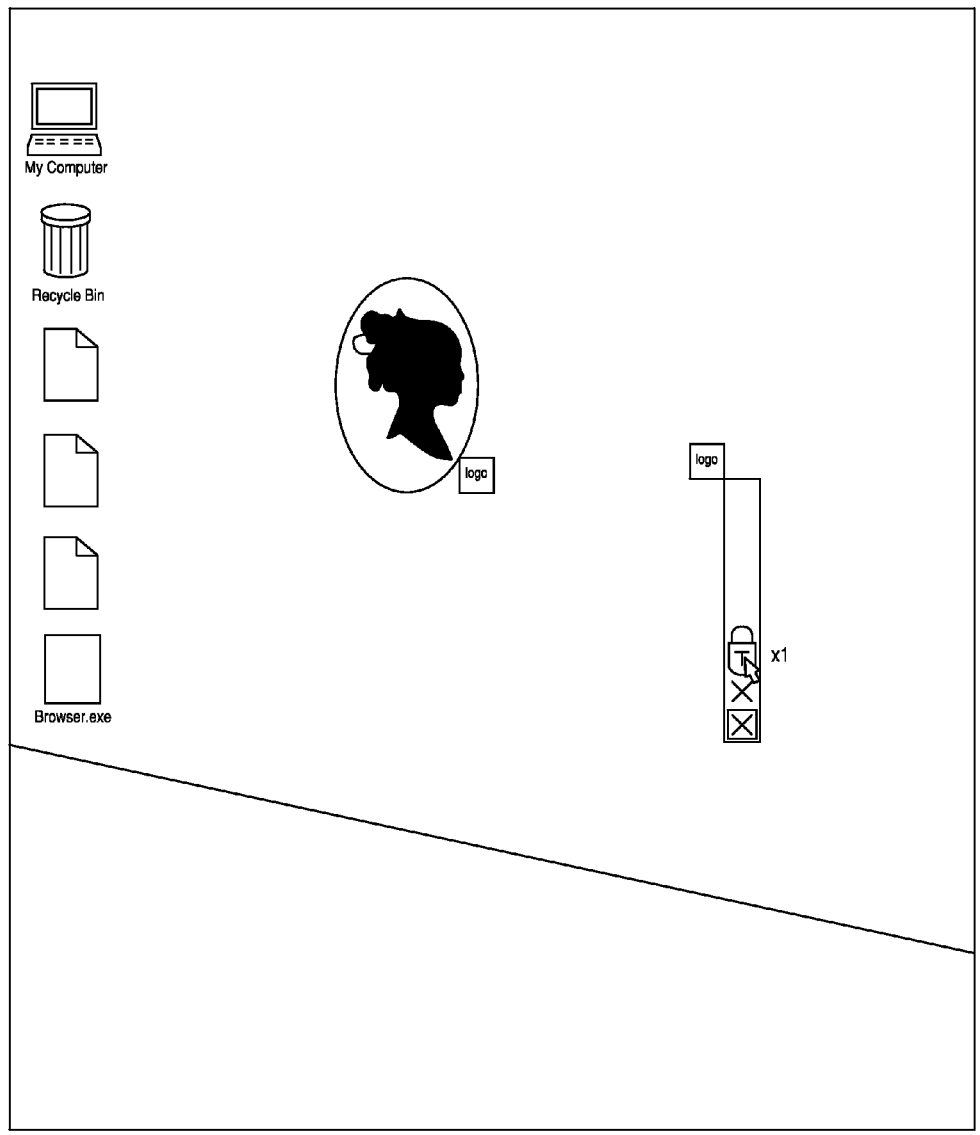

FIG. 29 illustrates the use of the logos to toggle the web page content behind or in front of an already-opened item, such as a document (FIG. 29). FIG. 30 illustrates the use of the logo to provide a drop down menu with an option to lock the placement of the selected web content on the desk top. This can configured to lock all the selected web content or only one item of the multiple items of selected web content.

Figure 31:
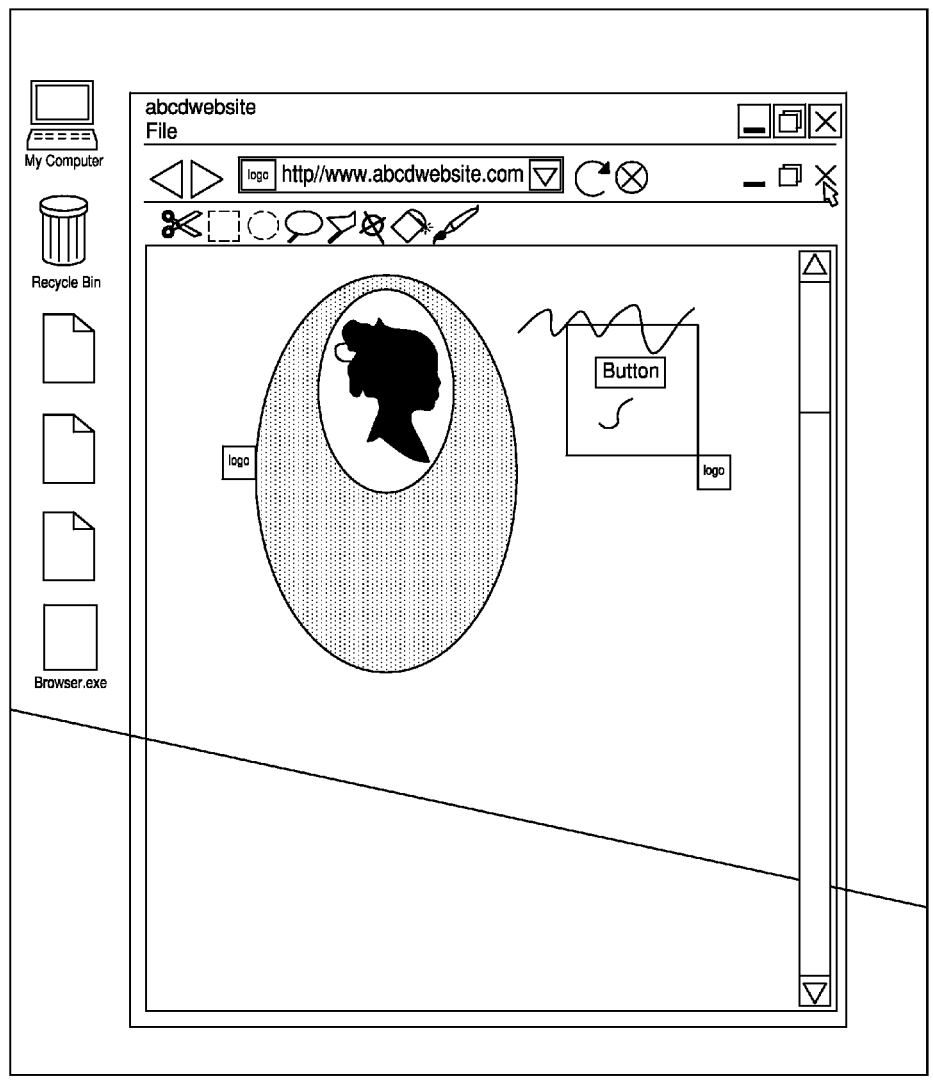
FIGS. 31, 32, 33, 34, 35, 36, 37, 38, 39, and 40 illustrate the exemplary ability to use the computer tool to manipulate the display, arrangement, and placement of user selected content within a browser or on the desktop.
Figure 32:
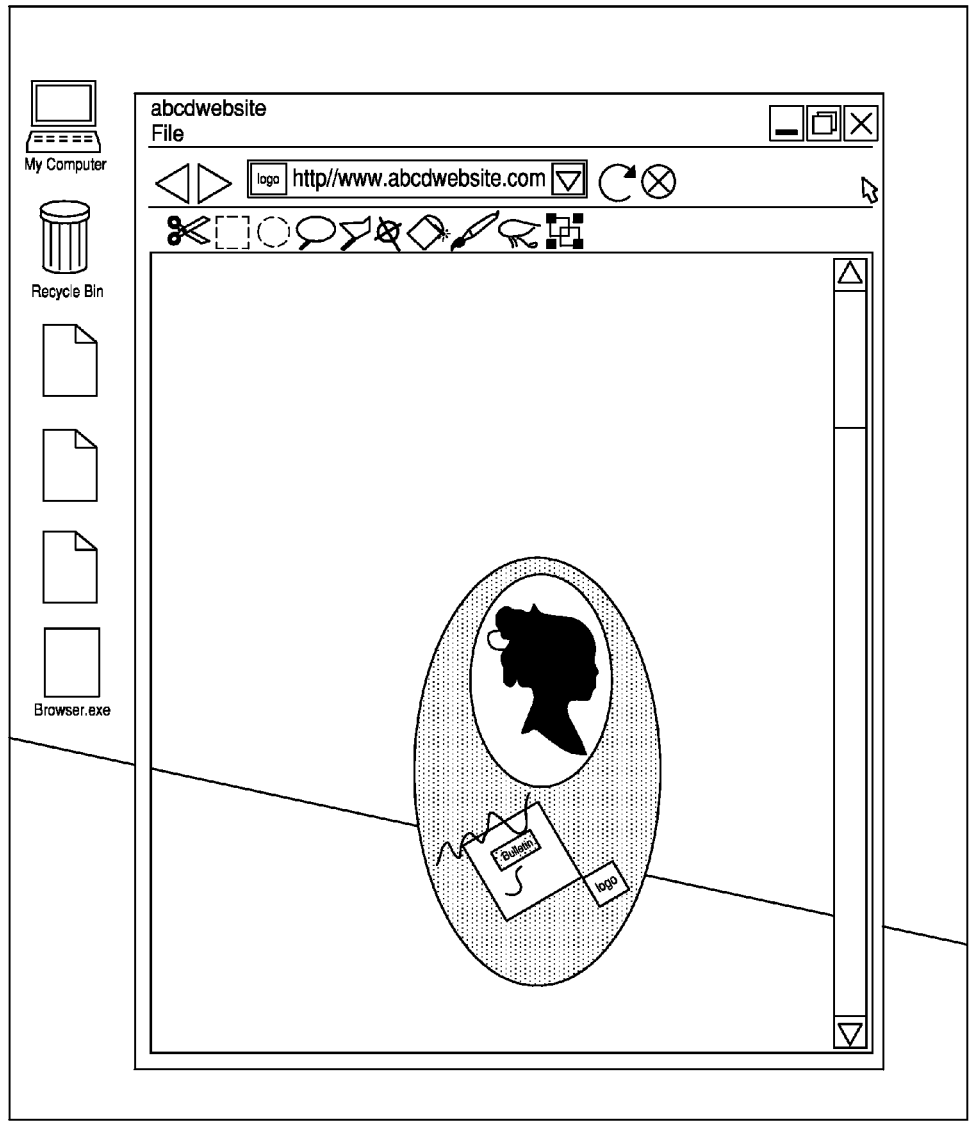

FIGS. 31-40 illustrate the ability to manipulate the display, arrangement and placement of the items on the desktop. As illustrated in FIG. 31, the user can take one of the items of web content and manipulate a display around the item. This provides the advantageous ability to enhance the aesthetics of the content displayed from the Internet. FIG. 31 illustrates the user creating a colored border around the selected content. The logo associated with the web content then can be attached to the newly created border or to the original web content (not shown). FIG. 32 illustrates the ability to then alter the placement of the other item of web content into the colored border surrounding the first displayed web content.

Figure 33:
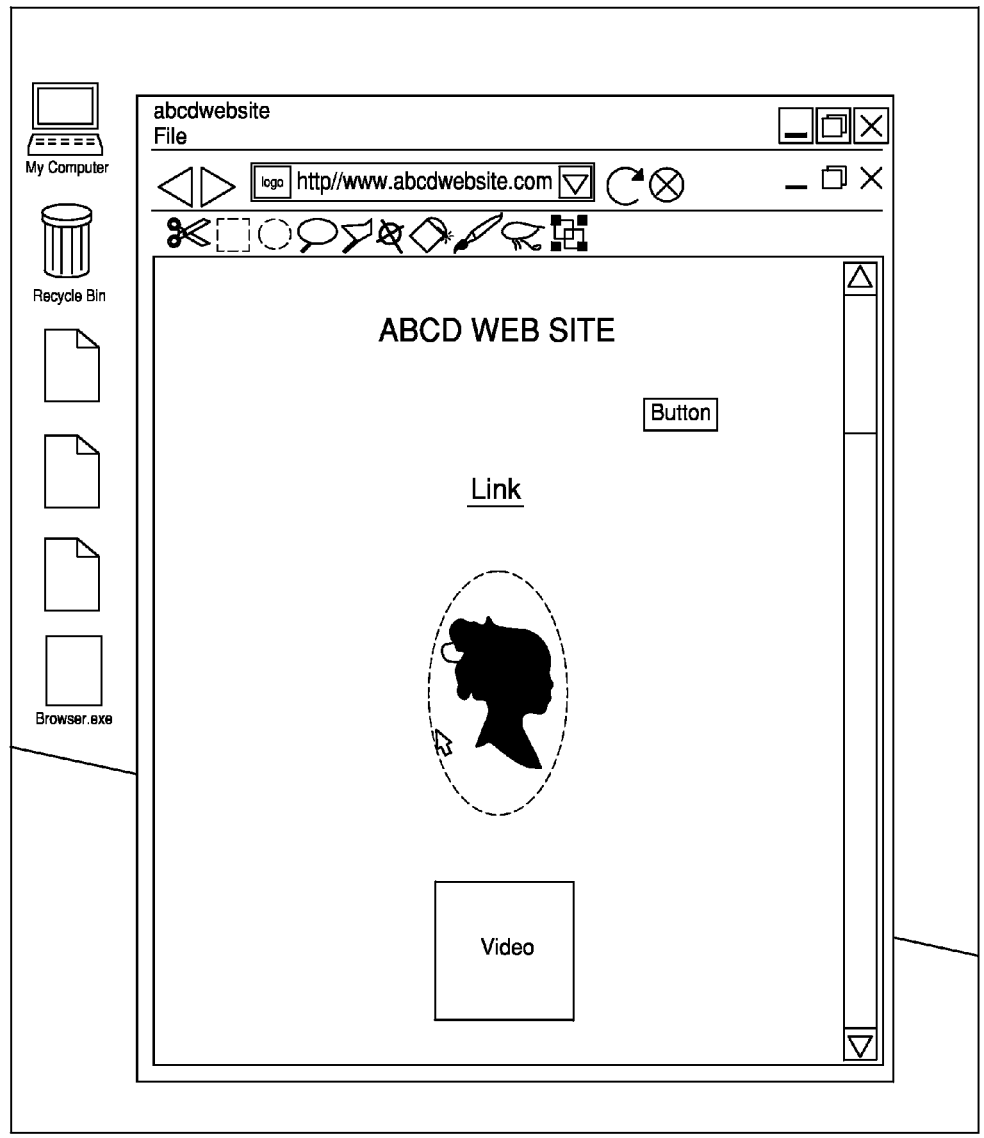
Figure 34:
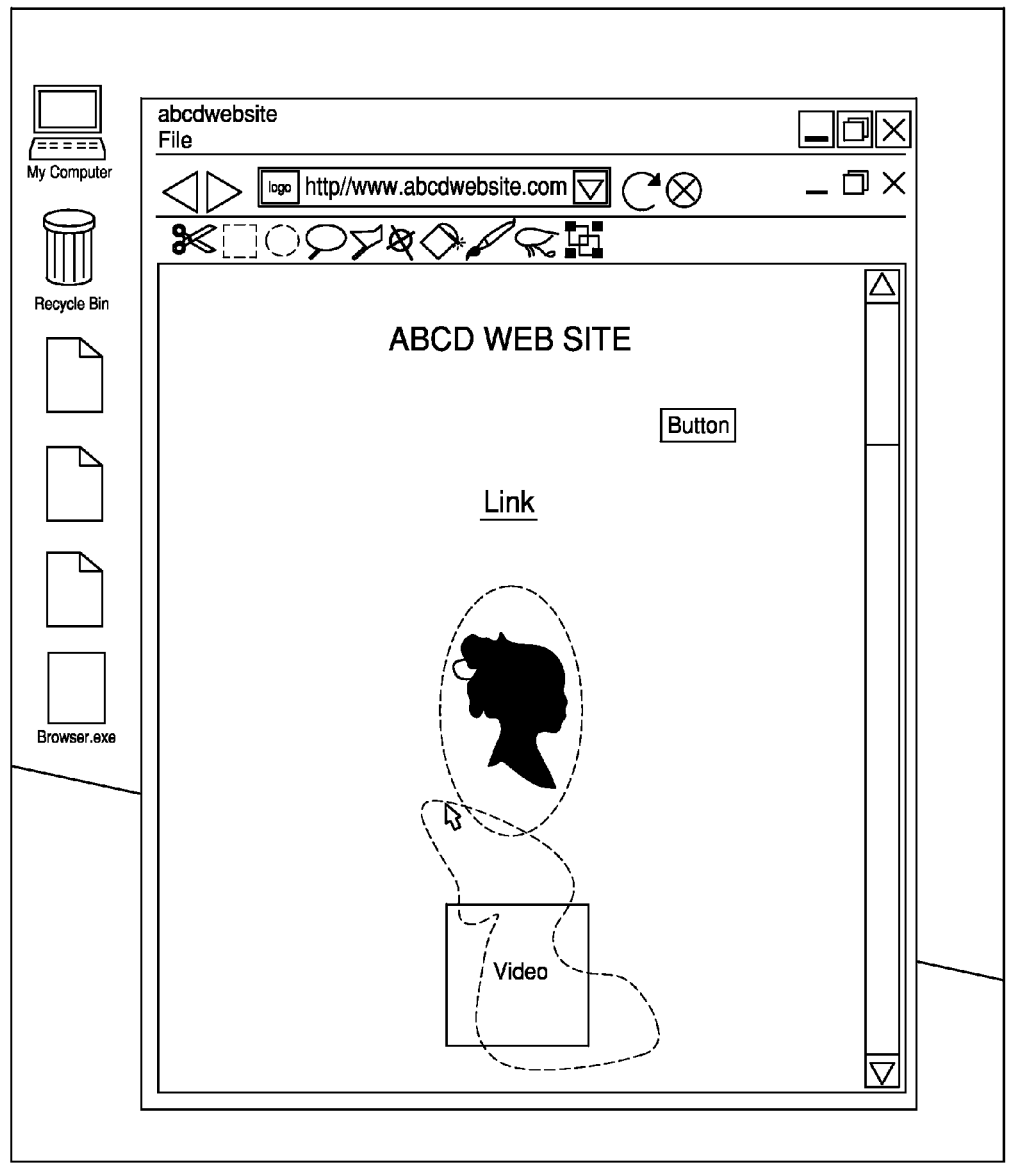
Figure 35:
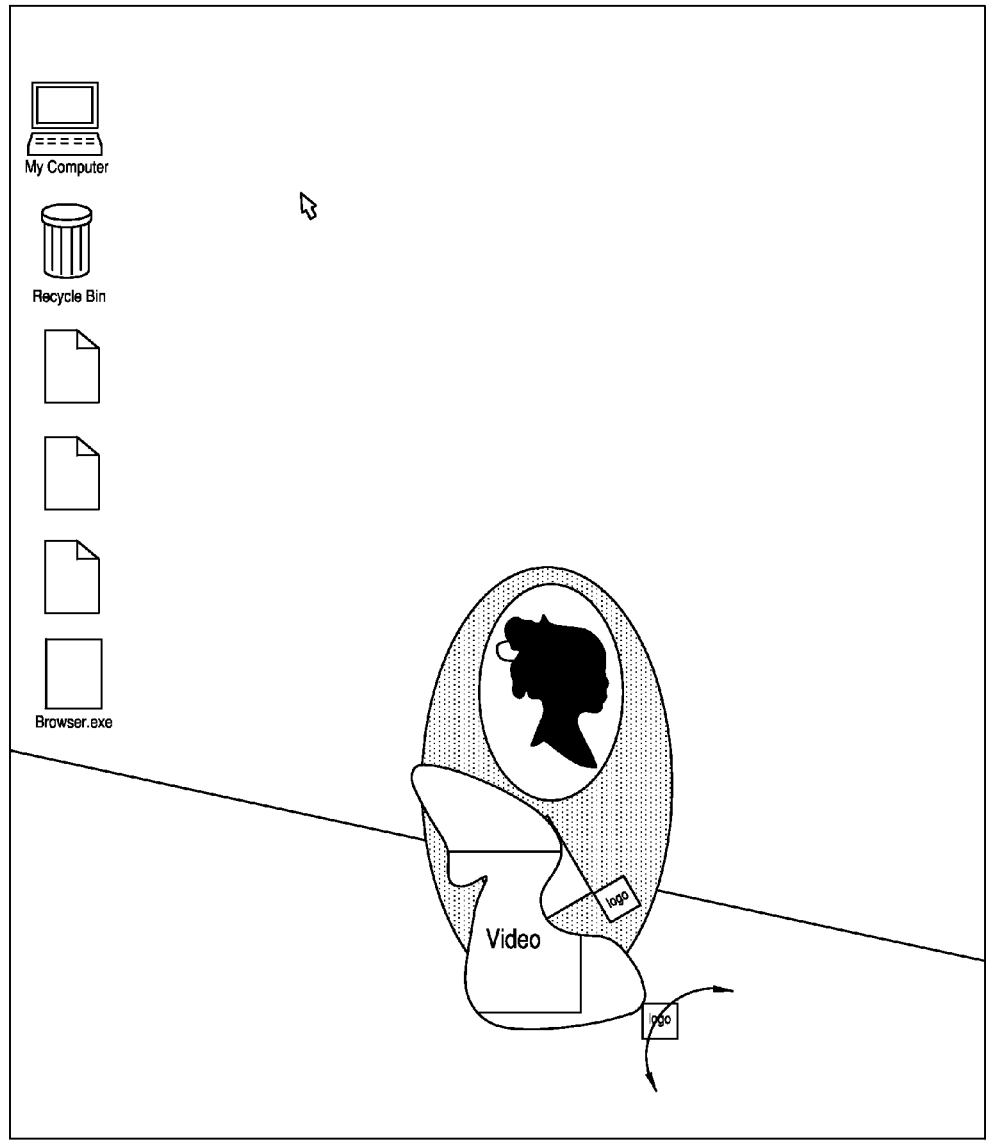

In FIGS. 33-35, the user is able to draw borders around the items of web content and combine them into one connected display. In FIG. 33, the user goes to a webpage and selects an item for capture. In FIG. 34, the user then selects a second item for capture. The first item selected is within a oval marquee while the second item selected is based upon using a freehand marquee tool. The freehand marquee tool captures a portion of a video display from the webpage as well as surrounding portions of the webpage that border the video display. In FIG. 35, the user has captured the selected items of web content and eliminated the remainder of the web content from view. The logos associated with the selected items can be used to move the items around on the desk top. FIG. 35 illustrates where the video item has been placed with the combined items of FIG. 32.

Figure 36:
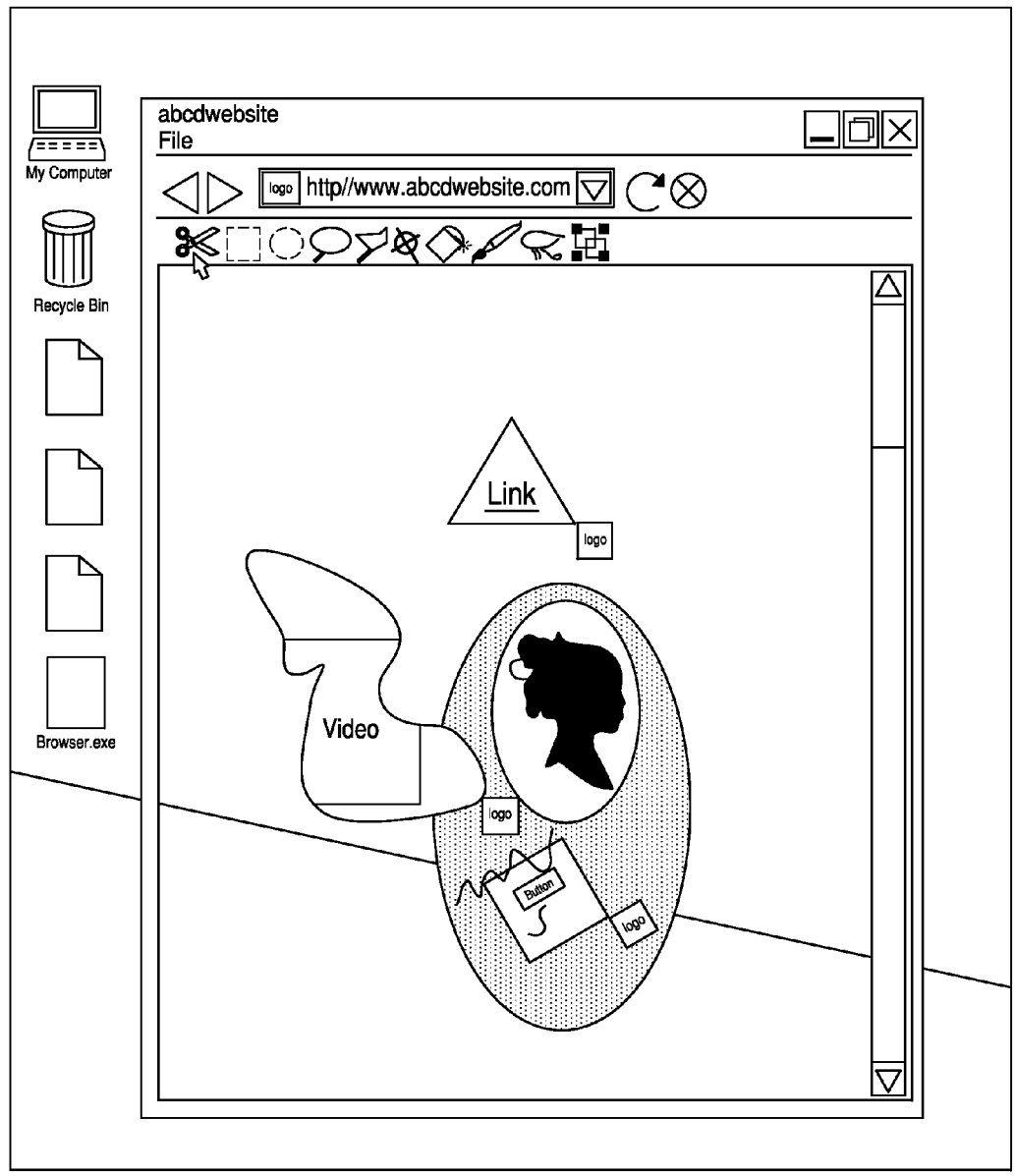
Figure 37:
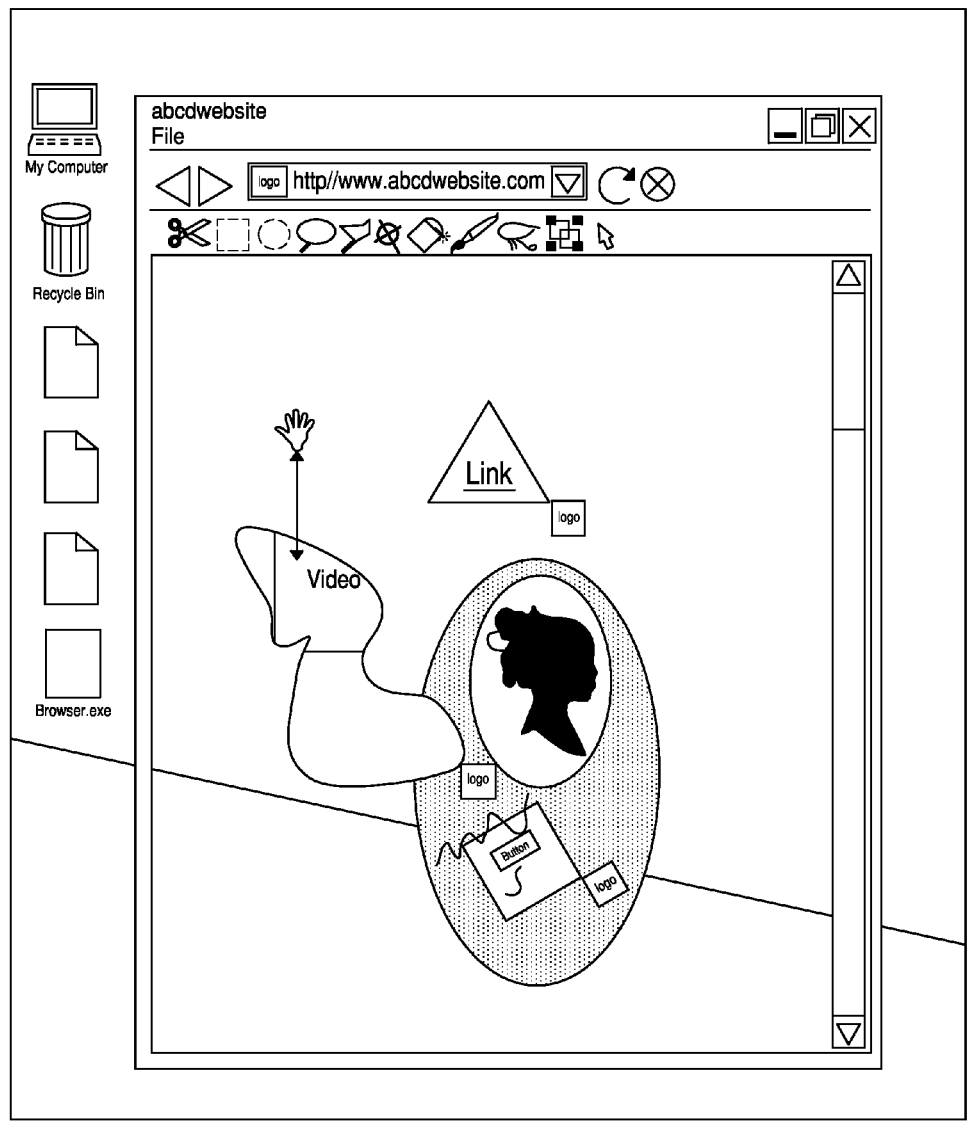

FIG. 36 illustrates the ability to move the two items separately without affecting the unmoved item. In addition, FIG. 36 illustrates the ability to add a third item of web content, such as a link on a webpage, to the desk top display. This can occur when a user is interested in articles referenced in a blog. The articles may vary from day-to-day but the link remains present in the same position on the blog. In this way, the user can click on the link on their desktop to see the article referenced by a link in a blog. FIG. 37 illustrates the ability to use a tool associated with the items of content to manipulate their display, such as panning, rotating or moving the displayed item of content.

Figure 38:
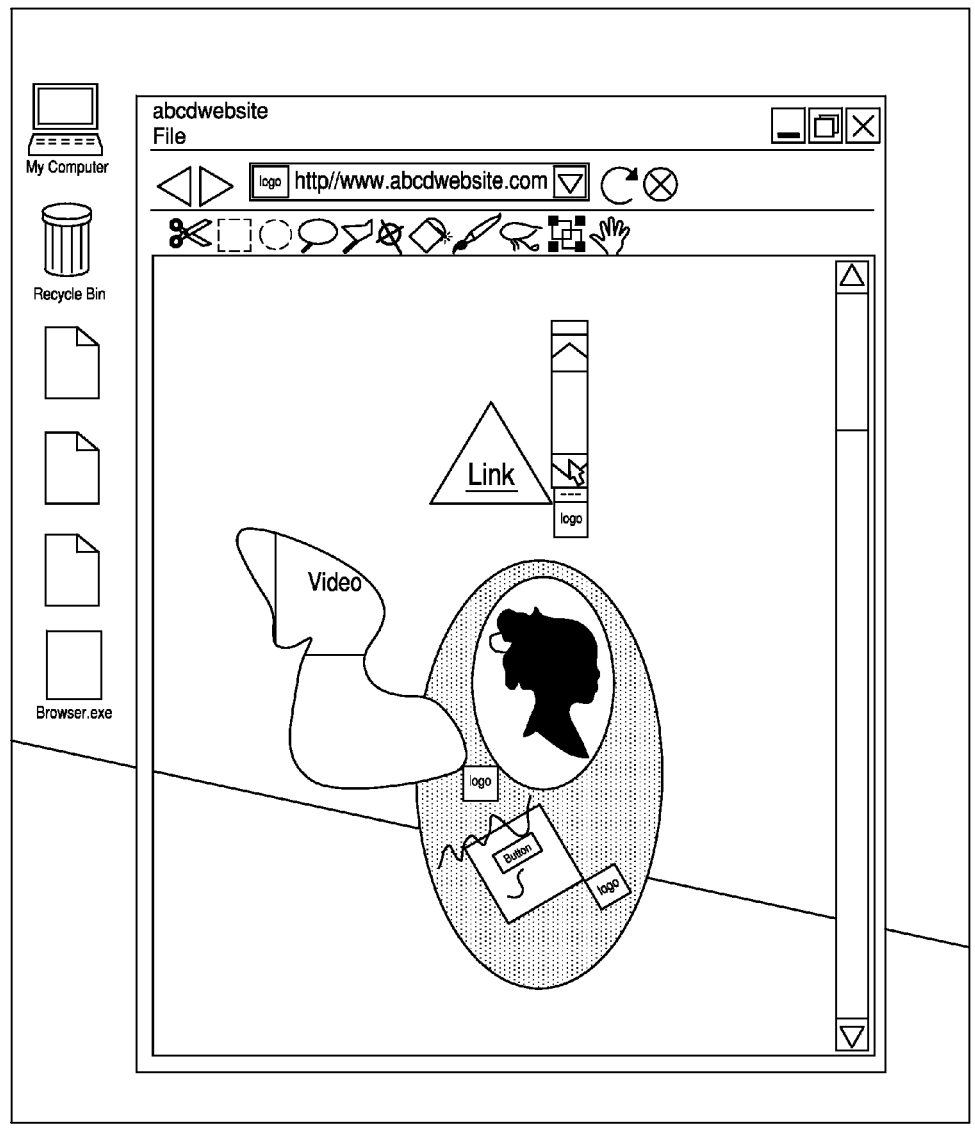
Figure 39:
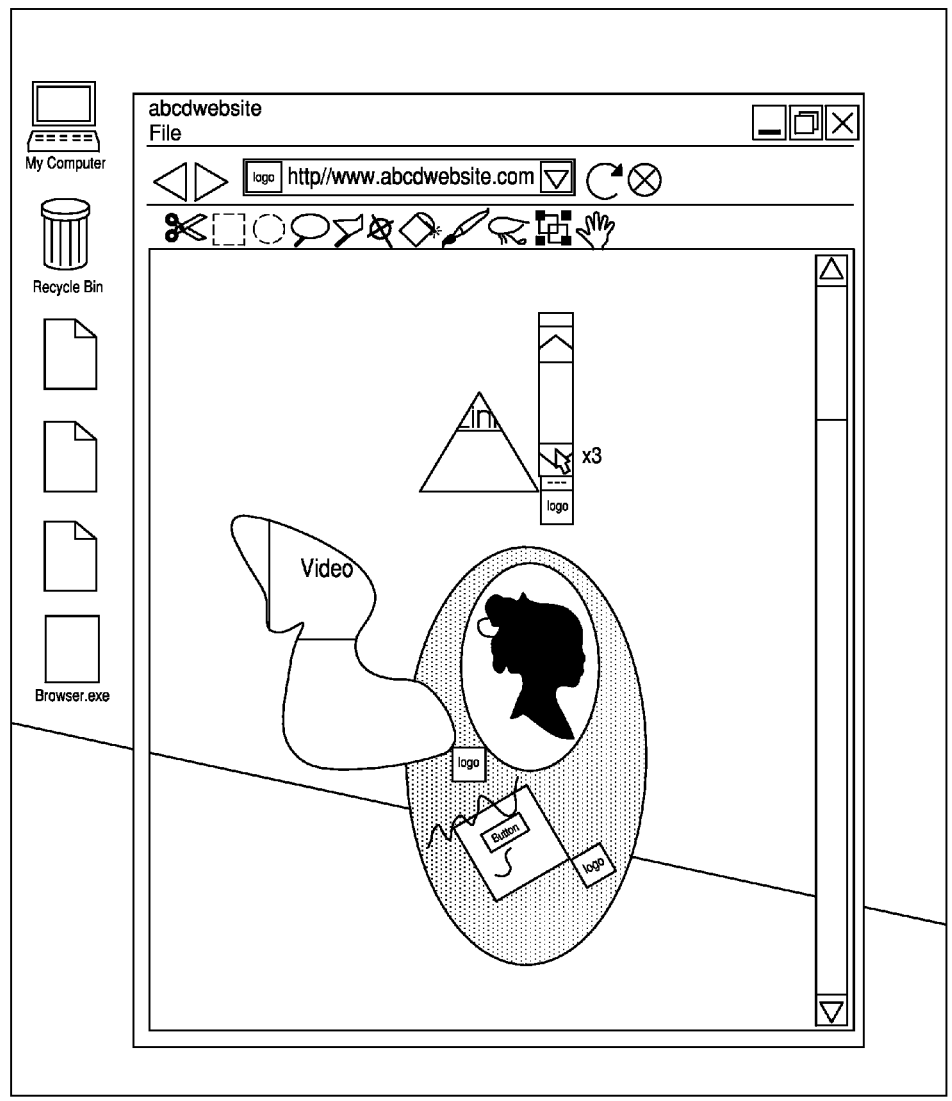

FIGS. 38 and 39 are related to FIG. 36 by showing that the position of the displayed link within the selected display can be manipulated on the user's display. In other words, the user can select an area of the display of a webpage, capture and display only that selected area of the webpage on their display or desktop, and then move the webpage with the border created by the user. As illustrated in FIGS. 38 and 39, the user has created a triangular border around the display of the webpage. That triangular border captures the link displayed on the webpage. The user can attach scroll bar to the cropped content that will allow the user to scroll through the content of that webpage. The scroll bar can be attached or snapped to the border of the object. Once that triangular shaped item is displayed on the user's desktop, the user can use the scroll bar to scroll up or down and/or left or right on that webpage. However, the only part of that webpage that will be displayed on the user's desktop will be that portion of the display of the webpage that fits within the triangular border selected by the user. In this manner, the user can scroll up or down to see if there are other links of interest. This capability advantageously provides the user with a small window to the webpage of interest, minimizing the use of valuable screen space on the desk top while also providing the user the ability to move the display of the webpage within that small window so as to be able to view the entire webpage display, but not all at one time.

Figure 40:
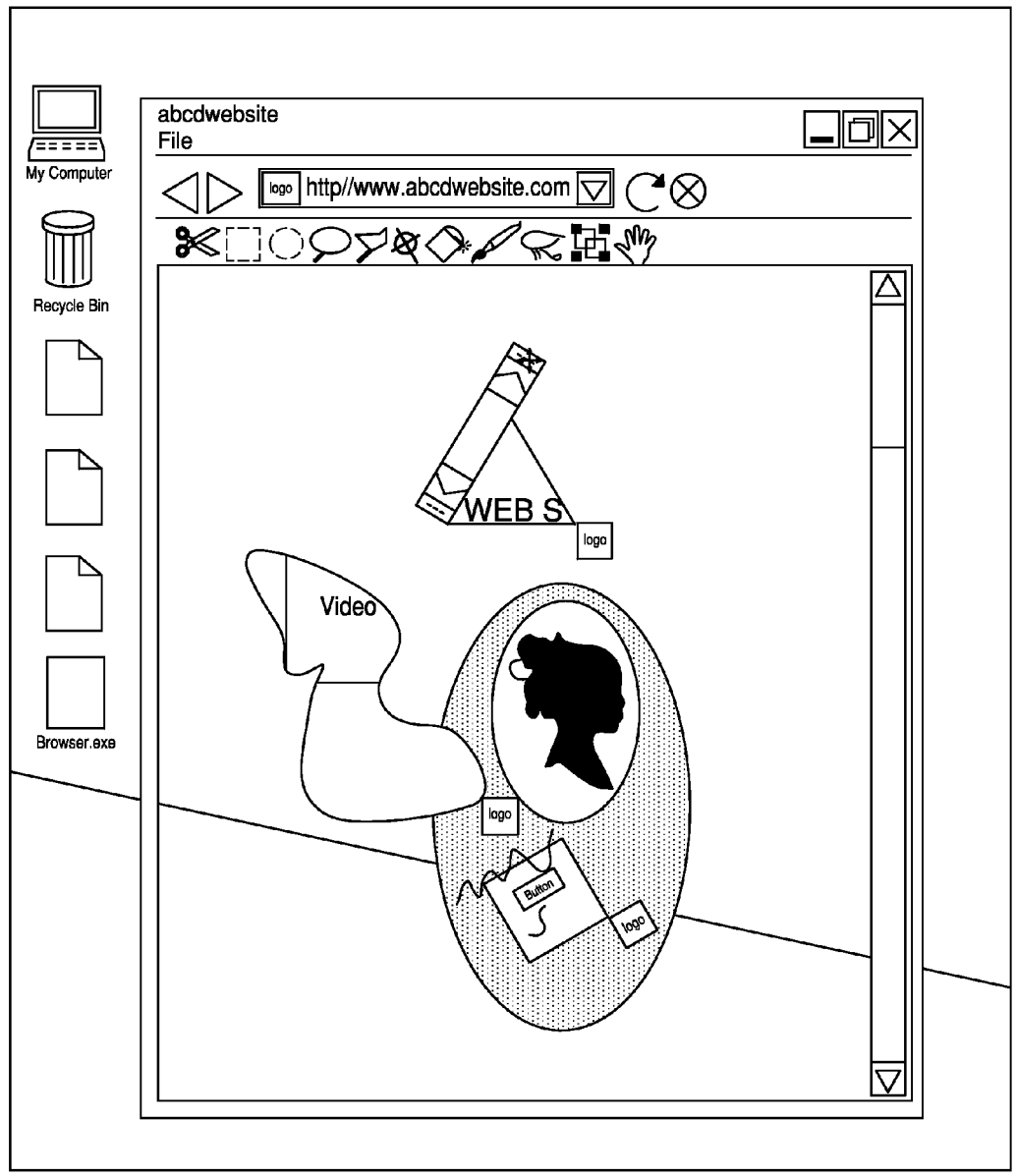
Figure 41:
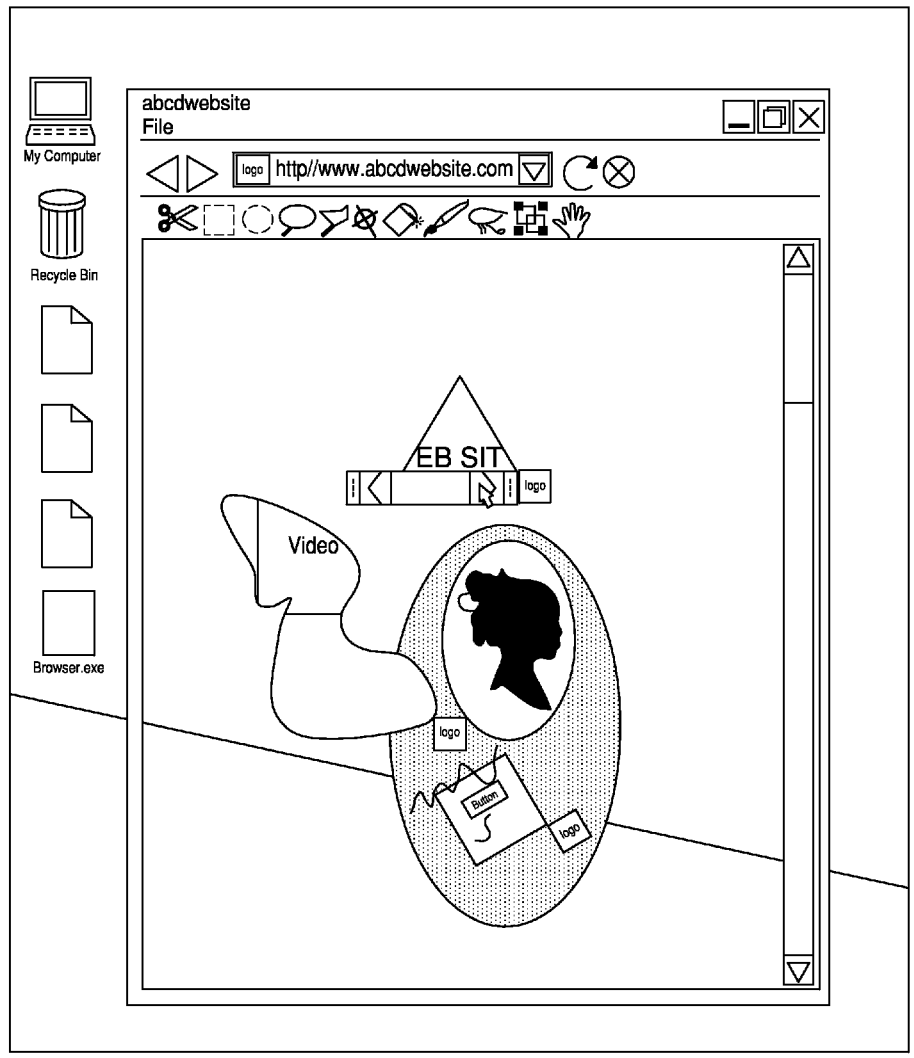
FIGS. 41, 42, 43, 44, 45, 46, and 47 illustrate the exemplary ability of the user to go to a webpage, input user-specific data and cause that webpage to display information that has been customized for the user.

FIGS. 40 and 41 illustrate the ability of the user to move the scroll bar associated with the window to different edges of that window. The relative angle of the scroll bar to the window can be configured to cause the webpage displayed within that window to move at the same angle as the angle of the scroll bar.

Figure 42:
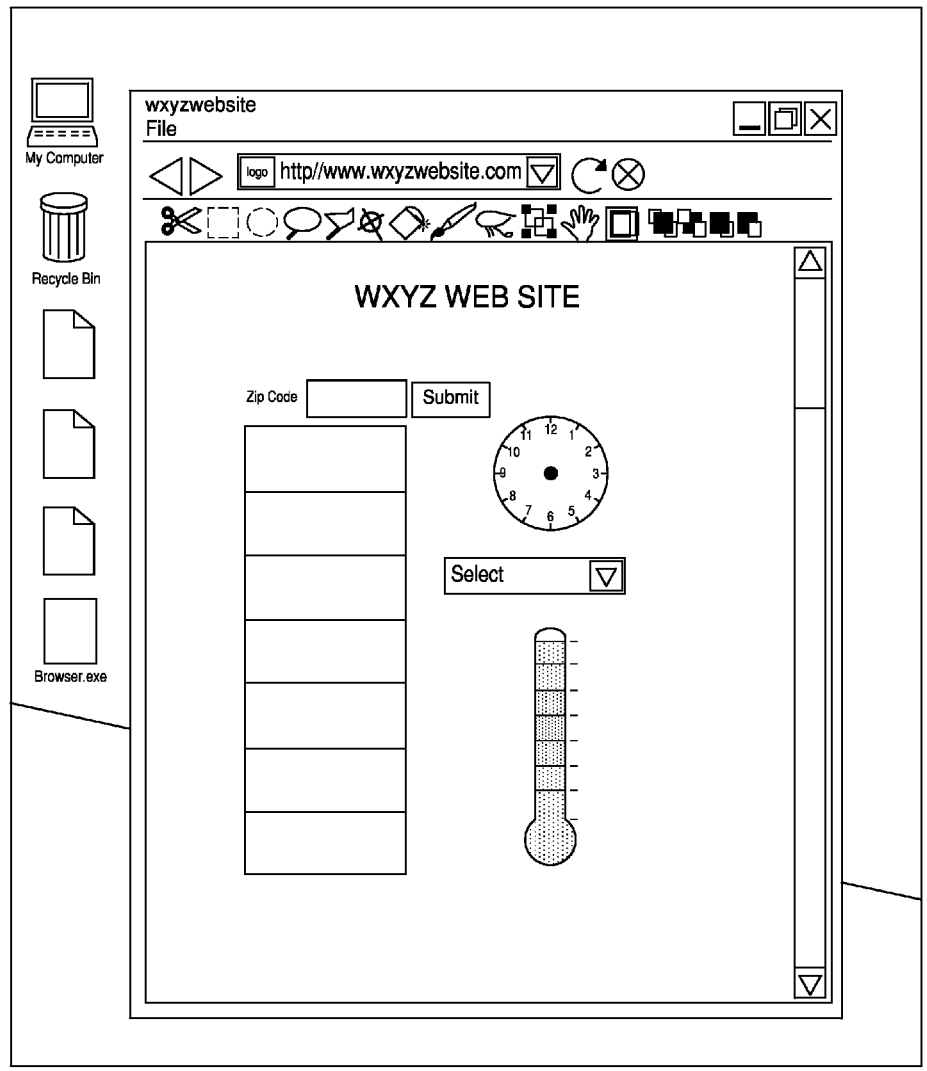
Figure 43:
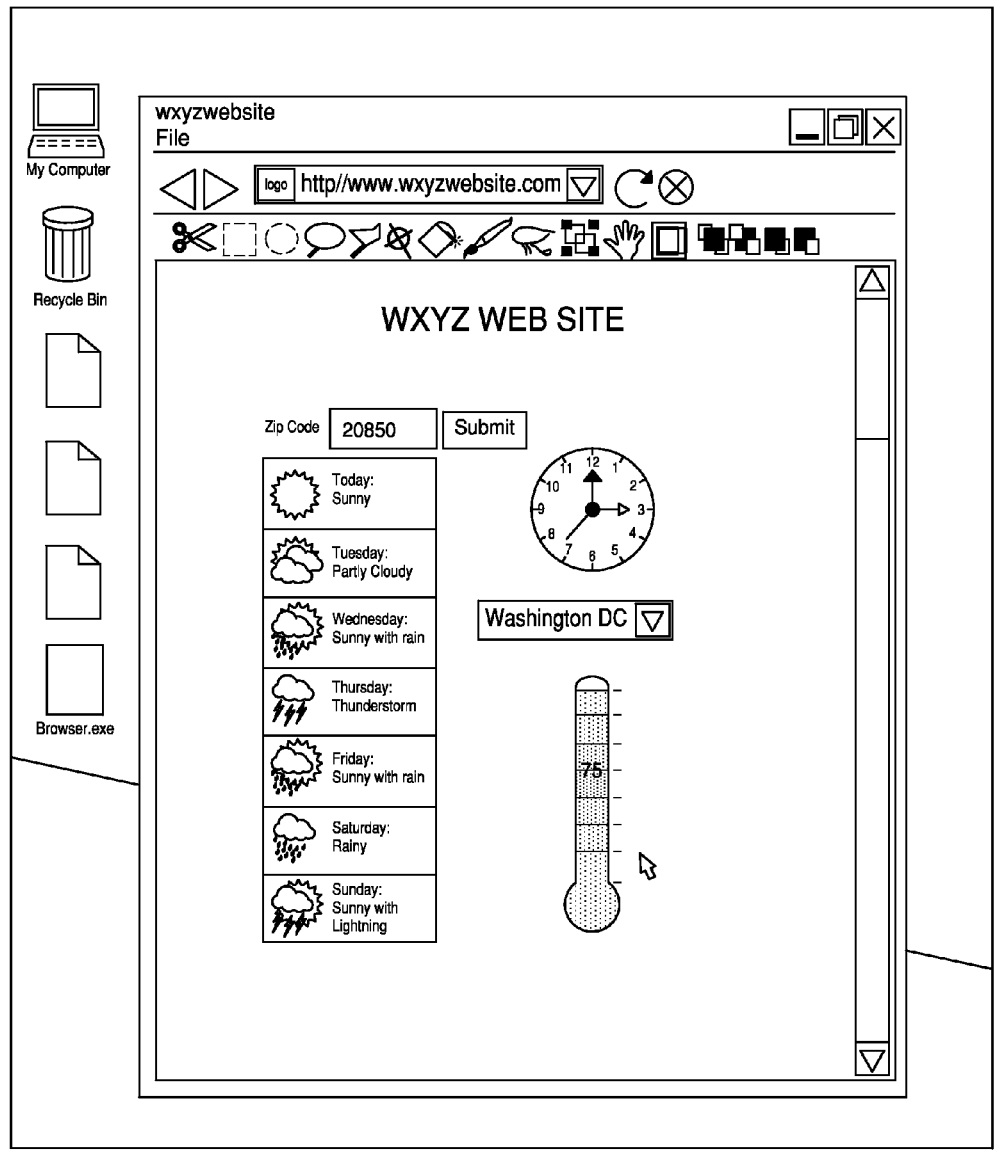
Figure 44:
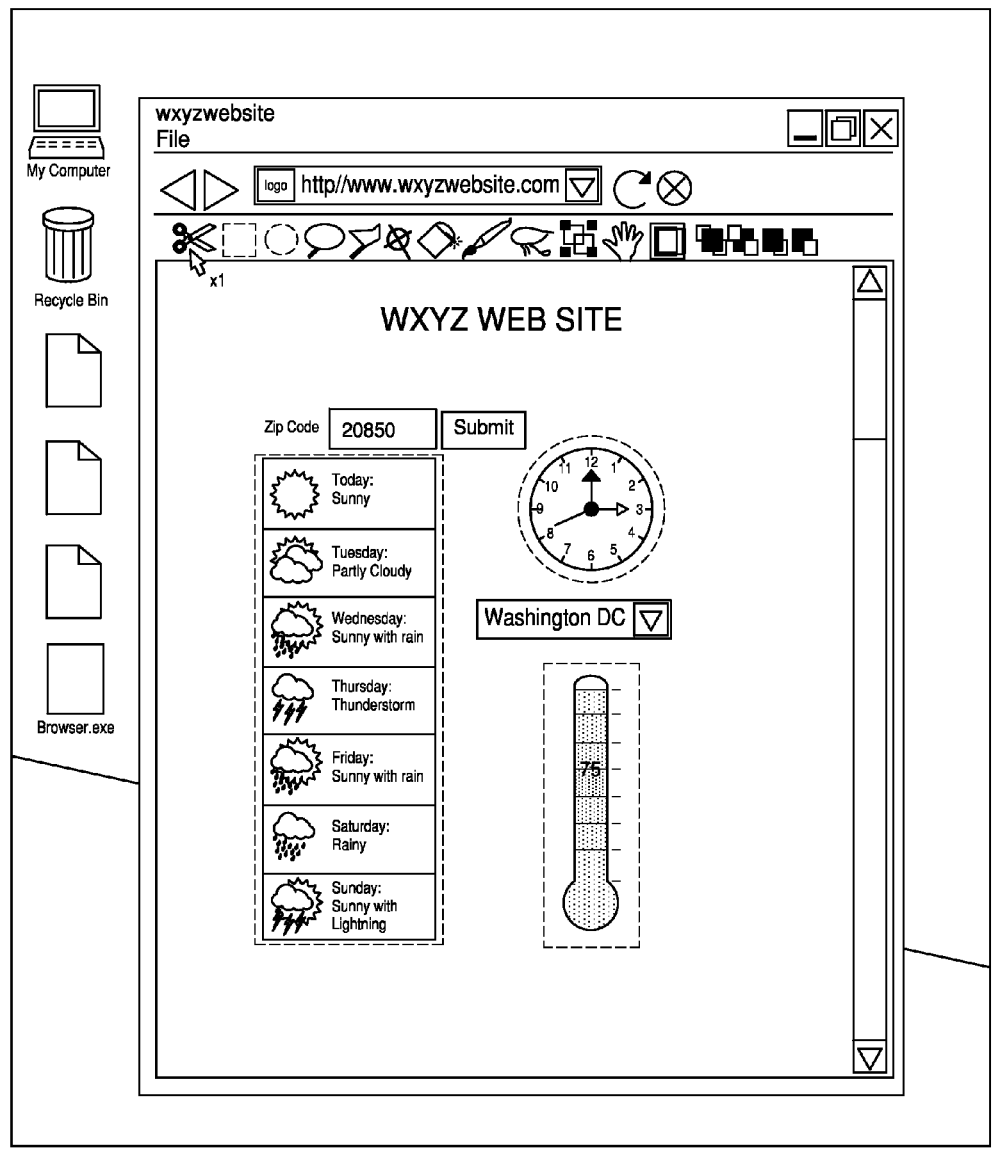
Figure 45:
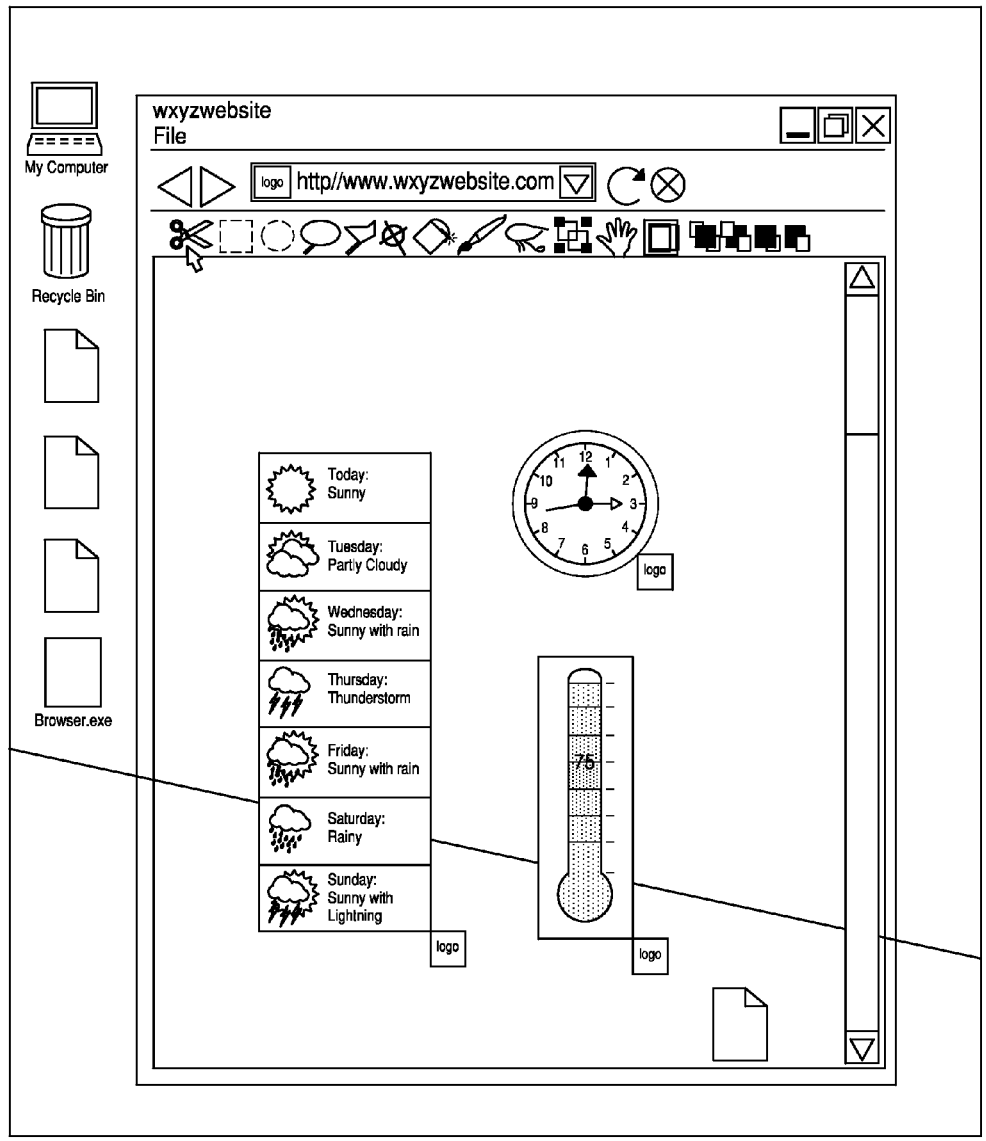
Figure 46:
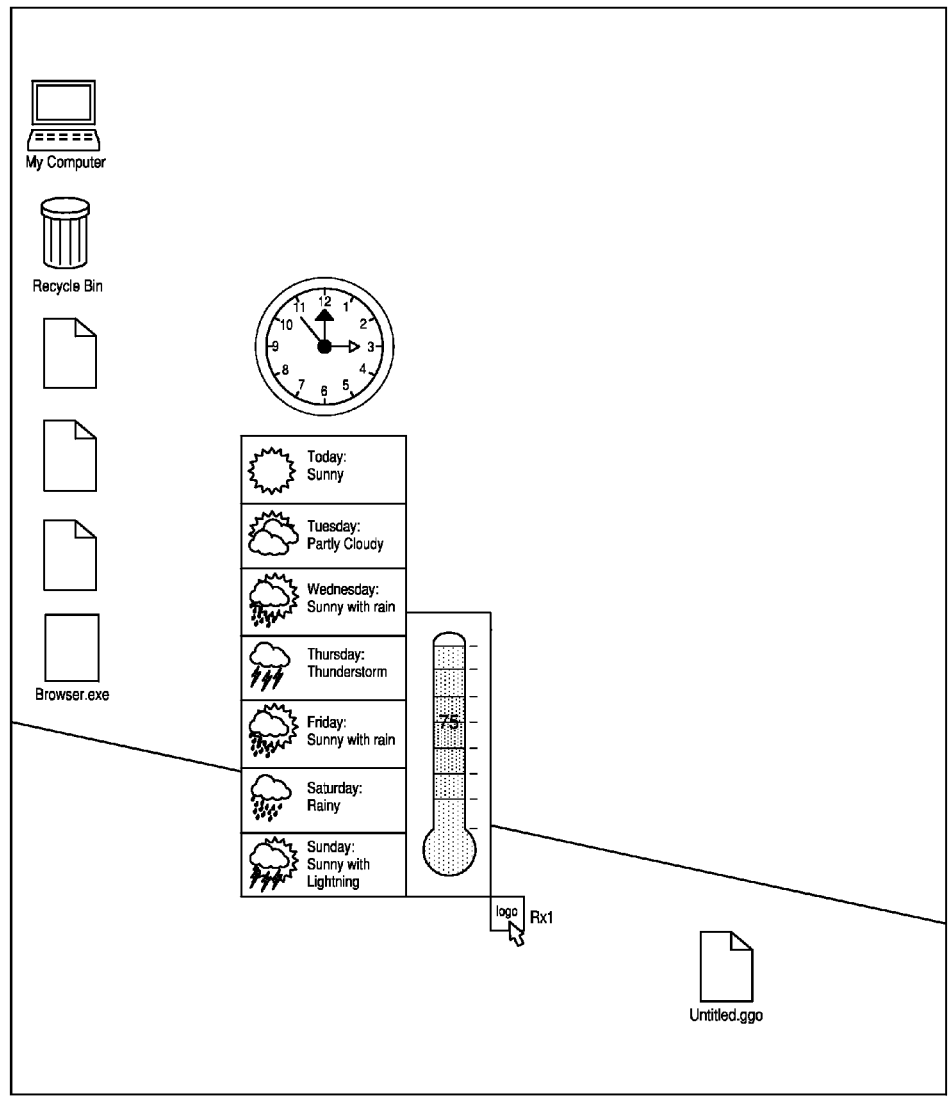
Figure 47:
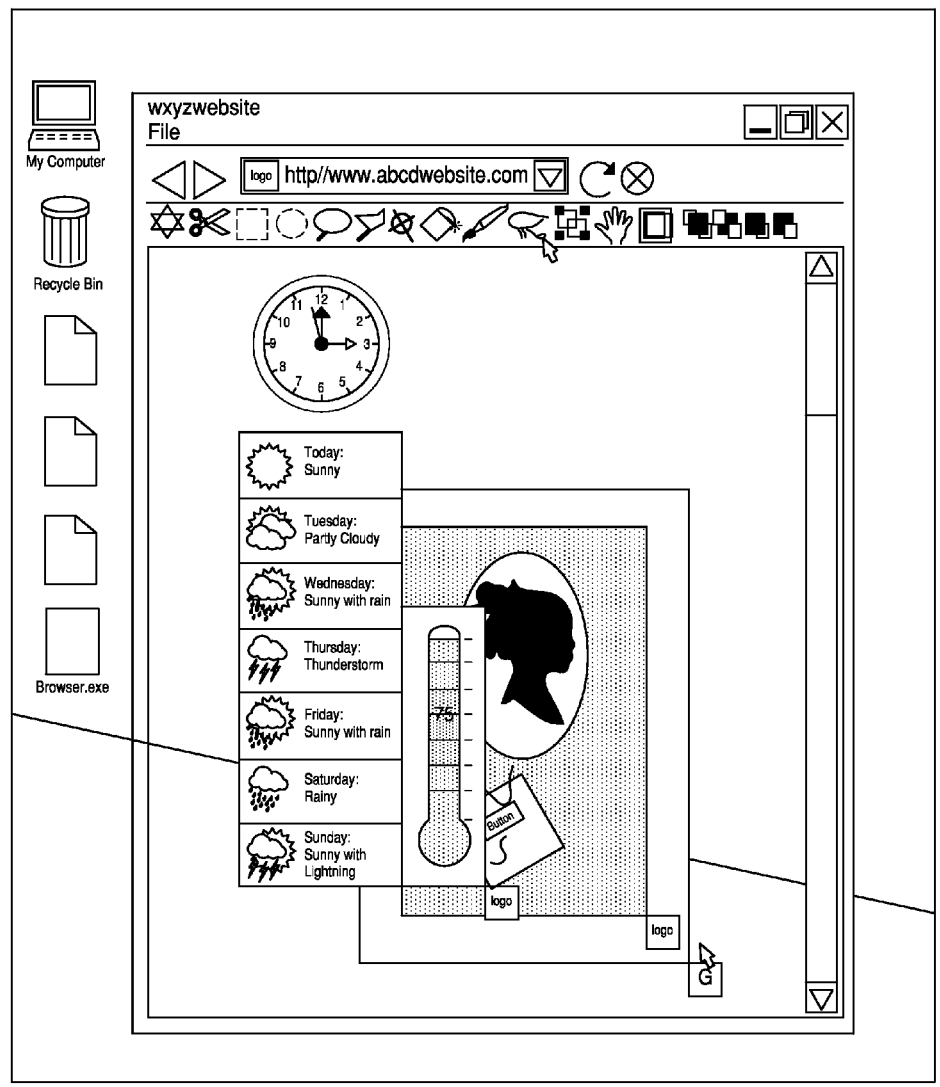

FIGS. 42-47 illustrate the ability of the user to go to a webpage, input user-specific data and cause that webpage to display information that has been customized for the user. In particular, FIGS. 42-48 illustrate the use of a weather webpage to obtain current and forecasted weather conditions for an area of interest to the user. In FIGS. 42 and 43, the user goes to the webpage and enters in data enabling the webpage to show the weather conditions for the area of interest. FIG. 44 illustrates the user's selection of three items of web content display of interest. This selection is indicated by the dashed lines around the temperature, clock and extended forecast items. In FIG. 45, the user has eliminated from display the web display that exists outside the selected areas. In FIG. 46, the user has moved the selected items relative to each other. FIGS. 45 and 46 also show that a shortcut to a file is present on the desktop. This shortcut may be to previously selected and captured web content. By activating that content, such as by clicking on the shortcut to the content, the content is displayed (FIG. 47). That content can be moved relative to the other web content displayed on the desktop by the user.

Various methods readily available to one of ordinary skill in the art of software programming can be used to select an item from a web page for display. One method that can be used is through dynamic HTML, or DHTML. DHTML is a collection of technologies used together to create interactive and animated web sites by using a combination of a static markup language (such as HTML), a client-side scripting language (such as JavaScript), a presentation definition language (such as CSS), and the Document Object Model. DHTML allows scripting languages to change variables in a web page's definition language, which in turn affects the look and function of otherwise "static" HTML page content, after the page has been fully loaded and during the viewing process. Thus the dynamic characteristic of DHTML is the way it functions while a page is viewed, not in its ability to generate a unique page with each page load. The DHTML can be used to determine the area of the webpage display being selected and then additional programming can be used to differentiate the selected are from the area of webpage display outside of the selected area. Numerous webpages provide example of the code used to select and capture web content.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. A method for manipulating the display of content of a web page by a computer tool of a user device, the method comprising:
    rendering at least a portion of the webpage in a browser window within a display screen controlled by the user device, the browser window having a first size;
    receiving an indication of a boundary defined by input device within the browser window, the boundary surrounding a portion of dynamic web content of the web page presented in the browser window and having a size smaller than the first size;
    determining the dynamic web content of the web page corresponding to the dynamic web content rendered within the boundary defined by the input device from the remaining dynamic web content rendered outside of the boundary within the browser window; and
    automatically folding the browser window from the first size to a window of the smaller size and rendering substantially only the determined dynamic web content of the web page in the window of the smaller size without rendering any of the remaining dynamic web content of the web page.

2. The method of claim 1 further comprising:
    unfolding the browser window from the smaller sized window rendering substantially only the determined dynamic web content of the web page and rendering a browser window having an area of a size larger than the smaller size and rendering additional content of the web page contiguous to the determined dynamic content within in the unfolded browser window.

3. The method of claim 1 further comprising:
    displaying a visible attribute in proximity to the folded browser window; and
    using the visible attribute to manipulate the folded browser window within the display screen.

4. The method of claim 3 further comprising:
    further folding the folded browser window in response to using the visible attribute by eliminating the browser window and rendering the visible attribute without any dynamic content of the webpage.

5. The method of claim 4 further comprising:
    toggling, in response to input from the user device indicating manipulation of the visible attribute, between unfolding the further folded browser window and rendering the folded browser window and further folding the folded browser window to render only the visible attribute.

6. The method of claim 1, wherein receiving an indication of a boundary defined by an input device within the browser window surrounding a portion of dynamic web content of a web page displayed includes receiving two separate boundaries defined by the input device surrounding two different portions of dynamic web content of a webpage displayed within a window of a browser presenting the web; determining the dynamic web content of the web page corresponding to the dynamic web content rendered within the two separate boundaries defined by the input device includes determining a first dynamic content and a second dynamic content corresponding to the two different portions; and automatically folding the browser window from the first size to a window of the smaller size and rendering substantially only the determined dynamic web content of the web page in the window of the smaller size without rendering any of the remaining dynamic web content of the web page includes folding the browser window to a first window sized to render substantially only the dynamic web content of the web page corresponding to the determined first dynamic content of the web page and a second window sized to render substantially only the dynamic web content of the web page corresponding to the determined second dynamic content of the web page.

7. A system configured to manipulate display of content of a web page by a computer tool of a user device, the system comprising:
    a storage device storing instructions; and
    a processing device in communication with the storage device and configured to access and execute the instructions; wherein the instructions when executed by the processing device cause the processing device to perform operations comprising:
    rendering at least a portion of the webpage in a browser window within a display screen controlled by the user device, the browser window having a first size;
    receiving an indication of a boundary defined by input device within the browser window, the boundary surrounding a portion of dynamic web content of the web page presented in the browser window and having a size smaller than the first size;
    determining the dynamic web content of the web page corresponding to the dynamic web content rendered within the boundary defined by the input device from the remaining dynamic web content rendered outside of the boundary within the browser window; and
    automatically folding the browser window from the first size to a window of the smaller size and rendering substantially only the determined dynamic web content of the web page in the window of the smaller size without rendering any of the remaining dynamic web content of the web page.

8. The system of claim 7, wherein the operations further comprise:
    unfolding the browser window from the smaller sized window rendering substantially only the determined dynamic web content of the web page and rendering a browser window having an area of a size larger than the smaller size and rendering additional content of the web page contiguous to the determined dynamic content within in the unfolded browser window.

9. The system of claim 7, wherein the operations further comprise:
    displaying a visible attribute in proximity to the folded browser window; and
    using the visible attribute to manipulate the folded browser window within the display screen.

10. The system of claim 9, wherein the operations further comprise:
    further folding the folded browser window in response to using the visible attribute by eliminating the browser window and rendering the visible attribute without any dynamic content of the webpage.

11. The system of claim 10, wherein the operations further comprise:
    toggling, in response to input from the user device indicating manipulation of the visible attribute, between unfolding the further folded browser window and rendering the folded browser window and further folding the folded browser window to render only the visible attribute.

12. The system of claim 7, wherein receiving an indication of a boundary defined by an input device within the browser window surrounding a portion of dynamic web content of a web page displayed includes receiving two separate boundaries defined by the input device surrounding two different portions of dynamic web content of a webpage displayed within a window of a browser presenting the web; determining the dynamic web content of the web page corresponding to the dynamic web content rendered within the two separate boundaries defined by the input device includes determining a first dynamic content and a second dynamic content corresponding to the two different portions; and automatically folding the browser window from the first size to a window of the smaller size and rendering substantially only the determined dynamic web content of the web page in the window of the smaller size without rendering any of the remaining dynamic web content of the web page includes folding the browser window to a first window sized to render substantially only the dynamic web content of the web page corresponding to the determined first dynamic content of the web page and a second window sized to render substantially only the dynamic web content of the web page corresponding to the determined second dynamic content of the web page.

13. A computer program product stored in a non-transitory storage device for manipulating displayed content of a web page by a user device, the computer program product comprising instructions configured to cause a processing device to perform operations comprising:
rendering at least a portion of the webpage in a browser window within a display screen controlled by the user device, the browser window having a first size;
receiving an indication of a boundary defined by input device within the browser window, the boundary surrounding a portion of dynamic web content of the web page presented in the browser window and having a size smaller than the first size;
determining the dynamic web content of the web page corresponding to the dynamic web content rendered within the boundary defined by the input device from the remaining dynamic web content rendered outside of the boundary within the browser window; and
automatically folding the browser window from the first size to a window of the smaller size and rendering substantially only the determined dynamic web content of the web page in the window of the smaller size without rendering any of the remaining dynamic web content of the web page.

14. The computer program product of claim 13, wherein the operations further comprise:
unfolding the browser window from the smaller sized window rendering substantially only the determined dynamic web content of the web page and rendering a browser window having an area of a size larger than the smaller size and rendering additional content of the web page contiguous to the determined dynamic content within in the unfolded browser window.

15. The computer program product of claim 13, wherein the operations further comprise:
displaying a visible attribute in proximity to the folded browser window; and
using the visible attribute to manipulate the folded browser window within the display screen.

16. The computer program product of claim 15, wherein the operations further comprise:
further folding the folded browser window in response to using the visible attribute by eliminating the browser window and rendering the visible attribute without any dynamic content of the webpage.

17. The computer program product of claim 16, wherein the operations further comprise:
toggling, in response to input from the user device indicating manipulation of the visible attribute, between unfolding the further folded browser window and rendering the folded browser window and further folding the folded browser window to render only the visible attribute.

18. The computer program product of claim 13, wherein receiving an indication of a boundary defined by an input device within the browser window surrounding a portion of dynamic web content of a web page displayed includes receiving two separate boundaries defined by the input device surrounding two different portions of dynamic web content of a webpage displayed within a window of a browser presenting the web; determining the dynamic web content of the web page corresponding to the dynamic web content rendered within the two separate boundaries defined by the input device includes determining a first dynamic content and a second dynamic content corresponding to the two different portions; and automatically folding the browser window from the first size to a window of the smaller size and rendering substantially only the determined dynamic web content of the web page in the window of the smaller size without rendering any of the remaining dynamic web content of the web page includes folding the browser window to a first window sized to render substantially only the dynamic web content of the web page corresponding to the determined first dynamic content of the web page and a second window sized to render substantially only the dynamic web content of the web page corresponding to the determined second dynamic content of the web page.

* * * * *